US011663317B2

United States Patent
Mousseau et al.

(10) Patent No.: US 11,663,317 B2
(45) Date of Patent: May 30, 2023

(54) SYSTEMS, DEVICES AND METHODS FOR USING A CENTRAL SERVER TO PROVIDE MULTI-TIERED ACCESS AND CONTROL OF A COMPUTER DEVICE

(71) Applicant: 3D BRIDGE SOLUTIONS INC., Vancouver (CA)

(72) Inventors: Gary Mousseau, Waterloo (CA); Karima Bawa, Vancouver (CA)

(73) Assignee: 3D Bridge Solutions Inc., Vancouver (CA)

(*) Notice: Subject to any disclaimer, the term of this patent is extended or adjusted under 35 U.S.C. 154(b) by 0 days.

(21) Appl. No.: 17/910,710

(22) PCT Filed: Mar. 9, 2021

(86) PCT No.: PCT/CA2021/050314
§ 371 (c)(1),
(2) Date: Sep. 9, 2022

(87) PCT Pub. No.: WO2021/179075
PCT Pub. Date: Sep. 16, 2021

(65) Prior Publication Data
US 2023/0028528 A1    Jan. 26, 2023

Related U.S. Application Data

(60) Provisional application No. 63/062,339, filed on Aug. 6, 2020, provisional application No. 62/987,064, filed on Mar. 9, 2020.

(51) Int. Cl.
*H04L 29/06* (2006.01)
*G06F 21/44* (2013.01)
(Continued)

(52) U.S. Cl.
CPC .............. *G06F 21/44* (2013.01); *G06F 21/10* (2013.01); *G06F 21/31* (2013.01);
(Continued)

(58) Field of Classification Search
CPC ........... G06F 21/44; G06F 21/10; G06F 21/31
See application file for complete search history.

(56) References Cited

U.S. PATENT DOCUMENTS 8,141,142 B2 *   3/2012   Hourselt ............. H04L 63/0428
                                                              726/10
10,482,226 B1 *  11/2019  Konrardy ................ B60L 53/36
(Continued)

FOREIGN PATENT DOCUMENTS

WO         2004070995 A2      8/2004

OTHER PUBLICATIONS

PCT, Written Opinion and International Search Report of International Application No. PCT/CA2021/050913, dated Sep. 15, 2021.
(Continued)

*Primary Examiner* — Jason K Gee
(74) *Attorney, Agent, or Firm* — Norton Rose Fulbright Canada LLP; Maya Medeiros

(57) ABSTRACT

Systems and methods for controlling and tracking computer devices using a secure communication path between a central server and a machine control-file watchdog program. One or more machine control-files can be generated to control, limit and track a computer device using a machine control-file watchdog program. The system sets limits on the computer device to ensure the user operating the computer device stays within a restricted set of usage limitations. The machine control-file watchdog program protects the one or more machine control-files and additionally can report on all activities performed by the computer device to the central server.

21 Claims, 19 Drawing Sheets

(51) Int. Cl.
*G06F 21/62* (2013.01)
*G06F 21/10* (2013.01)
*G06F 21/31* (2013.01)

(52) U.S. Cl.
CPC .. *G06F 21/6281* (2013.01); *G06F 2221/2141* (2013.01); *G06F 2221/2149* (2013.01)

(56) References Cited

U.S. PATENT DOCUMENTS

| | | |
|---|---|---|
| 2007/0026935 A1 | 2/2007 | Wolf et al. |
| 2014/0180711 A1* | 6/2014 | Kamen ................. G06Q 10/10 705/2 |
| 2015/0336270 A1 | 11/2015 | Storr |
| 2016/0313730 A1 | 10/2016 | Ricci et al. |
| 2017/0026382 A1* | 1/2017 | Trigger ............... H04L 67/1001 |
| 2019/0265703 A1 | 8/2019 | Hicok et al. |
| 2021/0094511 A1* | 4/2021 | Basu .................... H04W 12/08 |

OTHER PUBLICATIONS

Narayanan, S. et al., "Shared Autonomous Vehicle Services: a Comprehensive Review", Transportation Research, Part C—Emerging Technologies, 48 pages, Jan. 7, 2020 (Jan. 7, 2020) *whole document*.

* cited by examiner

~~ 300

| | | |
|---|---|---|
| 302 | Program to Access Control-File | Drug-Watchdog-V1 (Read & Execute) |
| | Name of Drug | Drug Identification Number (DIN) |
| | Prescription Number | Government Issued for tracking |
| | Patient Name, Address, Phone | Identification of Patient |
| | Patient Email or Cell Number | Alerts for Patient Allowed |
| | Food, Drink, Empty Stomach - guidelines | Important Requirements |
| | General Comments for Patient on Usage | Comments for Printing |
| | Patient Health Card Number | SIN (Canada) or SSN (USA) or digital |
| | Patient Biometric Attached / Digital Ident | Yes or No (Digital / Biometric) |
| 304 | Dosage strength per unit | Measure: mg, mL, kg, units, pills, caps |
| | Frequency of dose guidelines | Times per day or times of the day |
| | Number of pills / units of insulin per dose | 1 to 'N' pills/units per dose |
| | Maximum Refills Allowed | May allow auto refill |
| | Minimum spacing for each dose | Min. Gap time (used for 'extra' dosage) |
| | Sleep hours to avoid dosage | 'hh:mm' to 'hh:mm' times spread |
| | How long after notification before considering drug missed? (Grace Period) | <Hours and Minutes, i.e. XX : YY> |
| | Should many missed doses halt usage? | Yes or No |
| | ➢ Yes: Number of missed doses? | Halt if <N> doses missed in a row |
| | Picture is required for final provisioning | Picture input required in file for patient |
| | Picture approval required | Frequency of Photo (days, weeks, month) |
| | Picture is required at every dose taken | Picture proof is required per dose? |
| | Extra Dosage Allowed – Patient driven | Number per day |
| | ➢ Time needed between two doses | Minutes or hours |
| | ➢ Maximum doses allow | Max total per day |
| 306 | Maximum dose before refill allowed | Overlap guidelines |
| | Minimum remaining before warning | Warning light turns on |
| | Send Warning Message if dose missed? | Yes or No |
| | Send Alert message if dose missed? | If Yes: send alert message |
| | Allow a Swappable Extra Dispenser? | Yes or No (allows hot swap unit) |
| 308 | Prescriber's Name, Address, Phone | Contact, Alerts? (Modification rights) |
| | Prescriber's Official ID reference number | From Oversight Body |
| | Password for Drug Prescriber | And Contact Info |
| | Identification of Drug Dispenser | Name, Contact (Modification rights) |
| | Details about Drug Dispenser | License Number, etc. |
| | Password for Drug Dispenser | And Contact Info |
| | Name, Contact for Other Health Support | Contact, Phone (Modification rights) |
| | Password for Other Health Support | And Contact Info |
| | Drug Insurer Info., Update Permission | Email Address for Information |

Figure 3

| | | |
|---|---|---|
| 602 | Patient Name, Address, Phone | Identification of Patient, SIN, SSN, etc |
| | Patient Email or Cell Number | Biometric Information Needed? |
| | Digital Patient Id | Send Digital Id to Server? |
| | Specifics on number of reproductions | Patient Biometric Attached |
| | Customer Known Repeat user? | Security required on Reproduction? |
| | Place into Secure Packaging or machine | Yes or No (Digital / Biometric) |
| 604 | Reproduction Specifics | Machine # Required for Reproduction? |
| | Reproduction Identification Info | System Capabilities, Machine Type |
| | Watchdog Revision | Program Name for Reproduction: ? |
| | Temperature and Environmental guides | Version Information, Program Name |
| | Reproduction guidelines | Reproduction Type (3D, Liquid, pill) |
| | - Material Required | - Formulation details, strength, labels |
| | - Quantity Required | - Use secure drug dispenser with drugs? |
| | - Number of copies | - Drug quantity to reproduce |
| | - Number of canisters to install: | - Drug canister identification |
| | Visual Inspection after Reproduction? | -Method to look for flaws (infrared, etc) |
| | Supporting Information: | 3D render or formulation file names |
| 606 | Password for Manager 1 | And Contact Info |
| | Password for Manager 2 | And Contact Info |
| | Password for Site Attendant | And Contact Info |
| | Permissions for Regional Manager | A) Regional Assignment<br>B) Regional & Across Regions<br>View to Real-time reproduction Info. |
| | Permissions for Site Attendant | A) Reproduction Confirm;<br>B) Reproduction Confirm & New Info. Collect<br>View to Real-time reproduction Info. |
| | Drug Insurance Coverage | Email Address for Information |
| | Warrantee of reproduction offered? | Quality level required for warrantee: 'N' |
| | Keep files after reproduction? | If So, for how long to keep in cache? |

Figure 6

| | | |
|---|---|---|
| 902 | Common Name of Device | VTOL, Taxi, Bus, Scooter, Drone |
| | Program Allowed to Access File | Name, Rights (Read, Write, Print, Modify…) |
| | External Identifier | Visual Confirmation # |
| | User's: Name, Address, Phone | Contact Information (Renter or Package delivery or package pickup Requestor) |
| | User's: Email or Cell Number | Alerts for Trip |
| | User's Personal Identification | Photo ID, and Various Personal Numbers |
| | User's Confirmation Code / Biometric / Digital Identity code | User's Confirmation Code / Biometric, Bio-identity |
| | Prepaid use of Computer device? | Receipt Information |
| 904 | GPS, Route Requested / Required | Optional Online Route Requested, Established |
| | User's Previous Status | User's Ranking (reliability issues?) |
| | Additional Requirements? | Photo / EKG / Blood Pressure, etc (flight) |
| | Site Computer Device Attendant – Employee ID | Signature, Biometric Information, authorization codes |
| | Attendant – Usage Start Information | Device comments, Start Time, Date, Location |
| 906 | Device Assignment | Zone for device |
| | Max. Rental hours / day | Device limitations |
| | Rental Restrictions | Yes / No |
| | ➤ Yes – Breathalyzer / Facial | Additional protections |
| | ➤ Max. occupants | Additional riders allowed |
| | ➤ Food consumption allowed | Food / drink / alcohol allowed? |
| | General Comments for Renter, agreement to sign, waver info. | Comments for Printing, signature pad, information collected for legal reasons |
| 908 | Package Delivery Size, Specs. | Inventory item #, size of drone required |
| | Pickup Package Size, Specs | Insurance, item information |
| 910 | Password for Manager 1 | And Contact Info |
| | Password for Manager 2 | And Contact Info |
| | Password for Site Attendant | And Contact Info |
| | Permissions for Regional Manager | C) Regional Assignment<br>D) Regional & Across Regions<br>E) View to Real-time route Info. |
| | Permissions for Site Attendant | C) Renter Confirm;<br>D) Renter Confirm & New Info. Collect<br>E) View to Real-time route Info. |
| | <Other Various Configuration Choices> | <Many Embodiments> |

Figure 9

| Event | Meaning | Data Elements | Alerts |
|---|---|---|---|
| Messages Received by Central server: | | | |
| Started | Device turned on, activating | Opens TCP/IP connection to server if needed, some environmental setup | No |
| Status | Check-in message – any changes to report? | Check-in message needed for some environments, polling for new work/data | No |
| Upload | Control-file present | Control-File was entered at device, uploaded | No |
| Dev. Access | Device local login | Device Manager login success; login name | No |
| Device Opened | Status message for Provisioning | Control-File processed, device opened, inspecting details | No |
| Prov. Start | Provisioning Started | Device contents, closing state info (closed) | No |
| Prov. End | Fully Provisioned | Bio-identity registered, device provisioned | No |
| Deply Conf. | Confirmation | Begin Deployment cmd confirmed | No |
| Deply Stop | Confirmation | Stop Deployment cmd confirmed | No |
| Device Resource | Device resources Used | Time, device contents changed, status | No |
| Device Update | Device Content Update Command Confirmed | Confirming, the protected contents of device were updated in some way by server | No |
| Device Activity | Contents of device changed | Something in contents of device changed, drug dispensed, people left or arrived | No |
| Device Activity | Confirmation, overrule response | Opened Successfully, status and remaining resources inside device | No |
| Device Issue | Device resource gone | Device near complete resource failure | Yes |
| Device Issue | Device Battery Low | Current Battery Level, location, status | Yes |
| Device Issue | Battery Near Dead | Resources remaining, location, status | Yes |
| Device Issue | Device, forced entry | Device error, probability of success to enter | Yes |
| Device Resource Missed | Device resource failure | Time, device resource deployment minor failure, status, location, other data | Yes |
| Login Issue | Device login failures | Local login failure; login name used | Yes |
| Login Issue | Device login blocked | Device reached - Max Failures; total failurs | Yes |

Figure 10b 1032   1050   1034

| Received at Central server: | | | Alerts |
|---|---|---|---|
| Device Activity | User-identity data approved | Device matched and verified User-identity with stored or provided User-identity | No |
| Device Activity | User-identity information | Biometric, biomedical, digital identity data and data type attached for review | Yes |
| Device Acc. Failure | User-identity data failure | Device failed after max attempts to match user / manager; device halted | Yes |
| External Data | External data from user or storage / inspection | Device received external data, Time type of data received (picture, bio-identity | No |
| External Data | Photo of consumer | Digital picture of user before deployment or during deployment of device | No |
| Device State | Manager Override | Local manager override on device, specific change made, time, device status | No |
| Device State Chg | Device has picked up package | Device reached destination and has been loaded by end user | No |
| Debug Msg | DEBUG Message | Operational Issue, or code issue | No |
| Debug Msg | DEBUG Request | Sever requesting debug data from watchdog program operating on device | No |
| Code Load Confirm. | Process of updating software | Update process, step X of update Y has been received and loaded | No |

Figure 10c

SYSTEMS, DEVICES AND METHODS FOR USING A CENTRAL SERVER TO PROVIDE MULTI-TIERED ACCESS AND CONTROL OF A COMPUTER DEVICE

CROSS REFERENCE TO RELATED APPLICATION

The application claims priority to U.S. Provisional Application No. 62/987,064 filed Mar. 9, 2020 and U.S. Provisional Application No. 63/062,339 filed Aug. 6, 2020, the entire contents of which are hereby incorporated by reference.

FIELD

Embodiments relate to controlling and tracking computer devices. In particular, embodiments relate to controlling computer devices using a control-file watchdog program to create a secure end-to-end closed-loop system.

INTRODUCTION

Computer devices perform specialized tasks. A manager or owner of a computer device might want to grant limited access of the computer device to another person. Since the computer device can perform many advanced functions, the manager might want to limit what a specific user can do with their computer device. There is a need for a system that can grant limited access and control of a computer device, as defined by one or more managers of that computer device.

The system can allow for fast and real-time adjustments to the limitations, while still maintaining a high degree of security over the control-files that are guiding the computer device's operation. Without such controls, managers of sophisticated computer devices will have to allow full access to the machine's capability putting themselves, the user, and the computer device at greater risk. It might also leave room for theft of the computer device, theft of intellectual property or some other forms of loss to the owner.

For example, there is a need to allow a multi-tiered access to self-delivery vehicles both land-based and air-based, like drones. A method is needed to control who can open and load the vehicle, what are they allowed to put into the vehicle, what route will the vehicle take and who can extract the contents within the vehicle once it arrives at its destination.

In another example, the use of self-driving taxi means that greater controls will be needed to authorize the user of the taxi, limit its behavior and ensure the user of the taxi has been verified before starting on the purchased route. There is a need to allow the configuration of behavioral information for how the taxi will perform. Limitations can be imposed around how wide a range it can travel, which cities it may drive to and the maximum passengers it can carry. Route information and the renter's identification information can be securely downloaded to ensure only the correct user that has paid for the self-driving taxi is able to gain access and use the taxi. Once granted limited access, real-time tracking information can be constantly provided to a central location to ensure the valuable taxi asset is not lost, stolen, abused or damaged in any way.

In another example, there is a need for control of the use of drugs or supplements. There is a need for the control of use of potentially addictive drugs by people who are addicts or people who may be susceptible to becoming addicted. A system is needed to limit access to the drugs and ensure a prescription is followed precisely. There is a need in the elderly population to ensure they are getting their medications in a timely fashion and if they fail to take their drugs alerts should be sent to caregivers and loved ones that can immediately help. There is also a need to closely monitor adherence and drug consumption in clinical drug trials. Failure in these areas can result in a clinical drug trial failing to meet strict testing requirements and a drug being abandoned. These examples, and many others, demonstrate why a system is needed to control the distribution, delivery, consumption and monitoring of drugs.

There are other problems with prescription drug programs. People can engage in double-doctoring, and in other cases attempt to have their prescriptions filled at multiple pharmacies. These problems extend beyond opioids into sleeping pills, methylphenidate (i.e. Ritalin™ or Concerta™), benzodiazepines, barbiturates, cannabinoids, anabolic steroids, psychostimulants, and other stimulant type medications to name just a few. A system is needed to help prevent people from becoming addicted to various drugs in the first place when receiving prescription drugs that pose a risk of being addictive. There is a need to ensure that drugs are not diverted to people for whom they were not intended. There is a need for better tracking of drug distribution and usage, for example.

SUMMARY

Embodiments described herein relate to using a central server to control and track computer devices using a control-file watchdog program to create a secure end-to-end closed-loop system. The control-file watchdog program is designed to allow the secure download and execution of one or more control-files for providing limited usage of a computer device. Multiple tiers of access, use and control are enabled through the control-file that defines one or more computer device managers and one or more computer device users. Some examples include, the secure distribution and usage of prescription drugs, the secure distribution and usage of insulin for diabetics, the secure access and usage of self-driving taxis, the secure containment, delivery and access of self-delivering vehicles like drones, and the secure access and usage of self-driving Vertical Take Off and Landing (VTOL) taxis to name just a few examples.

Embodiments described herein relate to a system for providing multiple levels of control and management of one or more computer devices using a secure link between a central server and a control-file watchdog program running on the one or more computer devices. The system has a central server having: a non-transitory memory storing a database of authenticated device identity values of devices for establishing an authenticated and secure communication link between the central server and one or more computer devices by matching a device identity against the authenticated device identity values in the database; and the non-transitory memory storing a database of authorized manager values containing a hierarchy of deployment and control rights over the one or more computer devices. Different types of identity values are described herein that can be used for authenticated device identity values.

The system has a user interface for selecting a target computer device and one or more authorized managers to define a hierarchy of access rights over the target computer device; wherein the user interface receives deployment instructions to generate or complete control-files for the target computer device; and generates an assignment confirmation message for the assignment of the target computer device.

The system has a communications interface for creating a secure data communications path to the target computer device using the non-transitory memory storing the authenticated device identity values and transmitting an authentication confirmation message; transmitting one or more completed control-files to the target computer device; and receiving a user identity received message indicating a computer device user's identity has been received by the target computer device.

The system has a hardware processor with a control-file watchdog program having: a communication channel for establishing a secure communication path to the central database using a device identity of the target computer device; to receive an authentication confirmation message; to receive an assignment confirmation message; to receive one or more control-files providing operational instructions to direct activities of the target computer device; and to receive deployment commencement messages to confirm the start of the target computer device's operation; an user identity input to receive a user identity to provide identity confirmation for the target computer device and generate the user identity received message. The hardware processor limits operational behaviours of the computer device user of the target computer device during deployment and generates operational status messages and alerts messages for activities performed by the target computer device to be viewed by one or more of the authorized managers.

In some embodiments, the system has a challenge and response protocol to verify that at least one identified authorized manager is in possession of the target computer device by changing the state of the computer device and requiring the authorized manager to verify that state.

In some embodiments, the computer device user's identity is a user-rights token that was issued at the time of purchasing rights to use a target computer device.

In some embodiments, the central server allows multiple computer devices to be provisioned to a specific computer device user for the same purpose at a same time and sends a begin deployment command to only one computer device.

In some embodiments, the computer devices are interdepending and can work in succession with each other.

In some embodiments, the succession allows the deployment of one computer device to lead to the provisioning and deployment of the subsequent computer device.

In some embodiments, the one or more of the authorized managers can create limited pools of computer devices.

In some embodiments, the limited pools contain a set of managers that can only control and manage the computer devices that have been added to the respective limited pool.

In some embodiments, the identity received message sent to the central server causes a user-identity verified message being returned to the control-file watchdog program.

In some embodiments, the computer device user's identity is further matched against a user-identity within the control-file before the identity received message is sent.

In some embodiments, the central server triggers alert messages that can be sent to one or more registered alert addresses.

In some embodiments, the central server automatically determines that a critical resource necessary for the safe operation of the computer device is reaching an unacceptably low level.

In some embodiments, the secure messages exchanged with the central server can also include messages sent to and from the computer device user during their limited use of the computer device.

In some embodiments, the detection of completion is as a result of viewing the message by one or more authorized managers and determining the computer device deployment should be halted.

In some embodiments, the one or more authorized managers determine the computer device user is outside of the acceptable bounds for continued limited use of the computer device.

In some embodiments, the one or more authorized managers determine the computer device user's identity provided during limited use shows an irregularity as a result of using the computer device.

In some embodiments, the watch dog program determines that a critical resource necessary for the safe operation of the computer device is reaching an unacceptably low level.

In some embodiments, the user-identity is a stored user-identity for the computer device user to have limited control over the computer device.

In some embodiments, the control-file permits additional or extended control by the computer device user Embodiments described herein relate to a method for providing multiple levels of control and management of one or more computer devices using a secure link between central server and a control-file watchdog program running on the one or more computer devices.

The method involves storing, on a non-transitory memory at a central server, a database of authenticated identity values of devices for establishing an authenticated and secure communication link between the central server and one or more computer devices by matching a computer device identity against the authenticated identity values in the database; and the non-transitory memory storing a database of authorized manager values containing a hierarchy of deployment and control rights over the one or more computer devices.

The method involves selecting, by a user interface of the central server, a target computer device and one or more authorized managers to define a hierarchy of access rights over the target computer device; wherein the user interface receives deployment instructions to generate or complete control-files for the target computer device; and generates assignment confirmation messages for the assignment of target computer devices.

The method involves creating a secure data communications path from the central server to the target computer device using a communications interface, the non-transitory memory storing the authenticated identity values and transmitting an authentication confirmation message; for transmitting one or more completed control-files to the target computer device; and for receiving an identity received message indicating a computer device user's identity has been received by the target computer device.

The method involves executing a control-file watchdog program with a communication channel for establishing a secure communication path to the central database using the known identity of the target computer device, the channel to receive an authentication confirmation message; to receive an assignment confirmation message; to receive one or more control-files providing operational instructions to direct activities of the target computer device; and to receive deployment commencement messages to confirm the start of the target computer device's operation.

The method involves receiving, at a user-identity input, a user identity to provide identity confirmation for target computer device usage and generating an identity received confirmation message to the central server.

The method involves limiting operational behaviours of the computer device user of the target computer device during deployment by a hardware processor and the control-file watchdog program.

The method involves generating operational status messages and alerts messages for activities performed by the target computer device to be viewed by one or more of the authorized managers.

Embodiments described herein relate to non-transitory computer readable medium with instructions to configure one or more processors to execute operations of the methods herein.

Embodiments described herein relate to a system with a central server to provide secure authorization to generate one or more control-files. The server has a non-transitory memory for authenticating a received computer device identity, the memory storing a database of authenticated device identity values and a database of authorized manager values containing a hierarchy of deployment and control rights over computer devices. The system has a hardware processor with a user interface that receives a selected target computer device and a computer device identity to verify the existence and deployability of the target computer device by accessing the non-transitory memory. The system has one or more authorized managers to define a hierarchy of access rights over the target computer device from the non-transitory memory storing the database of authorized managers, and deployment instructions to generate or complete the one or more control-files for the target computer device, wherein the user interface generates assignment confirmation messages signaling the provisioning of the target computer device for limited use by a computer device user.

The system has a communications interface for creating a secure data communications path to the target computer device and transmitting an authentication confirmation message, transmitting the one or more control-files to the target computer device, and receiving a user identity received message indicating a computer device user's identity has been received on the target computer device. The system has a computer device with a processor coupled to a memory storing a control-file watchdog program, the computer device having an user-identity input to receive the computer device user's identity, provide identity confirmation for the target computer device. The system can generate the user identity received message for transmission to the central server.

The control-file watchdog program has instructions to configure the processor to: establish a secure communication path to the central server by the processor accessing the computer device identity within the computer device and transmitting the computer device identity to the central server; receive one or more control-files providing operational instructions to direct activities of the target computer device over the secure communication path; receive deployment commencement messages to confirm the start of the target computer device's operation; wherein the processor executes the completed one or more control-files to continuously monitor the computer device, limit operational behaviours of the computer device user of the target computer device during deployment, and generate operational status messages and alert messages for activities performed by the target computer device to be viewed by one or more of the authorized managers using the selected encryption keys to the central server upon detecting activity on the computer device by the monitoring.

In some embodiments, the system has a challenge and response protocol to verify that at least one identified authorized manager is in possession of the identified computer device by changing the state of the computer device and requiring the authorized manager to verify that state;

In some embodiments, the computer device user's identity is a user-rights token that was issued at the time of purchasing rights to use a target computer device.

In some embodiments, the central server allows multiple computer devices to be provisioned to a specific computer device user for the same purpose at a same time and sends a begin deployment command to only one computer device.

In some embodiments, the computer devices are interdepending and can work in succession with each other.

In some embodiments, the succession allows the deployment of one computer device to lead to the provisioning and deployment of the subsequent computer device.

In some embodiments, one or more of the authorized managers can create limited pools of computer devices.

In some embodiments, the limited pools contain a set of managers that can only control and manage the computer devices that have been added to the respective limited pool.

In some embodiments, the identity received message sent to the central server causes a user-identity verified message being returned to the control-file watchdog program.

In some embodiments, the computer device user's identity is further matched against a user-identity within the control-file before the identity received message is sent.

In some embodiments, the central server triggers alert messages that can be sent to one or more registered alert addresses.

In some embodiments, the central server automatically determines that a critical resource necessary for the safe operation of the computer device is reaching an unacceptably low level.

In some embodiments, secure messages exchanged with the central server can also include messages sent to and from the computer device user during their limited use of the computer device.

In some embodiments, detection of completion is as a result of viewing the message by one or more authorized managers and determining the computer device deployment should be halted.

In some embodiments, the one or more authorized managers determine the computer device user is outside of the acceptable bounds for continued limited use of the computer device.

In some embodiments, the one or more authorized managers determine the computer device user's identity provided during limited use shows an irregularity as a result of using the computer device.

In some embodiments, the watch dog program determines that a critical resource necessary for the safe operation of the computer device is reaching an unacceptably low level.

In some embodiments, the user-identity is a stored user-identity for the computer device user to have limited control over the computer device.

In some embodiments, limited behaviors detailed in the control-file include extended choices to permit additional limited control by the computer device user, the control file read by the hardware processor for limiting the operational behaviours of the computer device user of the target computer device.

In some embodiments, there is provided a method that involves providing a central server to provide secure authorization to generate one or more control-files; using a non-transitory memory for authenticating a received computer device identity, the memory storing a database of authenticated device identity values and a database of authorized manager values containing a hierarchy of deployment and control rights over computer devices; at hardware processor with a user interface, receiving a selected target computer device and a computer device identity to verify the existence and deployability of the target computer device by accessing the non-transitory memory; and receiving one or more authorized managers to define a hierarchy of access rights over the target computer device and deployment instructions to generate or complete the one or more control-files for the target computer device; generating assignment confirmation messages signaling the provisioning of the target computer device for limited use by a computer device user; creating a secure data communications path to the target computer device and transmitting an authentication confirmation message; transmitting the one or more control-files to the target computer device; receiving a user identity received message indicating a computer device user's identity has been received on the target computer device; at computer device with a processor coupled to a memory storing a control-file watchdog program, receiving the computer device user's identity, provide identity confirmation for the target computer device, and generate the user identity received message for transmission to the central server; establishing, by the control-file watchdog program, a secure communication path to the central server by the processor accessing the computer device identity within the computer device and transmitting the computer device identity to the central server; receiving one or more control-files providing operational instructions to direct activities of the target computer device over the secure communication path; receiving deployment commencement messages to confirm the start of the target computer device's operation; executing the completed one or more control-files to continuously monitor the computer device; limiting operational behaviours of the computer device user of the target computer device during deployment; and generating and transmitting operational status messages and alert messages for activities performed by the target computer device to be viewed by one or more of the authorized managers using the selected encryption keys to the central server upon detecting activity on the computer device by the monitoring.

In some embodiments, there is provided non-transitory computer readable medium with instructions to configure one or more processors to execute operations of the methods described.

In some embodiments, there is provided a method of providing multiple levels of control and management of one or more computer devices using a secure link between central server and a control-file watchdog program. The method involves, at a central server, establishing an authentic relationship between the central server and one or more computer devices using a device database to encode device identity information; establishing authorization between one or more managers of computer devices and a central server in an authorization database; creating a hierarchic database to define different levels of deployability for the one or more computer devices, for one set of managers over another set of managers; using an interface to input computer device identification matching one or more computer devices within the device database from the one or more authorized managers to select a target computer device; using the device database to verify the existence and hierarchic database to verify the deployability of the target computer device using the device identification provided, for an operational assignment by the one or more managers; confirming the creation of a secure data communications path between a central server and the target computer device based on the information within the device database; exchanging with the central server over the secure communication path one or more completed control-files with the target computer device, containing at least the computer device user's identity, and operational parameters for the target computer device; executing the one or more control-files to instruct a control-file watchdog program to: instruct the assigned manager to perform the necessary steps required to prepare the computer device for limited operation by a computer device user; apply an user-identity sample matching the computer device user whose identity was provided in the one or more control-files and sending a confirmation message to the central server to enter a provisioned stage in the computer device; receive a begin deployment command from the central server when it decides that deployment of the computer device can commence; activate limiting behaviors during deployment of the computer device to allow the provisioned computer device user to have partial control of the computer device; and generate and send secure operational status messages and alert messages for viewing by one or more of the authorized managers, to the central server during the deployment of the computer device.

In some embodiments, the computer device user-identity is a user-rights token that was issued at the time of purchasing rights to use a target computer device.

In some embodiments, the central server allows multiple computer devices to be provisioned to a specific computer device user for the same purpose at a same time and sends a begin deployment command to only one computer device.

In some embodiments, the computer devices are interdepending and can work in succession with each other.

In some embodiments, the succession allows the deployment of one computer device leads to the provisioning and deployment of the subsequent computer device.

In some embodiments, there is provided a method of providing multiple levels of control and management over one or more computer devices using a central server and a control-file watchdog program. The method involves: establishing secure computer devices using a central server that accesses device identity information stored on the computer devices to create one or more known computer devices; creating multiple tiers of authorized managers to manage one or more known computer devices; receiving a computer device user request for limited access to one or more of the known computer devices; selecting one of the one or more known computer devices that matches the requirements of the computer device user request, to identify a selected computer device; providing one or more of the authorized managers an interface at the central server to input identification information on the selected computer device using the device identity information for that computer device; establishing a secure communications path between the central server and the selected computer device to verify the authorized manager's request to utilize the selected computer device; allowing the one or more authorized managers to build one or more control-files to limit the computer device user's access to the selected computer device; sending the one or more control-files over the secure communications path to program a control-file watchdog program running on the selected computer device to: enable opening of the selected computer device so that it can be prepared for the computer device user's limited use; detect the closing of the selected computer device once prepared to permit the reception of a computer device user's user-identity; enable the processing of the computer device user's user-identity and sending a identity received message to the central server, to enter a fully provisioned stage; enter the deployment phase when a begin deployment command is received from the central server, that further permits the control-file watchdog to: allow execution of the one or more control-files, following configuration instructions within the one or more control-files; limit behaviour for the computer device user of the selected computer device following configuration instructions within the one or more control-files; send secure status messages to the central server to populate an interface for viewing by one or more authorized managers, at the central server; and detect the completion of the computer device user's limited use of the selected computer device and halting the deployment phase.

In some embodiments, one or more of the authorized managers can create limiting managerial pools below them. In some embodiments, the limited pools contain a set of managers that can only control and manage those computer devices that have been added to that pool.

In some embodiments, the sending of the user-identity received message to the server causes a user-identity verified message begin returned to the control-file watchdog.

In some embodiments, the user-identity is further matched against a user-identity within the control-file before the user-identity received message is sent.

In some embodiments, the secure status messages can cause the central server to trigger alert messages that can be sent to one or more registered alert addresses.

In some embodiments, there is provided a system of providing multiple levels of control and management over one or more computer devices using a central server and a control-file watchdog program. The system involves a database storage area for encoding a secure relationship between a central server and computer devices using device identity information from the computer devices to create one or more known computer devices; an authorization processor that constructs multiple levels of authorized managers to manage one or more known computer devices; a transaction service that receives a computer device user request for limited access to one or more of the known computer devices; a matching processor that receives the selection of one of the one or more known computer devices that matches the requirements of the computer device user request, to identify a selected computer device; a user interface that receives input identification information on the selected computer device using the device identity information for that computer device; a communication infrastructure that establishes a secure communications path between the central server and the selected computer device to verify the authorized manager's request to utilize the selected computer device; a user interface that receives commands to construct one or more control-files to limit the computer device user's access to the selected computer device; a transmission medium for sending the one or more control-files over the secure communications path to a control-file watchdog program running on the selected computer device allowing it to: enable opening of the selected computer device so that it can be prepared for the computer device user's limited use; detect the closing of the selected computer device once prepared to permit the reception of a computer device user's user-identity; enable the processing of the computer device user's user-identity and sending a identity received message to the central server, to enter a fully provisioned stage; enter the deployment phase when a begin deployment command is received from the central server, that further permits the control-file watchdog to: allow execution of the one or more control-files, following configuration instructions within the one or more control-files; limit behaviour for the computer device user of the selected computer device following configuration instructions within the one or more control-files; send secure status messages to the central server for viewing by one or more authorized managers, at the central server; and detect the completion of the computer device user's limited use of the selected computer device and halting the deployment phase.

In some embodiments, the central server detects that a deployed computer device has reached the end of its deployment phase it automatically sends a begin deployment command to the next provisioned computer device to allow limited use by the same computer device user.

In some embodiments, the preparation of the computer device involves placing another computer device in the main compartment that will be provisioned and deployed once the first computer device reaches the end of its deployment for a specific computer device user.

In some embodiments, the preparation of the computer device involves placing another computer device in the main compartment that will be provisioned and deployed once the first computer device reaches the end of its deployment for a specific computer device user.

In some embodiments, the central server automatically detects the completion of the deployment phase by interpreting the status messages to determine when the state of the internal contents has been fully deployed as required.

In some embodiments, the central server automatically determines that a critical resource necessary for the safe operation of the computer device is reaching an unacceptably low level.

In some embodiments, the secure messages exchanged with the central server can also include messages sent to and from the computer device user during their limited use of the computer device.

In some embodiments, the detection of completion is as a result of viewing the message by one or more authorized managers and determining the computer device deployment should be halted.

In some embodiments, the one or more authorized managers determine the computer device user is outside of the acceptable bounds for continued limited use of the computer device.

In some embodiments, the one or more authorized managers determine the computer device user's user-identity information provided during limited use shows an irregularity as a result of using the computer device.

In some embodiments, it is determined that a critical resource necessary for the safe operation of the computer device is reaching an unacceptably low level.

In some embodiments, the user-identity used to move to the fully provisioned state is a stored user-identity for the computer device user wanting to have limited control over the computer device.

In some embodiments, the status messages are received and interpreted by an artificial intelligence processor to create improvements of subsequent limited uses of the computer device.

In some embodiments, the status messages are received and interpreted by an artificial intelligence processor to create improvements of subsequent limited uses of the computer device.

In some embodiments, the improvements related to frequency of use and route information to identify the best locations to begin provisioning and end deployment of the computer device.

In some embodiments, the limited behaviors detailed in the control-file might also include optional extended choices to permit additional limited control by the computer device user.

BRIEF DESCRIPTION OF DRAWINGS

The following detailed description of the invention is better understood when read in conjunction with the included figures. The included figures are intended to illustrate one implementation of the invention for one skilled in the art. These exemplary illustrations are not intended to limit the disclosure to the specific embodiments shown herein.

FIG. 3 shows one medical embodiment for a drug control-file layout and its contents.

FIG. 6 is an embodiment for a 3D control-file and drug reproduction control-file 300 and its contents.

FIG. 9 shows an example transportation embodiment for a route control-file, or a package control-file layout and its contents.

FIG. 10b is a first set of example messages received by the central server from a managed computer device.

FIG. 10c is a second set of example messages received by the central server from a managed computer device.

DETAILED DESCRIPTION OF DRAWINGS

Figure 1:
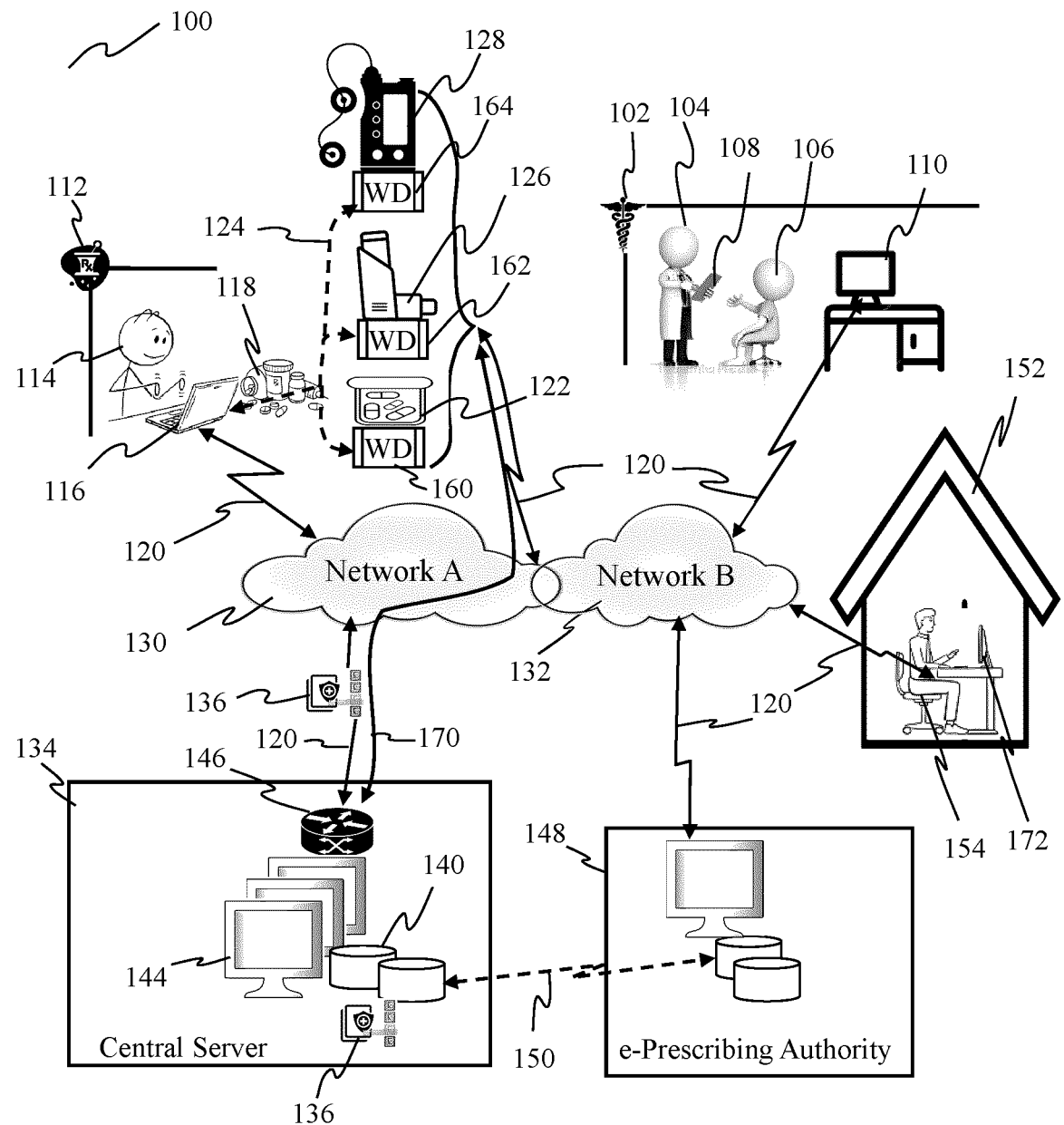
FIG. 1 is an illustration of a network overview showing a medical embodiment wherein drug prescribers and drug dispensers work to prescribe drugs to a drug consumer.

Embodiments described herein provide a system and method for providing multiple levels of control and management of one or more computer devices using a secure link between a central server and a control-file watchdog program running on the computer device The system described will detail the specific steps needed in the authorization, provisioning, and deployment of these computer devices.

The central server has non-transitory memory storing a database of authenticated identity values for establishing an authenticated and secure communication link between the central server and one or more computer devices. The secure link is created by matching a computer device identity against known identity values in the database. The non-transitory memory also stores a database of authorized manager values containing a hierarchy of deployment rights over the computer devices.

The central database also has a user interface for providing input. The input is used for selecting a target computer device from all known computer devices. The input is further used for selecting one or more authorized managers to have a hierarchy of access rights over the target computer device from the non-transitory memory, which stores identity information about authorized managers. The user interface is also used to input deployment instructions to establish control-files for the target computer device, leading to the generation of assignment confirmation messages for the assignment of target computer devices.

The central database also has a communications interface for creating a secure data communications path to the target computer device by using information within the non-transitory memory that stores the authenticated identity values for known computer devices and transmitting an authentication confirmation message. The communication interface allows the transmission of one or more completed control-files to the target computer device. The communication interface also allows the reception of an identity received message indicating a computer device user's identity ("user-identity") has been received by the target computer device.

Different user identity terms are used herein to refer to identification information of a user for the target computer device. There are references to "computer device user's identity, "device user's identity" "user identity" "user's-identity", for example.

Embodiments further describe the creation of a secure data communication link between a central server and a control-file watchdog program "control-file watchdog". The control-file watchdog is defined as a program that receives, protects and acts upon one or more control-files to grant authorization, provisioning and deployment operations of the computer device. The control-file watchdog acts to protect this information through various security means, and it safeguards this information while the one or more of the control-files remain on the managed computer device. In some embodiments, the control-file watchdog runs in the background, protecting the control-files and, in other embodiments, the control-file watchdog is also involved in controlling aspects of the managed computer device.

The control-file watchdog program has a communication channel for establishing a secure communication path to the central database using the known identity of the target computer device. The control-file watching program is able to receive one or more control-files providing operational instructions to direct activities of the target computer device. The control-file watchdog program is also able to receive deployment commencement messages to confirm the start of the target computer device's operation.

The control-file watchdog program has a user-identity input to receive and match the same user-identity to provide identity confirmation for target computer device usage and generate a identity received confirmation message to the central server.

The control-file watchdog program has a hardware processor for limiting operational behaviours of the computer device user of the target computer device during deployment. Further, it also generates operational status messages and alerts messages for activities performed by the target computer device to be viewed by one or more of the authorized managers.

The System Overview

Although the central server and its associated database are illustrated as cloud-supported systems in the supporting figures, they can be implemented in many ways. In one embodiment shown in the attached figures, one or more CPUs are placed in an Internet central cluster location for public rental. This is known as a cloud-computer product offering. This cloud-based solution offers high reliability, great flexibility, the ability to expand CPU requirements as needed and excellent speed. In another embodiment, the central server lives within the offices of a large corporation and provides a dedicated server to an organization. In some embodiments this might be a research facility, a hospital, or a major drug manufacturer. The central database has CPUs to offer User Interface (UI) services, database services and data communication services.

In some embodiments, different sets of servers work together to provide services to computer device users. For example, a computer device user might purchase computer device use from a selling-oriented computer server that communicates with the central server to transmit the purchase information and computer device user-identification.

Data communication services link one or more central servers to the supported computer devices. This might be T1 connections, virtual private networks (VPN) to private networks, or Ethernet links to public networks like the Internet. Through one or more networks, the data communication services at the central server are able to exchange messages with one or more computer devices being used for their designed and designated services.

The computer device to be managed is a complex computer containing a CPU, one or more types of data communication capabilities and varying amounts of audible and visual user interfaces and is built with a unique computer device identity ("device identity"). This device identity may be created during the manufacturing and provisioning process for each unit. In one embodiment, an identity chip is built into the printed circuit board (PCB) of the computer device. The device identity is private and is only known by protected and non-transitory database services within the central server.

In some embodiments the device identity is injected into the computer device, for example as an encryption certificate. Encryption certificates are used as the basis for encrypting data and verifying communication entities. In one embodiment, a certification could be created by a certificate authority (CA). In another embodiment, the central server acting as a CA creates a certificate. In these embodiments, the unique certification would be exchanged in a secure location, like the manufacturing plant, as each computer device is first powered up and tested at the completion of manufacturing.

There are also embodiments wherein the unique serial number used is extracted from the CPU chip used within the computer device. For example, many of the major chip manufactures like Intel and AMD have such a device identifier in their CPU chips which may be used as the unique serial number. As another example, if there is a hardware network interface device used in the computer device, then a media access control address (MAC address) that is unique and used commonly in most 802.11, Ethernet, WiFi and Bluetooth implementations may be used as the unique serial number. As yet another example, internationally, there is the Electronic Product Code (EPC) that can be built into the PCB and then exchanged with the central server as the unique serial number.

This device identity is then exchanged between the computer device and the central server and saved in non-transitory memory for both endpoints. Since both endpoints have this shared device identity, it will then form the basis of creating a secure and unbreakable connection to a control-file watchdog running on the computer device.

The secure link created between the central server and the control-file watchdog allows the exchange of one or more control-files that are protected, managed, and, in some embodiments, executed by a control-file watchdog. To support a secure data communication link, the computer device is capable of one or more data communication methods over different data communication media. For example, links over WiFi (802.11), GSM networks like 3G, 4G and 5G networks, and Internet of Things (IoT) wireless networks with LTE-M1 (machine-to-machine) communications and LTE-CAP1 type communications.

In other embodiments, there could also be support for physical connections like wired Ethernet links and USB connections. In other embodiments, short-range communications could be used like Bluetooth, near field communications (NFC) and other proprietary links that could create a secure link using short-range communications. Depending on the computer device and its design, several primary, secondary, and backup connection strategies could be employed to ensure safety and a continuous communication link to the central server. Short-range links like Bluetooth, might fall back to WiFi link if problems occur, and WiFi links might fall back to LTE links if WiFi coverage starts to fail. Attempts are made to keep communications open to the central server.

In some embodiments, the computer device may use a short-range link to another computer system that supplies a wide-area communications link. For example, a computer device might use a Bluetooth link to a cell phone that in turn uses a LTE cellular link to a public wireless network, that further links to a public network like the Internet that communicates to the central server. In this way communications links can be daisy-chained to provide a secure communication path between the control-file watchdog program and the central server.

In addition to the communication links to the central server, the computer device is also capable of creating links to the computer device user of the computer device to provide status and state information. For example, a Bluetooth link might be enabled to inform the computer device user about battery issues, coverage issues, travel time, contact information as well as to relay messages to the central server through another computer system, such as a cell phone, laptop, tablet, smart watch, or some other communications-capable computer.

Another use for the secure connection between the control-file watchdog and the central server would be to multiplex communications from other local systems. For example, if a locally situated manager of the computer device wanted a direct and secure method to reach the computer device user, they could use the secure link created between the central server and the control-file watchdog. In this way, the secure link can be multiplexed for several different purposes and the control-file information may include private messages that might be extremely sensitive in nature. For example, these messages could have private vehicle route information, patient information, drug information, drug consumption information, emergency steps to stop a vehicle computer device or many other sensitive commands. As such, these messages would be considered additional control-file information and would fall under the protection of the control-file watchdog program.

Figure 2:
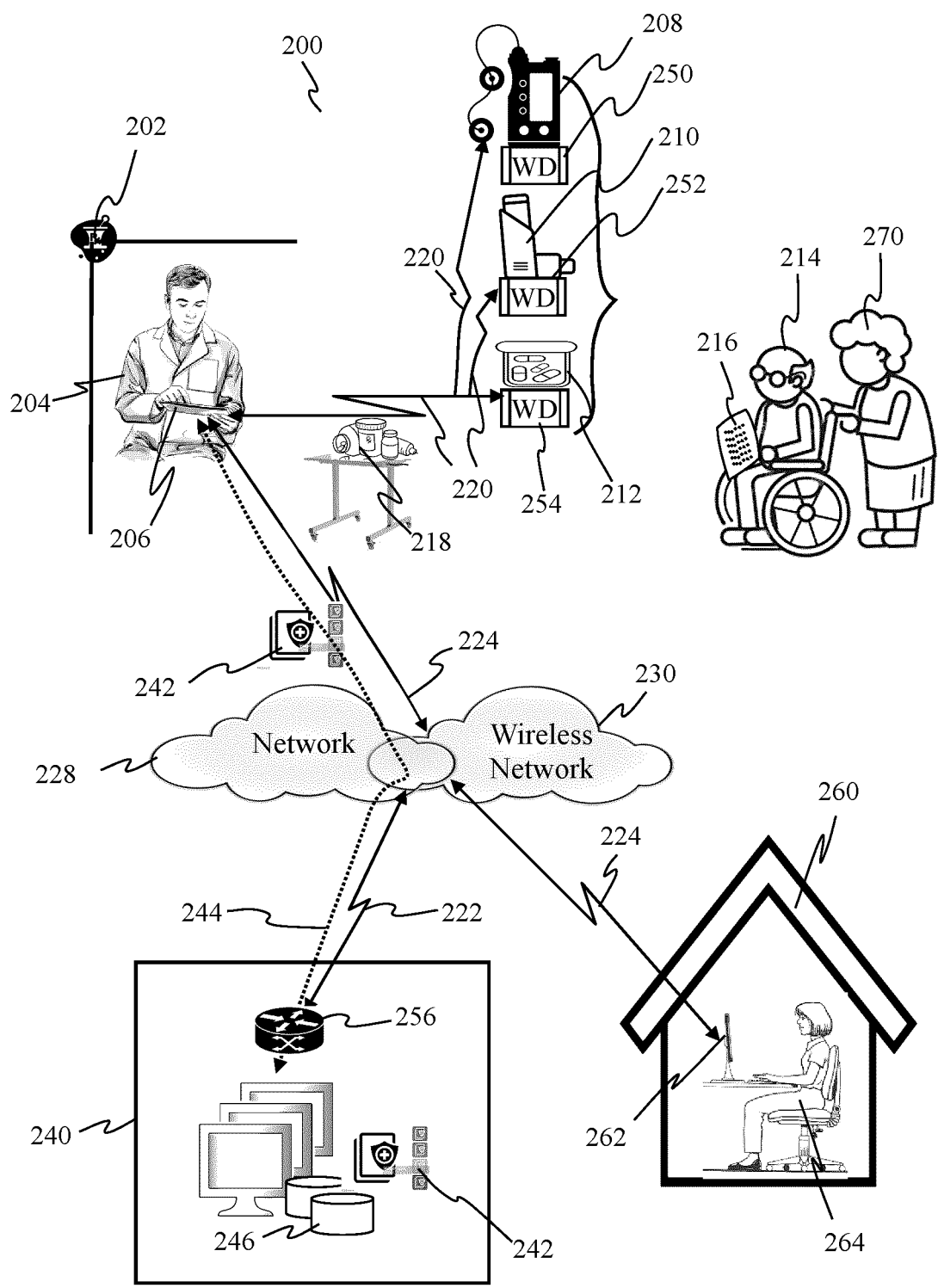
FIG. 2 shows another medical embodiment wherein a drug dispenser works with a drug dispensing computer device through a secondary computer.
Figure 4:
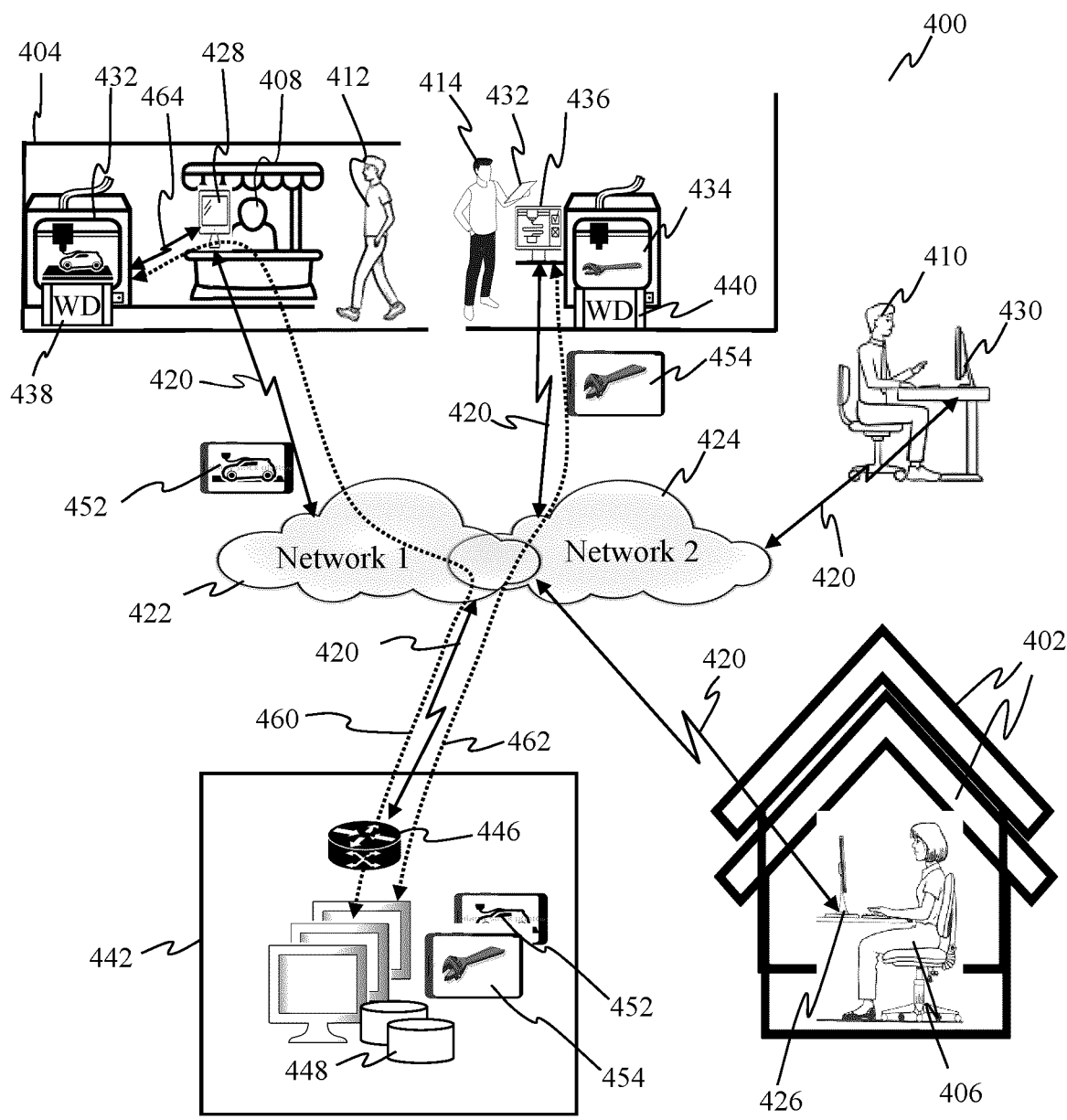
FIG. 4 is a network overview showing a 3D printing embodiment wherein different managers control the use of 3D printing computer devices.
Figure 5:
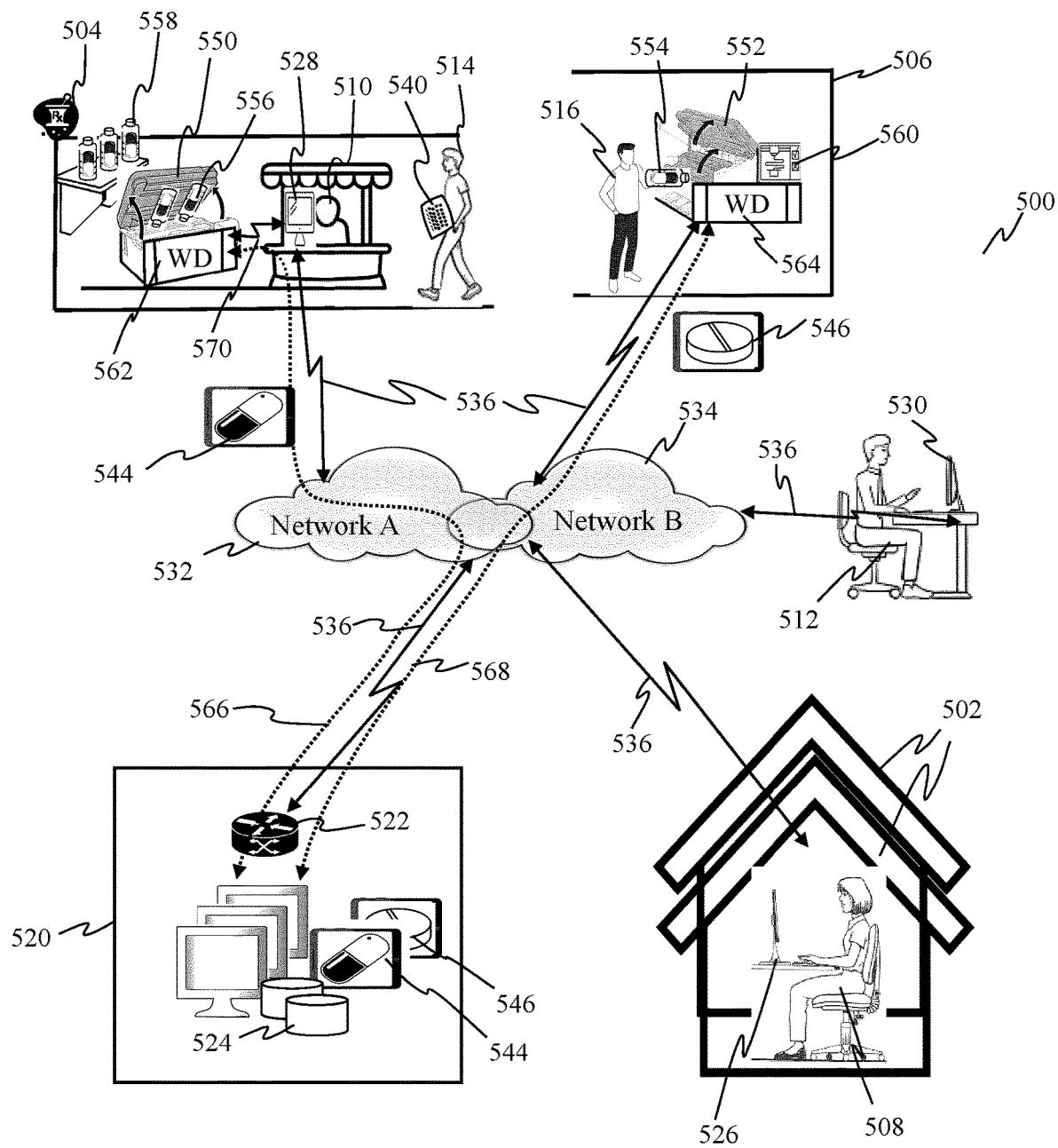
FIG. 5 is a network overview showing a drug replication embodiment wherein different managers control the use of drug-replicating computer devices.

There are many embodiments of the system that will be highlighted by the accompanying figures. FIGS. 1, 2 and 3 illustrate just a few embodiments wherein the system is configured to be suitable for the management of computer devices that deal with important deployment of medicines to patients. There are many embodiments wherein the system can help with issues around 3D printing and protecting the rights of the 3D design and render file owner. Additionally, there are embodiments wherein the system can help with drug distribution when drug printers and 3D drug printers are used to provide limited distribution and use of high-value drugs. FIGS. 4, 5 and 6 illustrate different 3D printing and drug printing embodiments.

Figure 7:
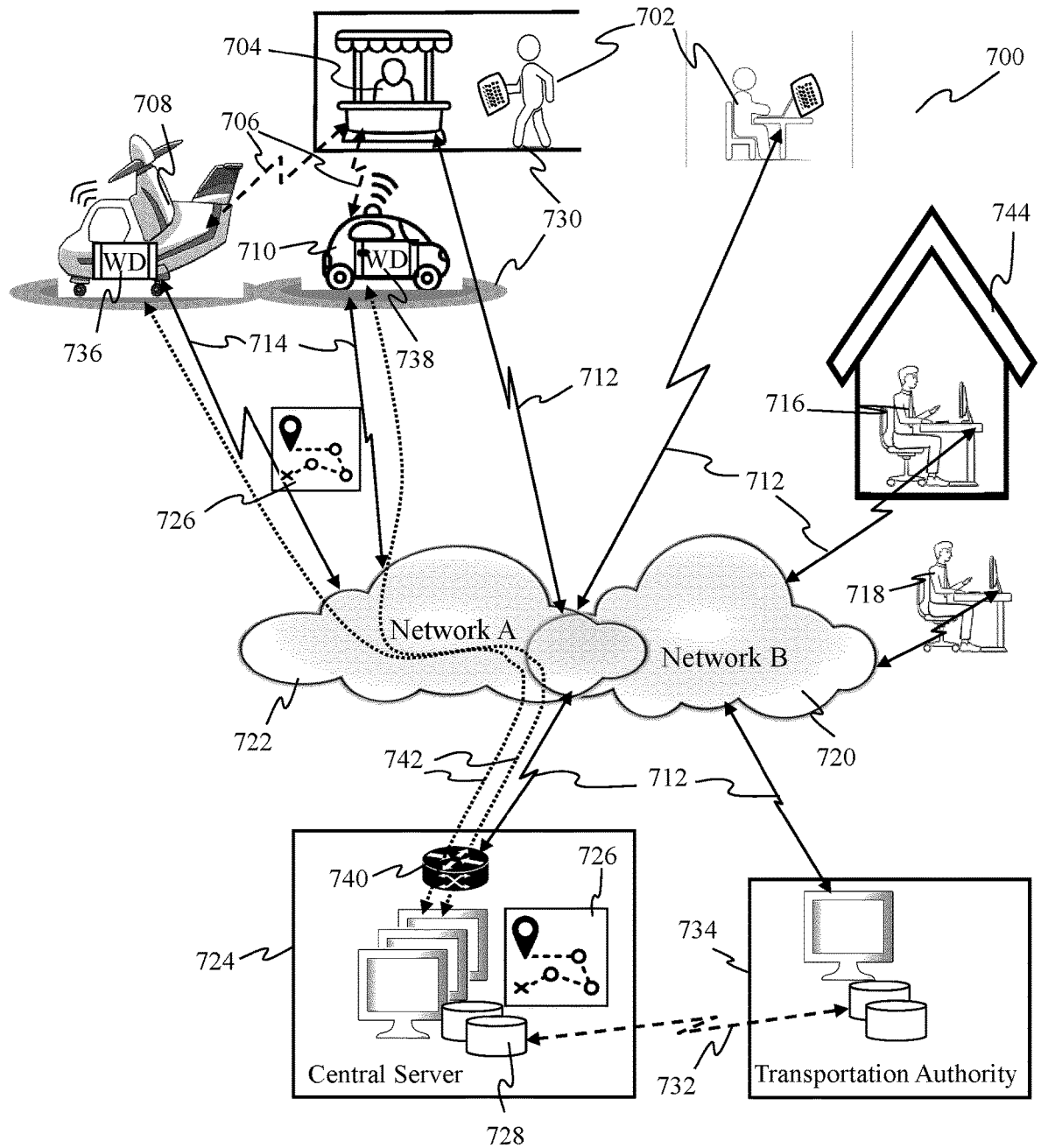
FIG. 7 is a network overview showing a transportation embodiment wherein different managers control the use of independent transportation computer devices.

The system is also suited to control computer devices where granting access to the computer device entails risk and dangers. FIGS. 7 and 9 illustrates just a few examples of how the system can support self-driving drone delivery vehicles that travel by ground or air. There are also examples to illustrate a self-driving rentable transportation computer device, like a self-driving taxi or self-driving vertical take-off and landing (VTOL) computer devices.

Figure 8:
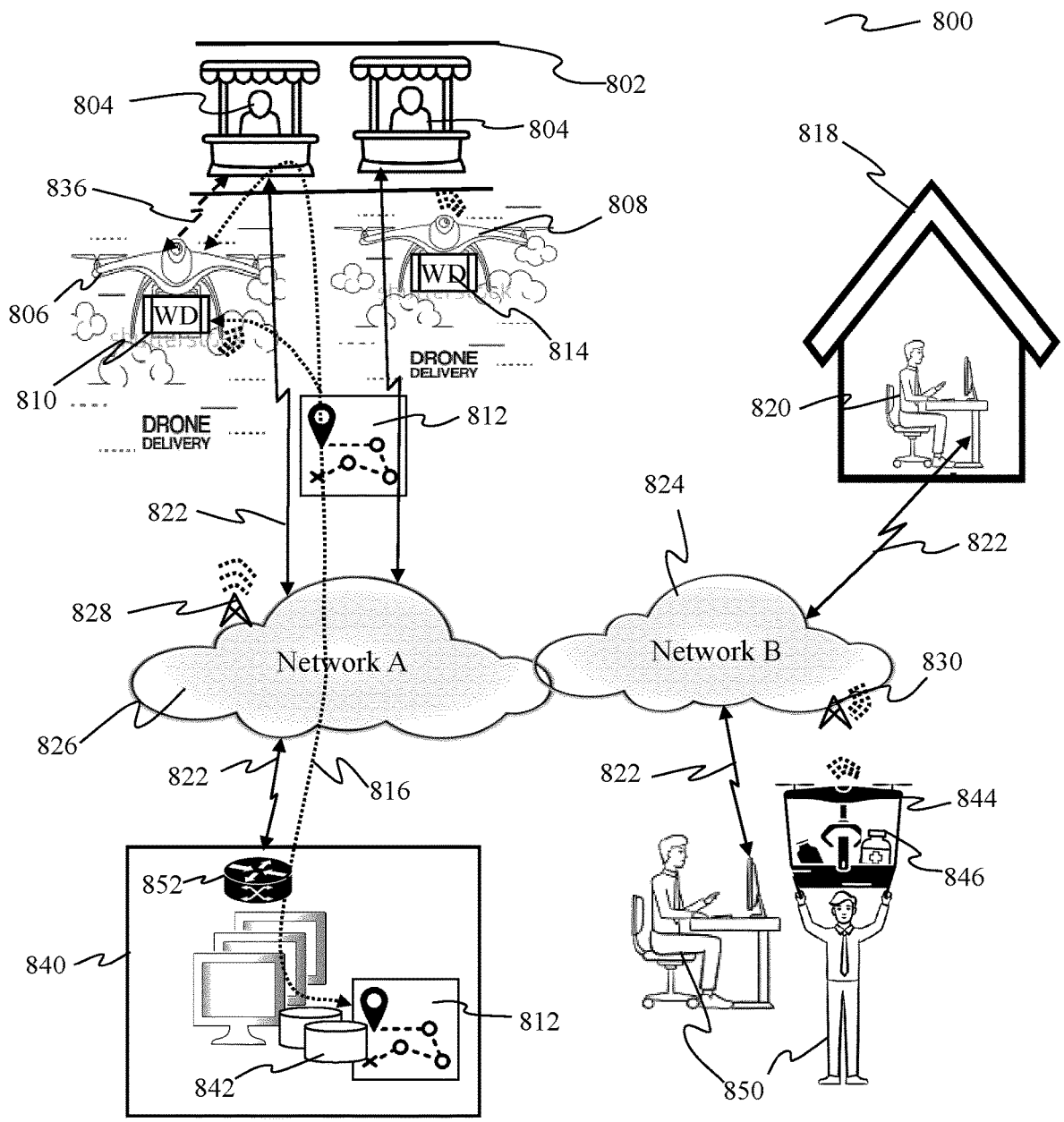
FIG. 8 is a network overview showing a delivery drone embodiment wherein different managers control the use of delivery drones to deliver and pickup packages.

The system is also suited to provide control and monitoring of self-driving package delivery drone computer devices. FIGS. 8 and 9 provides a few embodiments to illustrate how the computer device user can make limited use of self-delivering drone computer devices for package delivery and pickup.

The system provides advanced provisioning and deployment stages to protect the owner's asset investment, track its use, and redeploy the asset quickly and easily. In these systems, a manager trying to take charge of a computer device must first be authorized to do so. Then the computer device user trying to make use the computer device must be provisioned by the authorized manager of the computer device. Once provisioned, the computer device can be deployed to grant limited access and control for the computer device user. The downloaded control-file guides the actions of the control-file watchdog program on the computer device to facilitate these actions.

The design of the system places the central server in authority over the managed computer devices. This principal allows for several advanced features that solve many problems for real-time control of in use computer devices. For example, the system design is particularly well suited to allow the swapping of computer devices between or during active deployment usage. In another example, the system design is well suited to adjust the operation of the computer device during active deployment usage to benefit the computer device user or to provide more safety or control for the manager of the computer device.

The central server offers multi-tiered control over the computer devices using one or more user interfaces, offering different levels of control to computer device managers using a hierarchical method of computer device control. Managers at the top of the hierarchy have the maximum control and able to create or manipulate manager rights below them on the hierarchy. The computer device user has the least amount of control on the bottom of the hierarchy and the rights granted to them is dictated by the various computer device managers above them.

There are many embodiments for how the multi-tiered system supports the overall operation of the closed-loop system. The various embodiments illustrated in the subsequent figures involve three main stages: the authentication stage, the provisioning stage and the deployment stage. These stages may involve various embodiments which will be introduced in this section and highlighted through the figures and data flow charts.

The Authentication Stage

The authentication stage involves two elements. The first element is an authenticated relationship that is built between the central server and software running on the computer device to be controlled and monitored. The second element is the authentication of the one or more managers that will be in charge of the computer device via the central server.

The First Element of Authentication

The first element of authentication in the system starts with establishing a secure connection between a central server and the software program running on the computer device, described as the control-file watchdog program ("control-file watchdog").

There are several ways the relationship between the central server and the control-file watchdog running on the computer device can be established. The relationship is built with a unique computer device identity ("device identity") described in detail earlier in the overview section. This device identity may be created during the manufacturing and provisioning process and is shared between the central server and the computer device. This device identity is accessible to the control-file watchdog to create a secure connection to the central server.

In one embodiment, the control-file watchdog uses asymmetric security (public and private key pairs) and receives the public key of the central server during final software preparation after manufacturing. It also provides the central server with its public key during this exchange and the central server saves all public keys in one of its databases. In this embodiment, the central server acts as the certificate authority (CA). With the central server's public key, it can sign its own public key that the central server has a copy of from manufacturing. Only when the central server uses its private key to decrypt the signed part of the message would the valid public key of the device be found and matched to one that is within the central server's database. This then can be confirmed as having arrived from an authentic and known computer device.

In another embodiment, the computer device could use the server's public key to encode its own unique device identifier and send that to the central server. The central server would maintain a list of all manufactured computer devices' identifiers. Since only the central server could decrypt this value, it could be confirmed as within a valid range of known values and allow communications.

In another embodiment, the device identifier of each manufactured computer device is provided to the central server after being shipped to the field. By using the device identifier, the central server and the control-file watchdog can negotiate a shared symmetric key for encrypting communications later. Once this authenticated relationship is established, an encryption key may be generated for use with all messages.

To ensure complete confidence in the authentication of the computer device it is running on, the control-file watchdog has several embodiments it can follow. The control-file watchdog must be able to absolutely confirm that the computer device it is running on is authentic and the secure messages it is exchanging are accurate. Therefore, protection must be taken to ensure the control-file watchdog is not running on a cloned system. Such a cloned system might be trying to provide similar inputs and outputs to the real computer device. This nefarious activity could be an actor trying to use confusion and device-counterfeiting to invade the central server. There are several embodiments to solve this problem.

In one embodiment the computer device would use a secure enclave methodology. The secure enclave is a protected environment on the computer device, which includes tamper-proof memory and tamper-proof algorithms and programs running in the enclave. This area is tamper-proof and inaccessible outside of the secure enclave. Only protected software running within the secure enclave has access to the memory and can perform actions with information located within the enclave.

In this embodiment, a public and private encryption key pair can be provided by the central server and placed into the secure enclave during manufacturing. The public key would be that of the server and the private key would have been created by the central server for each manufactured computer device. Alternatively, each computer device could create its own public and private encryption keys, save its private key in the secure enclave and give its public key to the central server. With this key pair safely locked away, an encryption method can be employed to ensure only the central server is able to decrypt the data and confirm it is from a known secure source and known control-file watchdog program. This has already been discussed earlier. In this way, the secure enclave offers an encryption service to the control-file watchdog and it will encrypt on its behalf even a small amount of data to ensure the authenticity of the environment.

For example, the computer device identifier could be signed (encrypted) using the private key of the computer device, protected in the secure enclave, to validate the source of any given message by the central server. Then, only using the matching public key of the computer device would it be possible to verify the signature and retrieve a valid and known computer device identifier.

In another embodiment, an electronic signature is provided by the central server and is stored in non-volatile memory at the end of manufacturing. This signature cannot be extracted or changed but can be read and provided to the control-file watchdog every time it needs to send a secure message to the central server. The electronic signature could be unique for every computer device created. These two examples, and others, can provide an advanced level of confidence that the control-file watchdog knows the information it is sending to the central server is secure, authorized and has not been tampered with.

Once fully authenticated, an authentication confirmation message is transmitted over the secure channel to confirm to the control-file watchdog program that the system is known and recognized by the central server. There are many embodiments to provide encryption between a control-file watchdog and the central server. In one embodiment a secure socket layer (SSL) communication method is used with Internet certificates. To ensure client security, client-side certificates can also be generated and used with the SSL connection method. The use of client-side certificates allows the server to act as the signatory of the certificate. Alternatively, a certificate authority (CA) could be used.

As mentioned, this exchange uses one or more encryption methods to protect the information. In one embodiment, SSL can even be used in conjunction with another encryption at the application layer employed by the control-file watchdog directly. Application layer encryption can solve problems arising when multiple network hops are required in the system, which is sometimes the case with IoT computer devices.

In some embodiments, the control-file watchdog also keeps the control-file information encrypted when it is saved on permanent storage for maximum protection against hackers. The encryption might involve an agile encryption methodology. In this embodiment, there might be several different types of encryption methods to encrypt the data using the public/private key pair. The type of encryption selected might be numbered or change periodically to avoid being discovered.

In other embodiments, a seed value might be used to negotiate an encryption key. In this embodiment, the seed value, like a device identification, a SIM value, like the IMSI, or some other value could be used to negotiate a symmetric encryption key to exchange information. Such seed values are used with negotiation protocols like Diffie-Hellman, SSH (Secure Shell), quantum-safe cryptography and SPEKE (Simple Password Exponential Key Exchange). These encryption techniques are linked to the computer device and ensure the highest level of protection.

In other embodiments, when an encryption such as SSL is present and trustworthy, the computer device might use a local encryption method to protect control-files and tracking data that are placed in long-term storage on the computer device. These protecting the 'data-at-rest' methods ensure a file cannot be easily read, hacked, or maliciously damaged by an external force while stored in permanent storage. Locally generated encryption keys are generated by the control-file watchdog on the computer device to be managed.

Such encryption keys use deterministic and non-deterministic methods to collect random and pseudo-random information to act as seed values for key generation. Then an algorithm is selected, such as Advanced Encryption System (AES) in Cipher-based Message Authentication Mode (CMAC), as one example. Once the encryption key is generated, it must be stored in a tamper-proof storage system on the computer device. In this embodiment, key storage would be done using a secure enclave-type storage solution that is tamper proof. In another embodiment, when such storage is not available on the specific computing device, it would require when the control-file watchdog is terminated, all copies of the control-files that have been stored are deleted, so that they will not be able to be read again without a saved encryption key value.

In another embodiment, to protect the data at rest the control-file watchdog sends the locally generated key back to the central server over the secure SSL connection for storage in relation to this computer device. Then, when the control-file watchdog is restarted, it can open a secure SSL connection to the central server and retrieve the locally generated key that already exists.

In another embodiment, each time the control-file watchdog receives a control-file to manage, execute and protect, it is given an encryption key generated by the central server. Then, should the control-file watchdog have to be stopped, or is terminated for any reason, it will request the control-file information again over SSL and receive another encryption key for local storage of the control-files. In these ways, a local strategy for protecting data 'at rest' and 'in transit' can be followed.

The Second Element of Authentication

The second element of the authentication stage involves the manager establishing an authorization with the central server and associating that authorization with a specific computer device. Depending on the environment, there are several embodiments enabling this to take place. These embodiments highlight the flexibility of the system and show how the multi-tiered structure can be implemented in different environments and implementations.

In one embodiment, the company offering a central server that controls computer devices provides the top-most authorization for a given company or industry. For example, if the computer were wanting to offer a drone delivery service or a drug printing service, it might run a central database and set up authorized login accounts for its four largest four regions of a given country. It would then also assign a certain number of computer-devices to those four regions for their direct regional control. It might, for example, have a north-east region, a north-west region, a south-east region and finally a south-west region. The manager of a given region would only be able to see and manage computer devices assigned to their specific region.

The manager of each of the four regions would then be responsible for setting up sub-logins for their specific region. The manager of the region might, for example, divide their region into states, counties, or square miles. In each of these sub-regions, the main manager for the region would assign a certain number of computer devices for that sub-region, which would be assigned for their control. The sub-region manager might manage the sub-region alone, or they might create sub-logins for their sub-region if it is large or busy enough. This process can continue until a manageable number of areas is defined with a manageable amount of computer devices. This is an example of the multi-tiered control of computer devices at the central server.

In another example, a company might have a specific purpose for managing the computer devices that does not involve geographical areas and regions. For example, if a large drug manufacturer were running a clinical drug trial, they might want to create main logins for two or more Clinical Research Organizations (CROs). Each CRO would be assigned a certain number of drug-dispensing computer devices to control, perhaps based on size or the number of patients they were able to attract into the clinical trial. In turn, each CRO would then create sub-logins for each research facility it intended to manage. Then, a certain number of drug-dispensing computer devices would be assigned to the research facility. The manager for each research facility would then create any necessary worker logins for researchers, clinicians, caregivers, nurses, and others working in their organization. These worker logins would only be able to see and have control over drug-dispensing computer devices that had been assigned to their research facility.

In some embodiments, official credentials of computer device managers may be prepopulated in the central server which then acts as the source for manager authentication. For example, when the central server is provided the credentials, it might have come from large, official governing body. For example, when the computer device is in the medical field, such information might come from an organization like the College of Physicians and Surgeons of Ontario, Health Canada, the Medical Counsel of Canada, the U.S. Department of Health and Medical Services, the American College of Physicians or similar regulatory bodies around the world.

By further example, when the computer device is in the transportation field, such information might come from the Department of Transportation for ground transportation in the USA, or the Federal Aviation Administration (FAA) for air transportation in the USA, Transport Canada in Canada, and many, many others. With these credentials prepopulated, a manager of a computer device can provide their personal registration and connection identifiers to be accepted into the central server.

In another embodiment, credentials could be held in an external credential authority, such as a regional or national registry for that type of industry. In these embodiments, it is customary that an API is provided to authorize users and allow access to this information. In these embodiments, the central server requests confirmation on manager credentials through APIs such as Open Authorization (OAuth) APIs, defined within the Internet for such credential exchanges.

In other embodiments, when the central server is within a private organization, for example a company, a hospital, a doctor's office or a clinic, the population of authorized managers might come directly from an internal list of individuals assigned to that role. In those embodiments, where the computer devices being controlled are in the medical area, the central server might be within an organization like a hospital, doctor's office, senior's retirement home or a drug trial clinic. Another example is for use as part of an e-prescription service. Such services are often used to allow doctors and pharmacists to securely exchange prescriptions. This method helps to ensure patients get the safest and fastest support, and that no patient can take advantage of the system to get additional drugs. In Canada, for example, this national prescription management service is called PrescribeIT™.

In other countries, other regional solutions for prescriptions are used. In the United States more regionally-based and product-based solutions for e-prescribing are used like SilconMesa's solution called DrFirst EPCS Gold 2.0, Allscripts Healthcare Solutions, AdvancedMD, AllegianceMD and many more. These external credential services are populated by organizations like the College of Physicians and Surgeons of Ontario, Health Canada, the Medical Counsel of Canada, the U.S. Department of Health and Medical Services, the American College of Physicians and similar regulatory bodies around the world.

In time, a central credential authority for all public auto-transport taxis, self-delivery drones and air-transport VTOL taxis will likely be established to regulate the management and usage of these complex and potentially dangerous devices. In one embodiment, a central database provides an API to confirm authorizations of personal trying to access and use vehicle computer devices for public use in publicly used spaces.

In another embodiment, where no prepopulated credentials are available, a manager of a computer device verifies ownership and control over that computer device. This embodiment leverages the pre-existing authorization between the central server and the computer device and extends it to the manager.

In a first example of this embodiment, the manager might be the first to physically connect to the computer device and take charge of its management. In this embodiment, the information is given directly to the central server by the computer device through its authenticated connection. The connected manager might even be able to add additional managers once authenticated. For example, a pharmacist might be able to add a doctor and a healthcare worker who can also access information related to this computer device.

In a second example, a VTOL owner might add a local site VTOL attendant to control a given computer device that has been deployed to their city. In this embodiment, the computer device is acting as an authorization proxy by extending its authorization around the connected manager.

In a second embodiment, the manager goes to a user interface on the central server and enters login information and the device serial number of the computer device they intend to manage. The device serial number could be a manufactured identifier printed on the computer device, like a sticker or bar code or QR code on the computer device.

Once the manager and any additional managers are defined, the central server creates and maintains that relationship until the current manager relinquishes the computer device or assigns additional managers. Then, one or more of the managers can create and send configuration and control-files to the computer device. The managers can also coordinate their activities between themselves.

In the case where the computer device is in the medical field, drug prescribers and drug dispensers could coordinate their activities to create a safe and secure system for, for example, prescribing drugs, dispensing insulin, prescribing inhaler products or other similar self-administered drugs that require careful limitations. In these embodiments, the coordination between prescribers and dispensers is especially important when dealing with high-risk drugs like opioids, sleeping pills, methylphenidate (i.e. Ritalin™ or Concerta™), benzodiazepines, barbiturates, cannabinoids, anabolic steroids, psychostimulants, or other stimulant type medications and any other drug that might be highly sought after and highly addictive.

In other embodiments, the manager of a self-directed drone delivery service, a self-directed taxi computer device, or some of form of transportation, including ground, air, water, rail, or some other form, will require very strict configuration limits and route direction commands. One or more managers of these computer devices can use the central server to ensure the safe and secure use, while always monitoring access using their authorization. These embodiments highlight the second element in authentication.

The Provisioning Stage

Once the authorization stage is complete, the environment is set for the provisioning stage to commence. The first step in the provisioning stage is having one or more managers work individually or together to create one or more control-files to guide the operation of the file watchdog and the computer device it is overseeing.

In different environments the control-files take on different forms and different names are used to identify them. For example, the process of guiding a drug control-file watchdog's behaviour may be done using prescription information and additional configuration information to create a grouping of information called the drug control-file in.

In the example of a drug control-file watchdog, the drug control-file is a collection of items that can be represented as a continuous file, a collection of parameters in a message or a collection of stored memory parameters in one or more memory locations. The drug control-file is managed through the central server by those individuals that have been given rights to access this information. Between the central server and the drug control-file watchdog, one or more secure identification measures are employed to ensure complete security and exchange of all information including the drug control-file.

In another embodiment, the distribution and control of 3D design and render files would involve 3Dprint control-files. The 3Dprint control-file watchdog requires information to confirm the 3D printer capabilities, the print material that needs to be loaded in the 3D printer, the number of copies the computer device user has rights to replicate and other parameters.

In another embodiment, the control-file has drug replication information and is a replication control-file. In this embodiment the replication watchdog program requires information involving the drug formulation, the number of drugs to be replicated, whether the replication involves a 3D printing process, the material that should be present to ensure the correct drugs are replicated and other parameters.

In another embodiment, the processing of rentable self-driving transportation vehicles is done with one or more route control-files. The route control-file watchdog program requires parameters like biometric information for manager authentication, route guidance, range limitations, identification information for one or more computer device users and other parameters. The collection of these parameters would be done with the guidance of the central server and they might be stored as a single file or a collection of database items that are sent as a parsable message using a format like JavaScript Object Notation (JSON).

Provisioning starts with building of the one or more control-files for the computer device being controlled, by one or more of the authenticated managers.

After the creation of the control-files, the next step in the provisioning stage is the secure exchange of the control-files between the central server and the control-file watchdog running on the computer device. As mentioned, in some embodiments the control-file is created on the central server and downloaded to the computer device and in other embodiments it is created on the computer device and uploaded to the central server. Secure links and encryption methods to exchange this control-file have been discussed in detail earlier.

With the control-files exchanged and protected, the computer device can be accessed by an authorized manager for the next step in the provisioning stage. With full access to the computer device, the local manager can perform a visual inspection and perform the preparation needed to deploy the computer device. In some embodiments, after visual inspection the computer device must be loaded with equipment or operational material.

In some embodiments related to medical devices, a drug dispenser will be allowed to load drugs into the drug-dispensing computer device that exactly match the amounts specified in the drug control-file. These drugs could be physical pills, liquid or solid insulin medication, nasal sprays, ear sprays or some other forms of drugs. In some of these embodiments, the matching process can be confirmed using various physical pill scanning methods as the drugs are inserted into the drug dispensing computer device. For example, the pill itself might have a bar code, Q-code or some printed indicators identifying the exact composition of the pill.

In some embodiments, related to 3D printing and product replication, a local attendant might follow the one or more 3Dprint control-files to load certain types of material into the 3D printer once they have gained access to it. In the case of drug replication, the local manager or computer device user might be granted limited access to the drug-replicating computer device in order to place a cartridge of material that will be used to secretly create the drug formulation necessary to create the required drug.

In other embodiments related to transportation vehicles, a local site attendant might clean the transport vehicle, load additional types of energy to the vehicle, for example electric power packs, some form of gas, or a hydrogen canister, for example. The local site attendant will match the instructions within the route control-files to know how much energy to include in the vehicle based on the distance the vehicle has been booked for. In one example, the local manager might then load a package within a self-delivering drone computer device that exactly matches the bar code or UPC code that is expected and matches the value in the route control-file.

Once the computer device is examined, prepared for use by the manager and any internal work and preparation is complete, it can be closed and ready for the final stage of provisioning. The final step in provisioning involves the provisioning of the computer device user's identity ("user-identity") for the eventual confirmation and usage confirmation by the computer device user. There are many embodiments of this user-identity provisioning step based on how the computer device user has come to want or need to use this computer device. The term user-identity is used to include both biological elements of identity and digital forms of identity. Most forms of digital identities using tokens and other verifiers are all based on online multi-factor authentication steps which includes one form of biometric provided by the computer device user.

In some embodiments in the medical field, the computer device user is a patient who has gone to a doctor and then a pharmacist to acquire a medication for an ailment. At either stage they might have provide their digital identity or biometric identity as part of the prescription process. In these embodiments, this user-identity might be already uploaded to the central server ready to be used to confirm the computer device user. In other embodiments, this is the final stage where the drug prescriber is able to take one or more user-identity inputs based on basic requirements or the requirements added to the drug control-file. The details of these potential user-identity inputs are found in subsequent figures.

In other embodiments, a computer device user wanting rights to make a 3D replication might have preformed a financial transaction via a public Internet service selling 3D replicated products. They might have provided a digital identity, a fingerprint identity from their cell phone or an OAuth-based identity exchange has taken place. In embodiments where drug replication rights are acquired by a computer device user, the central server might have generated a unique identity token and provided it to the computer device user using a secure communication path. For example, an out-of-band communication method like an SMS text message to the computer device user's cell phone would provide a secure method for the computer device user to keep and show the token later. The token could be in the form of a Quick Response code (QR code) sent to a computer device user's personal computer that could be held up to a scanner provided at the managed computer device at the time of use.

In other embodiments in the transportation field, the computer device user might have purchased a transportation fare online and provided either a user-identity in the form of a biometric or digital identity token as part of the transaction. They might even have a sub-dermal implant that enables a quick near field communication (NFC) method of touch to confirm the identity of the receiver. In other embodiments, this could also include identity chip cards or NFC identity from a cell phone, wearable device like a watch or some other computer device. In these embodiments, the manager of the transportation vehicle would re-confirm the computer device user's user-identity with the user-identity within the route control-files.

In another embodiment in the package delivery field, the computer device user might have ordered a package and requested a special drone delivery option. They might have provided some form of user-identity to confirm the delivery of this package to themselves and no one else. They could have uploaded a facial scan, a fingerprint from their cell phone or some other form of digital identity. They might even have a sub-dermal implant that enables a quick near field communication (NFC) method of touch to confirm the identity of the receiver. This information would then be provisioned by one of the managers or the central server in the construction of the route control-file for this package delivery.

In this application, user-identity is defined as anything directly related to the computer device user wanting some limited control over the managed computer device. It could be in the computer device user's possession, some inherent to the computer device user like a biometric, or something generated by the central server and provided to the computer device user. In some embodiments, a multi-factor identity is used so more than one of these identity values could be used to increase the security verification process. When a biometric is involved, the computer device user's user-identity can include biometric information like fingerprints, facial recognition, voice recognition, palm scan, deep vein scan, retina scan and any combination of these different biometric methods.

Identity might also include biomedical data related to the computer device user. In this application, biomedical data refers to information physically related to a drug consumer. In those embodiments involving a drug consumer, the biomedical data could also include urinalysis results, blood pressure and heart rate results, EKG results, EEG results, blood results, stool analysis, urine test strip results, saliva analysis, tear drop analysis or many other possible identifiable parameters about the drug consumer. Additionally, biomedical, or biometric information could include photographic or video information. This information could be used to set baseline profiles for the patient to see how a given drug was affecting their body over time.

For example, a computer device user trying to rent a VTOL type of vehicle might undergo a blood pressure test before they leave on a very stimulating and even exhilarating flight. This information could be used to confirm they do not have heart issues and to set a baseline for their normal blood pressure. Then, during the exhilarating trip, they might have to re-check their blood pressure to ensure the effects of flying does not cause a medical event during the route.

In another example, an initial photograph taken at this final provisioning step might be preformed in front of a drug dispenser to confirm the visual identity of a drug consumer and then subsequent photographs can be compared to it. Then, during the deployment of the drug-dispensing computer device, the drug consumer will have to take additional photographs showing the drug consumer placing a pill in their mouth as biometric evidence of drug consumption. In another example, a drug consumer takes a photograph of a urine test strip and provides that as a status result from taking their medication.

When all the identity information is collected and provisioned by the system to the file watchdog's satisfaction and configuration requirements, including all digital identity data, all biometric and all biomedical data, the system has reached the fully provisioned stage. Once the fully provisioned stage is reached, the computer device sends a secure identity received message to the central database to inform it of the state change. Once in the fully provisioned stage, there are several embodiments for how the central database may use and act upon this information.

In some embodiments, the central database will immediately send a begin deployment command and move the computer device into the deployment stage. For example, if a drug consumer has received their first drug-dispensing computer device and has provided their user-identity, it might be directly deployed by the central server and start operating. In this embodiment, the drug consumer may be required to provide the matching user-identity each time a dose of drugs is available in order for the drug-dispensing computer device to extract a certain amount of medication.

In another example, when the renter for a self-driving taxi gets into the vehicle and it is closed, they can then provide their matching user-identity. At this moment, the central server is told that full provisioned stage is reached and can immediately begin the deployment command, causing the vehicle to start moving.

In another embodiment, a drug consumer might have been given a second drug-dispensing computer device with the exact same medication as a first drug-dispensing computer device. In this example, only after the first device is empty of drugs, would the second device receive the begin deployment command to begin dispensing drugs. This is called the hot-swap method of deployment.

In another example, a self-guided drone delivery computer device might have had the package inserted. It can then be closed and a user-identity might be downloaded to it from either the central server or a local drone manager. When this is complete, the central server receives the secure identity received message but does not send the begin deployment command. Instead, the route control-file watchdog might move the drone to a new destination before it receives the begin deployment command. In other cases, the route control-file may be given to a flighting system for execution to move the drone to a new location. In these embodiments, only when the drone reaches the GPS location that matches the GPS location within the route control-file will the begin deployment command be issued. With the begin deployment command received, the drone would then wait for user-identity confirmation before opening the drone's inner compartment to allow the package to be removed from inside.

The Deployment Stage

The deployment stage occurs when the control-file watchdog allows the limited use of the managed computer device by a computer device user. In some embodiments, the control-file watchdog executes the one or more control-files by opening, reading, and processing the information. In some other embodiments, the control-file watchdog simply oversees the activity of the control-file usage by one or more authorized programs.

The control-file watchdog executes the one or more control-files to control operation of computer devices. The term control-file here can refer to a message containing gathered information to be exchange in a common message format like JavaScript Object Notation (JSON). Such exchanges of parsable data is one method for exchanging a collection of related data elements using a virtual construct file. Executing parts of the information within the control-files can involve setting up timers, triggers, hardware interrupts, events and other actions to guide the behaviour of the computer device.

In the example of a medical device, the guidelines and rules from the original prescription found within the control-file data, are managed, and enforced by the drug control-file watchdog after the drugs are secured within the drug-dispensing computer device. During the deployment stage, the drug control-file watchdog provides tracking information for detecting events that transpire on the drug-dispensing computer device.

In the example of 3D replication and drug replication, the replication watchdog program manages replication activities and reports back on the progress and success or failure of the replication process. The replication watchdog might provide the 3D render files within the replication control-files to an authorized 3D slicer program to submit layer-by-layer to a 3D printer or drug-replication computer device.

In the example of a transportation device, the guidelines and rules from the original route purchase information, found within the control-files, are managed by the route control-file watchdog after the passengers are safely aboard the transportation vehicle. In this embodiment, the route control-files might guide progress numbers of site attendants as the transport vehicle hits different transfer and exit or entrance points. The route guidance might be performed by the route control-file watchdog, or it might allow a route-guidance specific program to take charge of the information and guide the vehicle. In some embodiments, it would be possible to request a user-identity verification to ensure the occupants are verified for the next leg of the vehicle's journey.

In some situations, there may be breathalyser tests performed on one or more of the occupants where greater danger is involved, for example in the case of travelling via a high-speed VTOL vehicle. All this tracking information would be relayed back to the central server for the specific computer device.

In other examples in the medical field, whenever drugs are consumed, drug supplies begin to run low, low power issues are detected, or others specific events take place, information concerning these events can be relayed to the central server. Further details on these messages are provided herein. For computer devices in the medical field, authorized health support workers can then see these messages on a connected interface and be warned via alerts when serious issues arise.

In other examples in the transportation field, issues around power or low energy settings might trigger alert messages to the site vehicle attendant, the regional manager or the national manager. These individuals might then make important decisions around performing an early emergency landing before power has been exhausted.

Turning now to FIG. 1, there is an illustration of a network 100 showing a medical embodiment wherein drug prescribers 104 and drug dispensers 114 work to prescribe drugs 118 to drug consumers 106. In this embodiment, many of the managers 104, 114 of computer devices 122, 126, 128 are professionals like pharmacists, doctors, nurse practitioners, dentists and others in similar roles. There are embodiments wherein managers like drug prescribers 104 and drug dispensers 114 work on their own and other embodiments wherein they are working inside a much larger organizational structure 152.

The design of the system places the central server 134 in authority over the managed computer devices 122, 126, 128. The central server 134 has an interface 146 to create a secure data communication channel 170 to the control-file watchdog program 160, 162, 164 running on the computer devices 122, 126, 128.

This central server 134 authority allows for several advanced features that solve many problems for real-time control of in-use computer devices. For example, the system design is particularly well suited to allow the swapping of computer devices 122, 126, 128 between or during active deployment usage. As another example, the system design is well suited to adjust the operation of the computer devices 122, 126, 128 during active deployment usage to benefit the computer device user 106 or to provide more safety or control for the manager 104, 114, 154 of the computer devices 122, 126, 128.

In FIG. 1, when a drug consumer 106 gets close to the end of a portion of drugs 118 within a drug-dispensing computer device 122, 126, 128, a second drug-dispensing computer device 122, 126, 128 can be provisioned and delivered to the drug consumer 106. Then, when the first computer device 122, 126, 128 distributes its final dosage or drugs 118, the central server 134 will activate the deployment of the second computer device 122, 126, 128. Within this application, this is termed the hot-swap method of computer device 122, 126, 128 usage. It can be performed safely as the central server 134 will leave the second drug-dispensing computer device 122, 126, 128 in a completely unusable state until the precise moment it knows the first drug-dispensing computer device 122, 126, 128 is no longer needed. It can then stop the deployment of the first drug-dispensing computer device 122, 126, 128 and turn on the deployment of the second drug-dispensing computer device 122, 126, 128.

As described in detail in the System Overview, the central server 134 and the computer device 122, 126, 128 use the device identifier to create a secure communication channel 170 between one or more CPUs on the central server 134 and the control-file watchdog 160, 162, 164. Over this secure communications channel 170, management and control over the computer device 122, 126, 128 can take place for one or more managers 104, 114, 154 over the computer devices 122, 126, 128. Once the computer device 122, 126, 128 has received the authentication confirmation message over the secure channel 170, it can proceed to allow assignment of the computer device 122, 126, 128.

When a larger organizational structure 152 is involved, there may be one or more managers 104, 114, 154 overseeing operations and creating one or more tiers of control in the entire system. For example, a hospital 152 drug consumption overseer 154 might allocate and monitor drug-dispensing computer devices 122, 126, 128 to different departments 112 of the hospital 152. For example, some may go to the geriatric department, some to surgical department and some to the psychiatric ward. Drug dispensers 114 in each of those departments 112 with assigned drug-dispensing computer devices 122, 126, 128, can then take charge of only those drug-dispensing computer devices 122, 126, 128 and no other ones.

The senior manager 154 of all departments can, unlike the drug dispensers 114, see the information and assignment of all drug-dispensing computer devices 122, 126, 128 as they have a different authorization level and tier than the drug dispensers 114. In this way, a higher tier of management 154 has control over different collections of drug-dispensing computer devices 122, 126, 128 and can move them between departments 112 as needed to handle usage demands and changes within the organization.

In another example, a large multinational pharmacy 152 might have one or more managers 154 for different regions of the country. The manager for a region may be given a certain number of drug-dispensing computer devices 122, 126, 128 to distribute to specific pharmacies in their region. Drug dispensers 114 in that region can be assigned to a tier of authority for just those drug-dispensing computer devices 122, 126, 128 that are assigned to their specific pharmacy.

In another example, a clinical drug trial might be started and managed by either a drug manufacturer or a Contract Research Organization 152. This might involve one or more managers 154 working together to locate research centers 112 who will help run their clinical trial. The manager 154 could then create a lower tier for each research center 112 and allocate a certain amount of drug-dispensing computer devices 122, 126, 128 to that research center 112. Within that research center 112, would be drug trial managers and clinicians 114 who are dealing with patients in the clinical drug trial. The clinicians 114 would then have visibility and control over just those drug-dispensing computer devices 122, 126, 128 that have been assigned to their research center 112 and no others.

As demonstrated by the above examples, there are many potential ways that a multi-tiered control and management of drug-dispensing computer devices 122, 126, 128 can be supported by the system. As control is greater at higher tiers in the system, it is possible for those managers at the top to see all the information that the lower tiers can see and more information that the lower tiers cannot see. They may also able to get notifications and alerts for whatever they might want to be monitoring.

In the example system in FIG. 1, the system starts with a drug consumer 106 getting assigned a drug prescription 108 in some fashion. In many embodiments, this would come from a drug prescriber 104. In some embodiments, the prescription 108 is a drug trial protocol prescription which is assigned to every patient 106 participating in the drug trial from a clinician 104 running the research center supporting the drug trial. The drug prescriber 104 is usually a licensed professional, such as a nurse practitioner, a dentist, a pharmacist, a physician, a drug trial clinician, or any other person who is authorized to issue prescriptions, who can write prescriptions 108 for drug consumers 106. The licensed professional could be a scientist or clinician running a clinical drug trial. These people 104 might be working in many possible locations 102, like doctor's offices, hospitals, clinics, drug trial research center, emergency departments or similar health care locations.

In some embodiments, paper prescriptions are used 108. In other embodiments prescriptions are written out on computers 110 either within the drug prescriptions office or through an external computer server. In these embodiments, the drug prescriber 104 is using an e-prescribing system through their computer 110. In those embodiments where an e-prescribing system is available, these prescriptions may or may not be handed to the drug consumer 106 to hand-carry to a drug dispenser 114.

Each of the computers shown 110, 116, 172 could be a desktop computer, a laptop computer, a tablet computer, a smartphone, or any computer system capable of allowing input of prescription information through a specialized application or through a web browser. In some embodiments the computers 110, 116, 172 open a connection over a data communication pathway 120 over one or more networks 130, 132 to external computer systems.

In some embodiments, the external computer is a e-Prescribing authority 148 running an e-prescription system like PrescribeIT™ in Canada. An e-Prescribing Authority 148 can be used by certified doctors (all drug prescribers) and by certified pharmacists (all drug dispensers) to establish a prescription for the patient 106. Various organizations, individuals and institutions can become a part of the e-Prescribing system 148 with the right computer software and by registering themselves with the authorities that run the authorization database for the system 148. In the United States, more regionally-based and product-based solutions for e-prescribing are used, like the SilconMesa's solution called DrFirst EPCS Gold 2.0, Allscripts Healthcare Solutions, AdvancedMD, AllegianceMD and many more.

In these embodiments, the drug control-file 136 (control-file) containing the prescription script and other operational parameters, can then be built by interfacing 150 to the e-Prescribing Authority 148. This interface 150 can be used to extract the prescription information before sending it securely to the correct computer device 122, 126, 128 using the central server 134. These e-Prescription Authority systems 148 offer open application program interface (API) methods 150 to interface, update and extract information for any authorized personal. The PrescribeIT™ system in Canada for example offers a REST API (representational state transfer), for the purposes of allowing different computer systems to create, modify, locate, and manage the use of the prescription information.

In another embodiment, the drug prescriber 104 is not part of an e-prescribing solution and uses the central server 134 directly to first create a prescription. In some embodiments, the drug prescriber 104 will use their digital identity to access the e-Prescribing Authority 148 or the central server 134. Many new national digital identity solutions are appearing for this very purpose. In Canada, an early digital identity solution created by many of Canada's largest national banks is Verified.Me. The Digital ID & Authentication Council of Canada (DIACC) is also forging a new specification that would work across all services, vehicle, medical and financial services to name just a few. In the U.S., the National Institute of Standards and Technology (NIST) is devoting considerable resources to define digital ID practices.

In another embodiment, given the high-risk nature of some drugs being prescribed, the drug prescriber 104 might be authenticated with their own biometric input that has been previously saved in the e-Prescribing Authority 148 or the central server 134. In some cases, a sub-dermal implant can be used to establish an identity using an RFID, a low frequency transponder, or near field communication (NFC) type device that works on contact.

To facilitate the involvement of the drug prescriber 104, a user-friendly interface 144 may be provided to the central server 134 when accessing the database files 140 used for inputting the drug consumers' 106 prescription and eventually for locating a drug consumers' 106 prescription by a drug dispenser 114. In some embodiments, drug prescribers use Electronic Medical Record (EMR) software to manage patients and build prescriptions. Many of these EMR software systems are capable of working with external e-prescription services like a e-Prescribing Authority 148.

With the drug prescriber 104 selected, the drug consumer 106 looks towards a diagnosis and drugs to be prescribed 108. There are many embodiments as to what happens at this stage. One of the main requirements for the drug prescriber 104 is to acquire proper identification (user identity) from the drug consumer 106. Drug consumer 106 user identity is important as it ensures the person who is prescribed the drugs is the same person taking the drugs.

Once acquired, the user identity must match throughout the prescribing and dispensing process. There are many possible embodiments to ensure an accurate identification is provided. As the world of digital identity evolves and national digital identity services grow, the drug consumer 106 might use a digital identity token, a digital identity card, or many other options to verify who they are.

There are now some countries providing a sub-dermal implant, as already discussed, that can act as a unique user identify for a drug consumer 106. These sub-dermal implants use a form of RFID called near-field communication (NFC) to energize and then identify the holder of the sub-dermal implant. In some embodiments these and other forms of identification are possible to confirm to the drug prescriber 104 that the drug consumer 106 standing in front of them is exactly who they claim to be. Currently, in Canada, the main identification used for health-related issues is a provincially-issued health card number. In the USA this could be a drug consumer's 106 social security number (SSN), their Medicaid or Medicare number, a driver's license, a state issued identity card or a passport number. In other countries. other unique number-based or name-based identifiers could be used.

In some embodiments, a drug consumer 106 might not have proper identification. Perhaps they are homeless, they do not have identification with photo and address information present, they are a new immigrant, or not have official ID for many other possible reasons. In these embodiments, it is possible for the drug prescriber 104 to possess a drug dispensing computer device 122, 126, 128 or a compatible biometric reader for the sole purpose of taking a biometric from the drug consumer 106 and uploading it to the central server 134. The biometric would then become associated with the drug control-file and in some embodiments, it would be uploaded to the drug dispensing computer device 122, 126, 128 for drug dosage authorization. Once this is done, the drug consumer 106 performs the same step at the drug dispenser's location 112 in order to be matched to a drug control-file 136. In severe cases of drug abuse and drug addiction, these types of extreme measures may be necessary to reduce abuse associated with high-risk drugs.

In other embodiments, the system requires that a biometric be taken from every drug consumer 106 and uploaded by the drug prescriber 104. In yet further embodiments, the drug prescriber 104 only takes the information they can easily acquire, for example the name of the drug consumer 106. In this embodiment, the drug dispenser 114 could take a biometric from the drug consumer 106 and the central database 134 could scan all current and past drug control-files 136 to ensure this drug consumer 106 is not trying to abuse the system.

In another embodiment, the drug prescriber 104 could not be initially involved with a e-Prescribing Authority 148 or a central server 134. In these embodiments, using an older style system, the drug prescriber 104 would write up a physical prescription for the drug consumer 106. It is also possible that the drug prescriber 104 could use an independent prescription system, like an inter-office Electronic Medical Record (EMR) system to interact with the patient which provides them a printed slip of paper with their prescription detailed. In these embodiments a nefarious drug consumer 106 might be able to shop around to many different drug prescribers 104 to get several prescription slips 108 in order to double and triple dose on their drugs. In these embodiments, if the high-risk drug must use the tamper-proof drug-dispensing computer device 122, 126, 128 and the central server 134, they would be caught doctor shopping and will not be able to get multiple prescriptions 108 of the same type. If they are allowed to have multiple drug-dispensing computer devices 122, 126, 128 with the same drug, the central server 134 would only allow the deployment of a single drug-dispensing computer device 122, 126, 128 at a time.

When using a tamper-proof drug dispensing computer device 122, 126, 128, there are many embodiments wherein the drug control-file watchdog 160, 162, 164 may be running on a small drug-dispensing computer device 122, 126, 128 to protect its operation. In some embodiments, the computer device has communication capabilities, for example cellular, or LTE-M1 (Internet of Things—IoT) capable device with a CPU to perform a larger number of functions.

The drug control-file watchdog 160, 162, 164 can send status and tracking information back to the central server 134 regarding the computer devices 122, 126, 128 operation and interaction with the drug control-files. It can also report on activity by the different authorized managers 114, 154 and computer device users 106 of the computer device 122, 126, 128.

To ensure the ability to enforce a limited use on the computer device user 106 (drug consumer), the drug dispensing computer devices 122, 126, 128 may be tamper-proof. This helps to prevent drug consumers 106 from gaining access to excessive amounts of highly addictive medications. The system may be designed to provide limited access to the drugs in the drug dispensing computer devices 122, 126, 128. The drug dispensing computer devices 122, 126, 128 and associated drug control-file watchdog acts as a control and multi-tiered access point to load and access the drugs 118 contained inside. In another example, when using a digital insulin injection device 128, the software program might be referred to as the insulin control-file watchdog 164.

In the system illustrated in FIG. 1, with one or more prescriptions in hand, the drug consumer 106 proceeds to look for a drug dispenser 114 capable of supplying a drug-dispensing computer device 122, 126, 128. Prescriptions are filled by a drug dispenser 114, which could be a doctor, a pharmacist, a dentist, emergency medical technician (EMT), home care aides, midwife, nurse or other individuals who are authorized to fill a prescription or dispense drugs 118. As part of the dispensing of the drugs 118, the drug dispenser 114 is also responsible for the provisioning of the drug-dispensing computer device 122, 126, 128.

In these illustrations, the computer device 122, 126, 128 might be a tamper-proof drug dispensing computer device 122, a tamper-resistant drug dispensing computer device 122, a digital puffer computer device 126, a digital insulin pump computer device 128, an IV machine computer device, or many other types of advanced drug deployment computer systems being sold or used on patients 106. In some embodiments, one or more of these computer devices 122, 126, 128 might be deployed to the same computer device user 106, for example if they are extremely sick and need advanced help to monitor, guide and track their drug consumption.

Drug dispensers 114 are tasked with the responsibility of completing the drug control-file 136 related to the drugs 118 they are dispensing. The intention of the drug dispenser 114 is to ensure that drug prescriptions 108 are followed precisely, for the safety by the drug consumers 106. Drug dispensers 114 might be located in many possible locations 112. They could be in a hospital, in a pharmacy, at a person's home, in an emergency department, in a doctor's office or anywhere where drugs 118 are kept for physical distribution. In some cases, often in smaller communities or when the doctor is distributing samples of a new drug, the drug prescriber 104 may also be the drug dispenser 114. In these embodiments, the computer device 122, 126, 128 may reside in the drug prescribers 104 location 102 and they may complete the drug control-file 136 work at the central server 134.

With the drug consumer 106 arriving at the drug dispenser's 114 location 112, the drug dispenser 114 must authenticate themselves to the e-Prescribing Authority 148 or the central server 134. As with the drug prescriber 104, the drug dispenser 114 may be required to use a digital identity, for example, a pre-established authenticated login created by an accreditation body or a biometric input.

In those embodiments using a digital identity, the presence of a national digital identity service is one of the best options and in different countries that type of solution will soon be available as discussed earlier. In embodiments needing an accreditation body, there are various accreditation bodies for pharmacists around the world. For example, in Canada there are regional and national bodies, for example the Ontario College of Pharmacists in Ontario, Canada and the Pharmacy Examining Board of Canada in Canada. In the United States, the National Association of Boards of Pharmacy is available and, in other countries, there are comparable pharmacy boards. The success of any shared e-Prescribing system 148 depends on accurate authentication information being present in the database files.

With their authentication in place, the drug dispenser 114 identifies the drug consumer 106 accurately and determines if the drug prescriber 104 has started an electronic, sharable prescription script 108. As discussed, in some embodiments, the drug prescriber 104 has used an e-Prescribing Authority 148 or the Central Server 134, and in some other embodiments they might have done their own independent prescription 108. In some embodiments, the drug dispenser 114 will be able to look at the piece of paper provided by the drug prescriber 104 and know immediately what they have done and whether data-sharing is possible.

There are several embodiments for drug prescribers 104, drug dispensers 114 and drug dispensing computer devices 122, 126, 128 to communicate to the one or more networks 130, 132. In some embodiments, the drug prescriber 104, drug dispenser 114 and drug dispensing computer device 122, 126, 128 are connected 120 to a network 130, 132 that can reach the same central server 134. They might be on the same network 130, or on different networks 132 that can both reach the same central server 134. In some embodiments, a wireless network 132 goes through a public network like the Internet 130 to reach the central server 134. In other embodiments, the computer 144 running the central server 134 might have multiple connections 120 to different networks 130, 132. In some embodiments the network 130 is a publicly available network like the Internet. In other embodiments, it could be a closed private network within a hospital, medical facility or drug testing laboratory.

Connections 120 from computer systems 110, 116, 122, 126, 128, 172 to the central server 134 can use many different wired and wireless protocols. The central server 134 has a communications interface 146 to facilitate connections to one or more networks 130, 132 as needed to ensure that a communication channel 170 can be created to each of the computer systems 110, 116, 122, 126, 128, 172. In addition to the physical connections to wired 130 and wireless networks 132, many embodiments use standard Internet protocols, low-level protocols like UDP (user datagram protocol), which are common on IoT network with small devices, or more complex protocols like TCP/IP (transport control protocol and Internet protocol).

Through these connections, additional protocols like DTLS (datagram transport layer security) and SSL (secure socket layer) can be added to provide a strong underlying encryption for the communication. These protocols and others can be used to facilitate the communication necessary to work with the central server's 134 interface 144. In this embodiment, the computers 110, 116, 172 might use an Internet-capable browser to facilitate the interface 144 to the central server 134. The central server 134 might be a cloud-computer offering which facilitates access to the central server 134 available in a wide geographic region. In those environments where DTLS or SSL could not be used, custom protocols and security method can be employed to ensure a secure communication path to the central server 134 is created.

The common central server 134 is used to manage the drug dispensing computer devices 122, 126, 128, to control drug control-files 136 and collect all tracking information when deployed. Drug prescriber 104 and drug dispenser 114 have different choices as to how they participate with the central server 134 in the creation of the drug control-file and the viewing of tracking information provided by the drug dispensing computer device 122, 126, 128.

If the drug prescriber 104 has used an e-Prescribing Authority 148, the drug dispenser 114 can determine this and look-up and find the matching prescription created for this drug consumer 106. In many embodiments, the drug dispenser 114 uses a pharmacy management system (PMS) that is capable of working with external e-prescription services. These PMS software solutions are user friendly, provide software solutions built for extensibility, and have application program interfaces (APIs) to enable extension to support a solution like a drug tracking and monitoring dispensing computer devices as described in this patent.

In other embodiments, where the e-Prescribing Authority 148 was not used by the drug prescriber 104, the drug dispenser 114 has the option of using the e-Prescribing Authority 148 or going directly to the user interface 144 provided by the central server 134. Here, the process of building one or more control-files, called the drug control-file, can be finished and the drug-file can be downloaded to the drug control-file watchdog 160, 162, 164 running on the drug-dispensing computer device 122, 126, 128 that is best suited to help dispense the type of drugs needed. One embodiment of a drug control-file 136 is illustrated in FIG. 3.

With the drug consumer 106 arriving at the facility 112 (medical facility, office, home, or many others) the drug dispenser 114 picks an available drug dispensing computer device 122, 126, 128 that best suits the needs of the drug consumer 106, for example, based on the type of drug that has been prescribed 108.

In one example, the drug being requested are high-risk pills or capsules, and a tamper-proof drug-dispensing computer device 122 is used to house the drugs and dispense them one dose at a time based on the dispensing guidelines established by the drug prescriber 104. In another example, the drugs must be kept away from children and carefully given to teenagers, like Ritalin™ for example. In this example a tamper-resistant drug-dispensing computer device or even a computerized pill bottle could be selected as the drug dispensing computer device 122.

In another example, the drug-dispensing computer device 126 is a digital inhaler 126 as the drugs must be inhaled. In this case, the dose prescription and control-files will guide and limit the drug consumer 106 to ensure they follow the recommended dosing procedures. Failure to protect a drug consumer 106 when using an inhaled substance can lead to severe injury or even death for very strong formulations.

In another example, the drugs are insulin based and are loaded into a digital insulin pump 128. Many of the new digital insulin pumps 128 can be worn in conjunction with a continuous glucose monitor (CGM) device that feeds information to the drug dispensing computer device 128 to determine which level of insulin to provide the drug consumer 106. The drug control-file 136 in this example allows the drug prescriber 104 to set upper and lower limits on the amount of insulin that can be provided and the frequency of injections to best manage the drug consumer's 106 needs.

Once the drug dispensing computer device 122, 126, 128 is selected, the central server 134 verifies the selection. There are several embodiments for the drug dispenser 115 to interact with the central server 134 to allow for verification of the drug dispensing computer device 122, 126, 128. This helps to ensure the drug dispensing computer device 122, 126, 128 is not already active, marked as damaged or has some other issues logged in the central server's database 140. Since the central server 134 effectively manages and controls all drug dispensing computer devices 122, 126, 128, it has the final say on their condition and who can use them. This step can vary slightly based on whether a professional is involved, a healthcare work or even a family member.

In some embodiments, the drug dispenser 114 is not a professional, like a pharmacist, but might be a healthcare professional, a family member or a loved one. This person 114 might have a power of care or power of attorney (POA) to assist a person with dementia or an elderly person. In some embodiments, the drug dispenser 114 is a person running a clinical drug trial and need to maintain strict adherence to a drug consumption schedule. They might also need to collect statistics and reports on each patient in the drug trial and be told via alerts when patients have missed taking their medications. In these embodiments, there may not be an accredited database that the drug dispenser 114 can use to verify who they are. All the drug dispenser 114 can do in these situations is verify they are in possession of a known, and currently available, drug-dispensing computer device 122, 126, 128.

In embodiments where verification is required, the drug dispenser 114 has several possible embodiments to verify they are in possession of a valid, available drug dispensing computer device 122, 126, 128. In one verification embodiment, the drug dispenser 114 using the device 122, 126, 128 logs into the central database 134 and enters a piece of required identification information associated to the dispensing drug computer device 122, 126, 128.

This could be a device serial number, a manufactured identifier or a bar code or QR code attached to the drug-dispensing computer device 122, 126, 128. In this embodiment, the central server 134 verifies the computer device 122, 126, 128 is known and has already been authenticated by the database 140 at the central server 134. Once verified, the identification information confirms this specific drug-dispensing computer device 122, 126, 128 is not already in use, busy or assigned to another drug dispenser 114. Once this is confirmed, the central server 134 attempts to communicate to the drug-dispensing computer device 122, 126, 128 using several possible methods.

In one embodiment, a wide-area cellular network 132 like 3G or 4G GSM, UMTS, or similar network 132 may be the method supported by the dispensing computer device 122, 126, 128. In another embodiment, a public or private WiFi network 132, Internet of Things (IoT) network 132, or similar proprietary or virtual wireless network 132 may be used to communicate to the dispensing computer device 122, 126, 128.

For these embodiments where a wireless or disconnected link is used, an additional verification step may be needed to authenticate ownership and control over the drug-dispensing computer device 122, 126, 128. Once the central server 134 has confirmed its communication link is viable and working, it sends a message for the drug dispensing computer device 122, 126, 128 to immediately perform a change in state. In some embodiments, this change in state could be to illuminate some LED lights in a unique pattern, in other embodiments it could be to make a series of audible beeps and in yet other embodiments, it could display a number on a screen or some other action that requires a visual confirmation.

In these embodiments, the drug dispenser 114 planning on using the drug-dispensing computer device 122, 126, 128 would then enter the unique change in state presented at the central database 1234 to pass the device verification step. If their input matches what the central database 134 has sent, they are considered verified to use this specific drug-dispensing computer device 122, 126, 128 and can work with that device to create a drug control-file. In some embodiments, this change in state could be performed more than once to ensure the drug dispenser 114 who has logged onto the central database 134 is indeed in possession of a valid drug-dispensing computer device 122, 126, 128. Once verification of possession is confirmed, the drug dispenser 114 can move to the remaining steps in the process.

In another embodiment, the communications methods to the drug-dispensing computer devices 122, 126, 128 could also involve both wired 124 and wireless 120 connections. In some embodiments the drug-dispensing computer device 122, 126, 128 may also support local connections 124 to the drug dispenser's computer 116. Connections 124 like universal serial bus (USB) and Bluetooth could allow for a secure connection safely within the drug dispenser's facility 114.

In these embodiments, the connection to the drug dispensing computer device 122, 126, 128 is through a physical connection 124, 120 that may be made to it. The physical connection might be a coupling 124 to the drug dispenser's computer 116 or a temporarily inserted Ethernet connection 120 linking it to a network 130, 132. In these embodiments, the need to send visual confirmation commands to the drug dispensing computer device 122, 126, 128 will not be necessary as the central server 134 can communicate to the device through the drug dispenser's computer system 116 through the connection 124. Having multiple connections 120, 124 would enable the central server 134 to double-verify the drug-dispensing computer device 122, 126, 128 over both connections 120, 124 to ensure an even safer deployment strategy.

With the drug dispensing computer device 122, 126, 128 verified, the completed drug control-file 136 can be downloaded by the drug control-file watchdog 160, 162, 164 into the device and the drug control-file watchdog 160, 162, 164 will utilize the drug control-file for the drug loading stage. Once physically opened, the drug dispenser 114 may do a visual inspection of the sides of the drug dispensing computer device 122, 126, 128 and load drugs 128 matching the drug control-file 136.

In some embodiments, matching can be confirmed using various pill scanning methods as the drugs 128 are inserted into the drug dispensing computer device 122, 126, 128. For example, the pill 128 itself might have a bar code, Q-code or some printed indicators identifying the exact composition of the pill. There could be an outside covering over each pill that has a code printed on it to identify exactly what the pill is composed of. Some coverings of plastic or blister pack can be used to protect the pill from contamination and make the pill more readily identifiable. In some embodiments, some coverings could also include low-frequency RFID tags to make counting and identifying the drugs easier. Upon insertion, the pill would pass through a small scanner on the drug-dispensing computer device 122, 126, 128 that confirms the correct pills are being inserted into the device.

Once the drugs are loaded and confirmed, the drug-dispensing computer device 122, 126, 128 can be closed to allow for the user-identity information to be provisioned from the drug consumer 106. In this application user-identity is defined as anything directly related to the drug consumer 106. Therefore, a person's user-identity can include biometric, biomedical and digital identity information. Biometric information includes some areas like fingerprints, facial recognition, voice recognition, palm scan, deep vein scan, retina scan and any combination of biomedical data. Examples of biomedical data refer to information physically related to the drug consumer. For example, it would include urinalysis results, heart rate results, EKG results, EEG results, blood results, blood pressure results, stool analysis, urine test strip results, saliva analysis, tear drop analysis or many other possible identifiable parameters about the drug consumer.

Additionally, biomedical or biometric information could include photographic or video information. For example, an initial photograph might be used in front of a drug dispenser 114 to confirm the visual identity of a drug consumer 106 and then subsequent photographs can be compared to it. In another example, a photograph might be taken of a drug consumer placing a pill in their mouth as biometric evidence of drug consumption. In yet another example, a drug consumer may take a photograph of a urine test strip and provides that as a status result from taking their medication.

In other embodiments a unique, national digital identity token or RFID might be used and this process for a drug consumer 106 would be similar to that used by a drug dispenser 114, as discussed above. The drug consumer 106 would have registered for a digital identity and received a digital identity token used for verification at a national digital identity verification server. When one or more pieces of digital identity, biometric or biomedical data has been provisioned and verified to match the requirements of the drug control-file, the drug dispensing computer device 122, 126, 128 sends a fully provisioned stage has been reached message to the central server 134.

Once in the fully provisioned stage, the central server 134 decides when to issue the begin deployment command. Once in deployment, the drug consumer 106 can receive their drugs 118 by proving their identity before being allowed to receive the drugs 118. In some embodiments, the biometric that has already been taken by the drug prescriber 114 may be used along with biomedical data for the dispensing process.

There are several embodiments as to when the central server 134 decides to issue the begin deployment command.

In some embodiments, the drug consumer 106 is only allowed to possess one drug-dispensing computer device 122, 126, 128 containing the same drug 118. In this embodiment, the central database 134 will block the provisioning process if attempts are made to provision multiple drug-dispensing computer devices 122, 126, 128 to the same drug consumer 106 with the same drug 118.

In other embodiments, the central database 134 allows multiple drug-dispensing computer devices 122, 126, 128 to be given to the same drug consumer 106 with the same drug 118. In this case, the goal is to provide the drug consumer 106 a continuous supply of drugs 118 so they do not accidently run out, which could cause a life-and-death situation in some cases. In this embodiment, the central database 134 knows precisely when the last dose is extracted from a given drug-dispensing computer device 122, 126, 128, and will issue the begin deployment command to a second drug-dispensing computer device 122, 126, 128 when additional drugs 118 are needed. This is referred to as the hot-swap method of continuous drug supply.

Once the begin deployment command is sent, the deployment stage is considered started. The deployment stage is the process where the drug control-file watchdog 160, 162, 164 executes the drug control-file 136 by opening, reading, and processing the information.

In some embodiments, the drug control-file watchdog 160, 162, 164 also executes the dosage schedule and can further involve setting up timers, triggers, hardware interrupts, events and other actions to guide the behaviour of the drug dispensing computer device 122, 126, 128. In this embodiment, the guidelines, and rules for the original prescription 108 are managed and enforced by the drug control-file watchdog 160, 162, 164, after the drugs 128 are secured within the drug-dispensing computer device 122, 126, 128.

In other embodiments, the drug control-file watchdog 160, 162, 164 will permit a registered program listed within the drug control-file 136. This dosing program would then be allowed to read and act upon the dosing information 136 to dispense medication for the drug consumer 106. During this activity, the drug control-file watchdog 160, 162, 164 ensures that no other program attempts to read, modify or damage the drug control-file 136 information.

Deployment also includes the drug control-file watchdog 160, 162, 164 providing tracking information for detected events that transpire on the device. For example, messages may be sent to the central server 134 whenever drugs 128 are consumed, drug supplies in the device are low (triggering warning messages), or the drug-dispensing computer device 122, 126, 128 is experiencing power issues. Further details on these messages are provided in subsequent figures. Authorized health support workers can then see these messages on a connected interface and be warned of alerts when serious issues arise.

The drugs 118 that are placed in the drug dispensing computer device 122, 126, 128 could be in solid or liquid form. In some embodiments, the drugs are tablets or in other embodiments the drugs are capsules. The capabilities and different types of drug-dispensing computer devices 122, 126, 128 will provide for a myriad of possible embodiments depending on the type of drugs 118 that need to be dispensed.

The different embodiments for creating the drug control-file 136 and working with the drug dispensing computer devices 122, 126, 128 are highlighted in FIG. 2. The focus is creation of the drug control-file 136 and the different ways the drug dispenser 114 is authenticated for use with a given drug dispensing computer device 122, 126, 128.

Turning to FIG. 2 there is another medical embodiment 200 wherein drug dispenser 204 works with drug-dispensing computer device 208, 210, 212 and secondary computer 206. In this embodiment, the process starts with the drug consumer 214 receiving a prescription 216 that can be used within a monitored drug-dispensing computer device 208, 210, 212. FIG. 1 discussed the many embodiments wherein one or more prescriptions 216 are acquired and maintained within the health system of a country. The drug consumer 214 will use a professional to establish their drug regimen, as further described in FIG. 1.

The drug dispenser 204, might be pharmacist in a pharmacy, hospital or special medical facility 202. The drug dispenser 204 could also be a nursing home employee, a dentist, or a long-term care home worker. This drug dispenser 204 works within a larger organization 260 that has assigned the drug-dispensing computer devices 208, 210, 212 to their location 202 to allow them to load drugs 218 into a drug dispensing computer device 208, 210, 212 capable of dispensing those drugs 218. In this illustration, the term drug dispenser 204 is equivalent to a local manager 204 of a computer device 208, 210, 212 and both terms will be used interchangeably.

Whichever physical setting 202 the drug dispenser 204 is using, a senior manager 264 of drug-dispensing computer devices 208, 210, 212 is involved in the initial assignment and monitoring of its activities. In this system, the senior manager 264 holds a hierarchical control over the choices of the local manager 204. For example, the senior manager 264 could decide to re-assign the drug-dispensing computer device 208, 210, 212 to another department or even halt operation of the drug-dispensing computer device 208, 210, 212 if they detect problems have occurred. Using a computer system 262 connected 224 to a wired network 228 or wireless network 230, they can monitor and receive alerts and notifications from the central server 240.

The one or more drug-dispensing computer devices 208, 210, 212 are capable of holding various medications and drugs 218 being prescribed to the drug consumer 214. In some embodiments, these are high-risk drugs 218 that are considered very addictive. In some embodiments, the drugs 218 have restrictions placed on their use by governments 260, insurance companies 260 or drug manufacturers 260.

The drug-dispensing computer devices 208, 210, 212 are authenticated and securely set up using the computer device's 208, 210, 212 device identity within the central server's 240 non-transient database system 246. As described in FIG. 1 and the System Overview, this is done following several embodiments that make use of the device identifier to create a secure channel 244 between the central server 240 and the drug control-file watchdog 250, 252, 254 running on the drug dispensing computer devices' 208, 210, 212. This secure communication channel 244 between the central server 240 and the control-file watchdog 250, 252, 254 is used to exchange secure information like the one or more drug control-files. Unlike the embodiments shown in FIG. 1, the drug-dispensing computer device 208, 210, 212 is not capable of wide area communications and must make use of the data communications capabilities 224 of another computer system 206.

To facilitate this data communication, the drug-dispensing computer device 208, 210, 212 is capable of short-range communication 220 only. This might involve communication methods like Bluetooth, universal serial bus (USB), near-field communication (NFC), or other short-range communications. In this embodiment the drug dispenser's 204 computer 206 supports wide-area communication 224 using a wired or wireless protocol 224. Using a wired network 228 or wireless 230 network, a secure communication channel 244 is opened on behalf of the drug-dispensing computer device 208, 210, 212. This secure channel 242 connects the drug control-file watchdog 250, 252, 254 to the central server 240 using the drug dispenser's 204 computer 206 as a communication proxy.

A proxy-based communication channel 244 is made possible using the drug-dispensing computer devices' 208, 210, 212 device identifier as a source of encryption, as discussed earlier in greater detail. Using an encryption method known only between the drug control-file watchdog 250, 252, 254 and the central server 240 results in safe and secure message exchange. The drug dispensers' computer 206 is not able to interpret, affect, change or steal the information 242 being exchanged. To start the process, the drug dispenser 204 first acquires authorization from the central server 240. There are several embodiments for performing authorization with the central server 240.

In one embodiment, the drug dispenser 204 connects to the central server 240 through a communications interface 256 and performs a login to the central server to gain access to the drug-dispensing computer devices 208, 210, 212 allocated to their facility 202. The login and authorization were discussed in FIG. 1. Many methods can be used to verify and authorize a drug dispenser 204 to proceed with using a drug dispensing computer device 208, 210, 212. Either before login is started or after it is completed, the drug dispenser 204 can use their computer to connect 220 to one of the selected drug-dispensing computer devices 208, 210, 212. Once connected, the drug-dispensing computer device 208, 210, 212 can be authenticated for use at the central server 240 using the drug dispenser's 204 computer 206 link 224. When this complete, the computer device 208, 210, 212 will receive an authentication confirmation message over the secure channel 244 and it can proceed to allow assignment of the computer device 208, 210, 212.

In another embodiment, the drug dispenser 204 downloads a program or application ("app") onto their computer 206. The app is then used to facilitate the communication 220 to the drug-dispensing computer device 208, 210, 212 and authorize the drug dispenser 204. This is performed by prompting the drug dispenser 204 for their personal information, login and password and combining this information with the secure communications from the drug-dispensing computer device 208, 210, 212. The presence of a known drug-dispensing computer device 208, 210, 212 both authenticates the drug-dispensing computer device 208, 210, 212 and authorizes the drug dispenser's 204 who possess the computer device 208, 210, 212 via a short-range communications link. When this complete, the computer device 208, 210, 212 will receive an authentication confirmation message over the secure channel 244 and it can proceed to allow assignment of the computer device 208, 210, 212.

The computer 206 might be a cell phone, tablet, laptop or desktop computer system. In some cases, the cell phone 206 or tablet 206 may use a cellular connection to a wireless network 230. In other cases, one or more network connections 224 are used. For example, the computer 206 may use a Wi-Fi connection to the facility 202, which is then routed through a common network 228 like the Internet to connect to the central server 240.

Once authorization is complete for the drug dispenser 204, they can begin to assign management entities and additional managers 264, for example a doctor or specialist, that might monitor drug consumption and usage. This authorization process also allows additional mangers 264 to create and modify a drug control-file 242 and provision the drug-dispensing computer device 208, 210, 212 for deployment. In some embodiments, these parameters are entered into the central server 240 via the user interface. In other embodiments, a downloaded app on the computer 206 allows the additional managers to enter it locally and it is then transmitted to the central server 240 for verification and non-transient storage in the database 246.

Before allowing the drug dispenser 204 to take charge of the drug-dispensing computer device 208, 210, 212, it's current state is checked in the central server 240 database 246 using its device identity. The central server 240 can then check its database to confirm the status of this drug-dispensing computer device 208, 210, 212 and look for any other drug-dispensing activities by this drug consumer 214. This mechanism can be used to ensure the drug consumer 214 is not trying to cheat the system and get multiple prescriptions for the same drug 218. To take charge of the drug-dispensing computer device 208, 210, 212, it cannot already be assigned or in active use. If the drug-dispensing computer device 209, 210, 212 is assigned or in active use, it would have to be retired from active use by the original drug dispenser 204 who was previous assigned to the drug-dispensing computer device 208, 210, 212 before the drug dispenser 204 could take charge of the device. In this way a nefarious person cannot take charge of an active device over a short-range communication method like Bluetooth and disrupt its activities.

When all these elements of the process are confirmed, the central server 240 gives the authority to the drug-dispensing computer device 208, 210, 212 to grant access to the drug control-file 242 preparation process. If some information matching a prescription number exists on the central server 240, it is also uploaded over the secure connection 234 to the drug-dispensing computer device 208, 210, 212.

Once the login process is completed, the drug dispenser 204 can commence the provisioning of the drug dispensing computer device 208, 210, 212 by building or finishing a drug control-file 242. The drug control-file 242 includes details from the prescription 216, details from the drug consumer 214 like their identification, biomedical requirements, and operating details for the drug-dispensing computer device 208, 210, 212.

It is also possible, during the process of creating the drug control-file, to add additional healthcare workers and caregivers, for example doctors, pharmacists, nurses, healthcare trained staff, children 170 and spouses 170 and others to help track progress and review feedback messages from the drug dispensing computer device 208, 210, 212. These would be considered additional managers with this drug-dispensing computer device 208, 210, 212 specifically, for this drug consumer 214 only, but would have no rights to see or modify the drug control-files. An example of the contents of the drug control-file are provided in FIG. 3.

In this embodiment, the addition of the passwords for the drug prescriber 264, drug dispenser 204 and other health support workers 270 would be delivered and used by the central server 240 later when any of these people wish to review how the drug consumer 214 is doing with their drug consumption. Each password can provide different levels of access to the drug control-file 242. For example, the drug prescriber could be able to change the dosage values in the drug control-file 242 and request it be uploaded back into the drug-dispensing computer device 208, 210, 212. The drug dispenser 204 could only be able to change the number of drugs added to the device before it is uploaded back into the drug-dispensing computer device 208, 210, 212. For example, when a drug consumer has multiple refills the drug dispenser 204 can handle this process alone. Finally, the other health support workers 170 might only be able to see the tracking information provided by the drug dispensing computer device 208, 210, 212 after it is provisioned and deployed in the field.

Once the drug control-file 242 is complete and uploaded to the central server 240, this information is reviewed within the central server 240. If not already performed, checks can be made to ensure this drug consumer 214 does not already have a drug-dispensing computer device 208, 210, 212 assigned to them and dispensing the same drug already.

Once the central server 240 sends the final all clear to proceed message, the drug-dispensing computer device 208, 210, 212 can be opened. Once the drug-dispensing computer device 208, 210, 212 is opened, the next part of the provisioning process takes place, once the drugs are finally loaded and the drug-dispensing computer device 208, 210, 212 and the device is closed.

With the drug loaded and the drug dispensing computer device 208, 210, 212 closed, the final step in provisioning can take place: the provisioning of the user-identity. As already discussed in detail, the provisioning of the user-identity requires the drug consumer 214 to provide a user-identity to the drug dispensing computer device 208, 210, 212 to receive their regular dosage of drugs.

The user-identity will include a biometric to access the drug-dispensing computer device 208, 210, 212 for every dose and might also include biomedical data. As discussed, biomedical data might be required to allows the drug consumer 214 to receive their next dose of their drugs, or in other embodiments it might be needed periodically. In some embodiments, the biometric could be a fingerprint, retina scan, heart rhythm or some other unique property that is inherent to the drug consumer 214. In other embodiments, the drug consumer 214 could have a sub-dermal implant that provides a unique user-identity held only by that person 214. Many other embodiments are possible including facial recognition, vein scan and other bio-centric techniques.

With such a close relationship between the drug-dispensing computer device 208, 210, 212 and the drug consumer 214, changing to a different drug-dispensing computer device 208, 210, 212 may require some steps. This may be required, for example, if the drug-dispensing computer device 208, 210, 212 has malfunctioned and needs to be swapped for a new one. The drug consumer 214 would have to re-visit the drug dispenser 204 to facilitate this.

In other embodiments, the drug consumer 214 needs a different drug 218 and must visit the drug prescriber to make that change. This would then have to be followed by a trip back to the drug dispenser 204 to remove the drugs from their current drug-dispensing computer device 208, 210, 212 and insert new drugs into the same drug-dispensing computer device 208, 210, 212 or, in some embodiments, into a new drug-dispensing computer device 208, 210, 212 that is not faulty. The central server 240 can keep track of all drugs held within the changed drug-dispensing computer device 208, 210, 212 and the drug dispenser 204 will be told they must return all removed drugs, especially high-risk drugs back to the manufacturer to be destroyed.

When one or more pieces of digital identity, biometric or biomedical data has been provisioned and verified to match the requirements of the drug control-file 242, the drug-dispensing computer device 208, 210, 212 sends a fully provisioned stage has been reached message to the central server 240.

Once in the full provisioned stage, the central server 240 decides when to issue the begin deployment command. Once in deployment, the drug consumer 214 can receive their daily drugs 218 by proving their biometric before being allowed to remove the drugs 218. In some embodiments the biometric that has already been taken by the drug prescriber 204 may be used along with biomedical data for the dispensing process.

There are several embodiments as to when the central server 240 decides to issue the begin deployment command. In some embodiments, the drug consumer 214 is only allowed to possess one drug-dispensing computer device 208, 210, 212 containing the same drug 218. In this embodiment the central database 240 will block the provisioning process if attempts are made to provision multiple drug-dispensing computer devices 208, 210, 212 to the same drug consumer 214, with the exact same drug 218.

In other embodiments, the central database 240 allows multiple drug-dispensing computer devices 208, 210, 212 to be given to the same drug consumer 214 with the exact same drug 218. In this case, the goal is to provide the drug consumer 214 a continuous supply of drugs 218 so they do not accidently run out, which could cause a life-and-death situation in some cases. In this embodiment, the central database 240 knows when the last dose is extracted from a given drug-dispensing computer device 208, 210, 212, and will issue the begin deploy command to a second drug-dispensing computer device 208, 210, 212 when additional drugs 218 are needed. This is referred to as the hot-swap method of continuous drug 218 supply.

Once the begin deployment command is sent, the deployment stage is considered started. The deployment stage is the process wherein the drug watchdog program executes the drug control-file 242 by opening, reading, and processing the information. Once deployment has taken place, the drug dispensing computer device 208, 210, 212 looks for another short-range computer connection to create a secure connection 244 through to send messages to the central server 240. This would generally take place through the drug consumer's 214 computer. If the drug consumer 214 does not have a computer and there is no secure path created, the messages may be saved on the drug-dispensing computer device 208, 210, 212 and delivered at the next opportunity.

In some embodiments, data exchanges follow different standards like JavaScript Object Notation (JSON). JSON is a common method used over HTTP or HTTP Secure (HTTPS) to enable machine-to-machine communication. In these embodiments, the header of the HTTP or HTTPS message could carry the identifier for the specific drug-dispensing computer device 208, 210, 212 carrying the message.

As discussed earlier, if SSL and HTTPS is not used the central server 240 and the drug dispensing computer device 208, 210, 212 will establish their own application-level encryption key using the device's identification to select and decryption communications. Each of the encrypted messages sent will provide the identity of the drug dispensing computer device 208, 210, 212 to ensure the correct database entry receives and logs the tracking information.

Since the drug control-file 242 was already sent to the central server 240 during the provisioning stage, the central server 240 has used some of the contents to build authorization login and passwords for drug prescribers, drug dispensers 204 and other health care professions. These added authorized accesses allow these individuals to look at data for this drug consumer 214 on this specific drug-dispensing computer device 208, 210, 212 on the central server 240 through the interface provided by the central server 240.

The drug control-file watchdog on the drug-dispensing computer device 208, 210, 212 can be also encrypt any stored data in memory so that no tampering, copying, modification or malicious damage can take place unnoticed. Depending on the embodiment, this at-rest encryption will either use a dedicated at-rest encryption key or the negotiated encryption key created within the central database 240. By encrypting the data on the device, any malicious damage will be detectable. Therefore, any modification or damage to any of the files will result in re-requesting the data from the central server 240.

Drug consumer 214 information and support worker information can also be retained in the drug control-file 242 to allow for important alerts to be provided to the drug consumer 214. This might involve information about low drug levels, low power levels or other critical information.

In some embodiments, the drug-dispensing computer device 208, 210, 212 will allow a single Bluetooth™ connection to the drug consumer's 214 cell phone, tablet computer, or some other computer device. This will allow establishment of a secure connection 244 for relaying status messages. This short-range connection 220 can also provide status information about how many drugs are left in the device for them to consume, power levels, RF coverage levels, contact names for emergency, drug consumption rules and other important information.

During the deployment state. the drug-dispensing computer device 208, 210, 212 communicates status messages to the central server 240 on a regular basis, or when a proxy connection 220 is available. In some embodiments, this communication occurs every time a drug is released to a drug consumer 214. In other embodiments, this communication could occur less frequently, such as once a day or every other day. Different embodiments could be configurable and data communication failures at different times could result in cached messages that are saved until data communication paths 224, 244 are re-established. All messages may be encrypted, either using SSL certificates, DTLS methods, or the negotiated encryption keys depending on the embodiment, to ensure that eavesdropping or manipulation of message is not possible.

Turning now to FIG. 3, there is one medical embodiment for a drug control-file 300 and its contents. This is one embodiment of a set of configuration elements that can be encoded in a drug control-file 300. There are many other potential types of fields that could be present within the drug control-file 300 and available to a drug prescriber to select from. These configuration parameters could also be considered to comprise one or more database entries to guide the operation of the computer device and to define different levels of access to the computer device itself. This one embodiment provides a modest set of parameters that would work across many of the medically focused computer devices discussed thus far in this application.

As discussed in FIGS. 1 and 2, once connected to the central server (and its associated database files) the drug dispenser and. in some embodiments. the drug prescriber will have the ability to fill in the necessary configuration and control information to be used to guide the drug watchdog program. In some cases, a portion of this information might be extracted from an e-Prescribing Authority to help populate some of the fields. Using a compatible PMS system with the invention would allow such extraction to take place when enabling the overall system operation.

To complete the drug control-file 300, an interface is provided on the central server or through the drug watchdog program itself to guide the drug dispenser to complete construction of the necessary information. Where necessary, this interface would include things like drop-down menus, pick-lists and scrolling lists and help menus in those cases when there is confusion about a given field's meaning.

In some embodiments, some of the fields may be optional, for example if the prescriber answers "no" to the question: 'Send Warning Message if dose missed?' then they will not have to answer the question "max time after missed dose for a message?" Not every possible field is listed in FIG. 3. Instead FIG. 3, is just illustrative of some of the expected fields.

The division of the sections has been made to assist in understanding and explain different sections of the drug control-file 300. In some embodiments, not every field will necessarily be transferred across to a drug-dispensing computer device. In some cases, a field is meant for the central server and the field's presentation of information to those authorized personal allowed to view the configuration and tracking messages for a given drug-dispensing computer device. In some embodiments, every field could potentially be sent and viewed through or on a drug-dispensing computer device to authorized personal working directly with the drug consumer.

Section 302 has some introductory elements that are useful for determining initial authorization and the basic setup of the drug-dispensing computer device. The configuration entry for 'program to access control-file' can be used to identity the specific program that is allowed to access the file. In this example, the program is called Drug-Watchdog-V1 and it has been given READ and EXECUTE permission.

In some embodiments, the drug-watchdog is the only program running. In other embodiments, the drug watchdog might be one of several programs running. For example, within a digital insulin pump computer device, it might be necessary to run several programs. Another program might be running that periodically asks for status information from a continuous glucose monitor (CGM) device that is located on another part of the drug consumer's body. There could also be a third program that takes that information and causes insulin to be pumped into the drug consumer's body based on parameters it was given from the drug control-file 300. In this embodiment, the program that has access to only 'READ' the drug control-file 300 might be called the 'Insulin-Injection-Program-V1'.

The following fields like 'Name of Drug', 'DIN', 'Prescription Number', 'Prescriber Name . . . ', Patient Information, Drug consumption guidelines, comments to patient, are informational and could help the patient or someone working with the patient and looking at a status screen from the drug-dispensing computer device.

The fields that follow those, including the 'Patient's Email or Cell Number', the 'Alerts for Patient Allowed', the 'Patient Health Card' (i.e. identification or digital identity) and any 'Patient Biometric Attached' with a "yes" or "no" can be important parameters for the provisioning of the drug dispensing computer device. As mentioned, in some cases, a drug consumer (referred to as patient in this example drug control-file 300) biometric information was already taken with the drug prescriber's office or within the drug dispenser's office.

In these cases, biometric information can be uploaded to the central server and provided back to the medical computer device for final confirmation that this is the same patient that requested the drugs in the first place. In some embodiments, the biometric information has used an auto-encoder to flatten and encode the data for transfer. The use of auto-encoders can increase security when passing around biometric data.

Besides just biometric data, other kinds of biometric and biomedical requirements can also be added to the drug control-file. The example of a picture requirement is shown, but the system could include urinalysis results, blood testing and blood pressure results (for example a diabetic blood test), heart rate, EKG, EEG or many other possible tests. The system might require approval of the biomedical information. This approval might come daily, weekly, monthly or, in some embodiments, after every single dose taken.

Section 304 contains the drug-specific instructions and dosing guidelines. It starts with a dosage of the named drug and the scale to be used. For example, physical pills might be in milligrams while a liquid like insulin might be in millilitres per dose. The next entry is frequency of dose in times per day. When this is combined with size of each dose it determines how many pills or medicine is dispensed for every allowed dose. The drug prescriber may also have indicated how many refills of the prescription are allowed.

In this embodiment, the next entry indicates the spacing between doses and the sleep period for the patient. This would allow the medical computer device to calculate the specific drug consumption periods for the drug consumer. In another embodiment, it might be more practical to simply provide the specific times when the person should be allowed to take the medication. For example, the patient may be allowed to take medication four times a day at 8:00 am, 12:00 pm, 5:00 pm and 8:00 pm. Alternatively, a prescription might say take one tablet up to 4 times a day as needed. This information can be supported by the minimum spacing for each dose parameter. In the case where the patient is allowed up to 4 doses in a day as needed, the minimum spacing might be 4 hours to ensure they do not take the medication too closely together.

The dosing periods field are followed by a grace period to determine when a dose is considered missed. Since this is a physical device, the drug consumer will be told when the dose is ready to be taken but they might be busy, they might forget, or they might not need the dose. Whatever the case, they will have a certain amount of time to take the dose before the dose is considered missed.

The next parameters deal with the fact that, in some cases, if a drug consumer misses several doses of a medication the entire prescription should be halted. For high-risk and complex medications, missing doses could be considered dangerous. Therefore, the next parameters provide parameters to determine if missed doses are important and should cause the dispensing of drugs to halt.

In this embodiment, the next part of section 304 indicates if a picture is required for final provisioning, before deployment takes place. A picture might also be required during the deployment stage, or after every single dose is given. In some situations, the drug consumer may be required to take a picture of their face, with their mouth open and the drug on their tongue.

In other embodiments, other types of biomedical items are needed, like a blood-pressure reading or even a picture of a urine test strip. These additional embodiments might allow the doctor, pharmacist or healthcare professional determine if the drug being prescribed is working or having adverse affects.

The next few parameters indicate if the drug consumer can request additional doses between their regularly scheduled doses. If they can, the time needed between doses sets a minimum spacing period and they are told when an additional dose is possible. If they start adding their own doses, another parameter is provided to establish the maximum number of doses they can have in a day.

Section 306 is provided to give examples of other miscellaneous parameters needed based on the particular embodiment. In this illustration, the drug consumer will be allowed to bring in the medical computer device before it is completely empty. The maximum number of drugs or medication in the machine before allowing a refill sets that timing. If they drop below a certain number of drugs and are in danger of running out, the minimum number of drugs remaining parameter will determine when to warn the drug consumer. There is also a broad parameter to indicate if an alert message should be sent if the drug consumer misses a dose. This would be valuable when a drug consumer is high-risk or on a medication that cannot or should not ever be missed without concern for the patient's health.

The final example in section 306 is to allow a hot-swappable dispensing computer device to be created for this drug consumer. Hot-swappable implies there are still drugs in the device being consumed but a back-up or 'next fill' device can be provided before all the doses in the previous device have been administered. Since the central server manages the deployment step of each dispensing computer device, it knows when the first device has depleted all its drugs. When that happens, in a hot-sqapping system, the central server sends a begin deployment command to the backup dispensing computer device and it begins to run its timers and starts the dispensing process. Because of the flexibility in the system, such functional flexibility is achieved through central server control. This functionality is especially helpful for drug trials, people who are home bound, live in a remote community with little to no drug dispensers or dispensing facilities, those fighting a major sickness at home, during a time of pandemic, or in other similar situations where travel and picking up drugs physically is hard or impossible. In these cases, drugs can be couriered to the drug consumer and the courier can wait while the drug consumer signs for the drugs, shows identification, and provides their fingerprint for biometric provisioning.

Section 308 is provided as an example of information relating to where the professional involved with this drug consumer are located. This is an embodiment in which three different levels of access are granted. In other embodiments there could be more control levels or fewer control levels provided on a given computer device.

In this embodiment, the first name is the prescriber's name and contact information. The prescriber generally has the maximum rights as they prescribed the drugs in the first place. Changes to the strength, frequency, refills and duration can all be considered very risky and dangerous to modify without a appropriate training and experience. The modification rights for this person are provided, using one of many possible methods.

In one embodiment this is hardcoded into the central server operating software and names the drug prescriber, who is assigned the maximum number of modification rights. They can be assigned a password in this section should they want to view any computer device status or modify the drug control-file being followed by the medication computer device.

The next entry is for the drug dispenser's name and contact information. The drug dispenser would could be assigned certain rights but fewer than those of the drug prescriber, such as the ability to add more drugs until the entire prescription is exhausted. They would also have a password that permits them to see tracking information and see the current drug control-file and change some portions of it.

Finally, there is a name and contact information for a healthcare support worker, family member or close friend. This person could be provided a small number of rights and might not even be able to see the drug control-file. In some embodiments, they might be able to see the tracking messages to ensure the drug consumer was staying on track. In other embodiments, they might be the only person who gets alerts should the drug consumer misses a drug dose.

In some embodiments, this last entry might provide information about the insurance company paying for the drugs. The insurance company might be able to receive confirmation when all the drugs are consumed, any missed drugs not consumed or similar information that could affect the payout of the claimed medication. Many other potential fields are possible and not included here. For example, there could be a section for government oversight bodies and regulator tracking requirements.

In some embodiments, other more complex configuration options might be allowed, perhaps related to location issues and GPS functionality. The prescriber might need to understand if the drug consumer is roaming outside of their city or country. Fields like the dosage, the frequency of use, maximum drugs remaining before refill, sending a warning message if a dose is missed and similar configuration elements can be used by the dispensing machine to help guide its behaviour. In some embodiments, if the drug consumer fails to perform the necessary user-identification procedure to extract the drugs, dispensing might come to a halt.

Turning now to FIG. 4, there is a network overview 400 showing a 3D printing embodiment wherein different managers 406, 408 control the use of 3D printing computer devices 432, 434. This set of embodiments describe different methods for 3D printer users 410, 412, 414 to make limited use of 3D printers 432, 434 for replicating 3D objects using copyrighted and protected 3D render and 3D design files. The system 400 is well suited to project the copyrighted nature of 3D design and 3D render files, which is a major challenge when sharing such valuable assets between different computer systems 438, 440, 442.

Like in the examples of drug-dispensing computer devices, 3D printing computer devices 432, 434 need a secure way to be accessed by a computer device user 410, 412, 414. When publicly offering the ability to 3D-print a given object, the intellectual property (IP) rights, including copyrights, on those 3D render files and 3D design files need advanced security and protection. Additionally, there needs to be a specific set of instructions to be followed to ensure a good replica is created so a warranty can be extended to the object. Limits and guidelines must be established so that the number of replications matches the replication rights of the computer device user 410, 412, 414, so that theft of physical replicas does not take place.

The system has one or more managers 406, 408 having a hierarchical control over the distribution and rights of the 3D printing computer devices 432, 434. These computer device managers 406, 408 can be distributed across different locations 402, 404 for the convenience of computer device users 410, 412, 414 who want to make 3D replications. These endpoints are connected via different data communication methods 420 that support a central server 442 that provides a communication interface 446 and non-transitory memory 448 to allow for provisioning and controlling the 3D printer computer devices 432, 434. These communication methods 420 have been explored in previous figures.

The non-transitory database 448 at the central server 442 holds unique device identities for all the 3D printing computer devices 432, 434 in the field. As previously discussed, this device identity could be created during manufacturing using an identity chip, a CPU identity number, a public/private encryption key pair or some other identifier known only to the central server 442 and the 3D printing computer devices 432, 434. The ability to create secure communication paths 460, 462 is based on the presence of this device identity and allows for provisioning and deployment of the 3D printing computer devices 432, 434.

Similarly, the non-transitory database 448 at the central server 442 holds the identity and authorization values for one or more managers 406, 408 in the field. This information might be established through a single organization, like a 3D printing manufacturer or a company offering 3D printing services. In some embodiments, a top-most manager 406 might establish the rights of lower-tiered managers 408 within the database 448 as the 3D printing computer devices 432, 434 are created, distributed and installed at one or more locations 404.

With the 3D printing computer devices 432, 434 in place and available, different computer device users 410, 412, 414 employ various methods to make limited use of the 3D printing computer device 432, 434. In some embodiments, they might first visit a public web site on a public network like the Internet 422. They might use one or more networks 422, 424 to reach a site offering 3D replicated objects for sale. These networks 422, 424 can be wireless and wired, or they could be public or private (VPN) type networks behind firewalls. In some cases. support for Wi-Fi network and Internet of Things (IoT) networks could also be involved.

In these embodiments, the computer device user 410 first connects to a site to acquire 3D replication rights. As mentioned, this could be a specially constructed 3D replication purchase site, or it could be the central server 442 site directly. The computer device user 410 selects one or more 3D objects they wish to replicate. The computer device user 410 might be given the choice of selecting the number of copies they wish, there could be different colour choices, texture choices, and in some embodiments even different material choices for their 3D object.

As the computer device user 410 make these choices, they could be charged different prices, especially when many copies are requested for one or more objects. If this site is not the central server 442, the computer device user's 410 choices will make their way to the central server 442. The central server 442 will store the information into its non-transitory database 448 and inform one or more managers 406, 408 of the transaction. Such exchanges of data over a data networks 442, 424, using common protocols like JSON over HTTP following shared API formats like REST, are well known in the computer field.

In this embodiment, part of the transaction includes a proof of purchase for the rights to 3D replicate an object. This is termed the 3D replication token in this application and is similar to a drug prescription as described in FIGS. 1 and 2. When pre-purchasing the rights to make a 3D object. the computer device user 410 is effectively saving time by doing the transaction ahead of time. In other embodiments, the computer device user 412, 414 might perform this purchase with the local manager 408 at the site 404 that services the 3D printing computer devices 432, 434.

When 3D objects are pre-purchased, the transaction will be completed when the computer device user 410 provides their user identity. Due to the nature of granting 3D replication rights and copyright to individuals, the rights should not be passed around to non-authorized individuals. Using a user identity method provides additional confirmation that the possessor of the user identity is the person that acquired the rights. This user identity might be a digital identity token created by the site and provided to the computer device user 410. In other embodiments it could be some form of personal identity card or digital identity card. In other embodiments this could be a biometric, like a fingerprint or facial scan from their cell phone. If the site has generated the user identity, it will be sent to them over a secure channel. This computer device user 410 identity also makes it way to the central server 442 to be saved in the database 448 with the rest of the transaction parameters.

In some embodiments, once a computer device manager 406, 408 is notified, they might perform additional work on the computer device user's 410 request. They might decide where the correct 3D printing computer device 432, 434 exists that can provide the limited use activity on behalf of the computer device user 410, 412, 414. Once selected, a follow-up email might be sent to the computer device user 410 informing them of which location 404 to travel to in order to have their 3D object replicated. In other embodiments, the manager 406, 408 does nothing with the initial request until the computer device user 412, 414 arrives at a location 404 looking for limited use of a 3D printing computer device 432, 434.

When the computer device user 432, 434 arrives to a location 404. there could be different types of 3D printing computer devices 432, 434 present. In some embodiments, the manager 408 might be directly involved with the 3D printing computer device 432 and overseeing every step of the process. In some embodiments, there is a link 464 from the 3D printing computer device 432 to the manager's 408 computer system 428. Over this link 464, a secure channel 460 is created between the central server 442 and the 3D control-file watchdog program 438 running on the 3D printing computer device 432.

In these embodiments, the computer device user 412 uses the secure channel 460 through the manager's 408 computer 428 to provide their confirmation of 3D replication rights by providing their 3D replication token to begin provisioning. This is analogous to providing a drug prescription in FIGS. 1 and 2. The 3D replication token will provide proof of IP rights for the 3D object once it is matched by the central server 442. In some cases, the local manager 408 enters the 3D replication token on their computer 428, similar to entering a prescription number (Rx number) for a drug prescription. This information can then be transmitted to the central server 442 for matching and to start the provisioning stage.

In another embodiment, the computer device user 412, 414 has not pre-purchased any rights to make replications of a 3D object. They might come to a location 404 and look through a physical or digital catalogue to make a selection and pay their money. In these embodiments, the 3D replication key might be generated and kept by the central server 442 as there is no reason to transfer it back to the computer device user 412, 414 because they are working directly with a 3D printing computer device 432, 434.

In other embodiments, the 3D printing computer device 434 offers a direct user interface 436 to the computer device user 414. In these embodiments, the 3D printing computer device 434 is capable of supporting a wide-area connection 420 to a network 424 that is connected 422, 420 to the communications interface 446 at the central server 442.

In some embodiments, the local manager 408 can be involved with the provisioning stage. In other embodiments, the 3D control-file watchdog 440 running on the stand-alone 3D printing computer device 434 is capable of staring provisioning with the central server 442. In these later embodiments, the user input 436 allows the computer device user 414 to enter their 3D replication token for transfer and verification by the central server 442. In highly integrated 3D printing computer devices 434, the computer device user 414 might be selecting a 3D object on the user interface 436 directly. In these embodiments, the 3D control-file watchdog 440 would transfer a 3D object identifier in place of the 3D replication token which will be placed into the 3D control-file to guide the creation of the 3D control-file. This also allows the central server 442 to augment the 3D control-file with information about materials, colours and other elements of the 3D control-file. Some examples of these fields are provided in FIG. 6.

Whether directly involved or just on-site and overseeing operations, the local manager 408 will be on hand to watch over one or more of these stand-alone 3D printing computer devices 432, 434. In some embodiments, the local manager's 408 computer 428 is capable of wireless communication and can talk to one or more of the 3D printing computer devices 432, 434 to initiate provisioning and give the final approval before deployment begins.

In those embodiments with stand-alone 3D printing computer devices 434, the presence of a wide-area connection 420 allows a secure channel 462 to be established using the device identity of the 3D printing computer device 434. This secure channel 462 allows for secure communications to take place between the central server 442 and the 3D control-file watchdog 440 running on the 3D printing computer device 434.

Once provisioning starts and the 3D replication token is verified, the computer device user's 412, 414 identity can be collected or verified. Collection could be done by the local manager 408 or the stand-alone 3D printing computer device 434. In those embodiments where a 3D object has been pre-purchased, the computer device user's 412, 414 identity can be used to verify they are the correct person requesting the 3D object replication. This would be similar to verifying that a drug consumer is the exact drug consumer for whom drugs have been prescribed in FIGS. 1 and 2.

The computer device user 414 might physically enter their user identity through an interface 436. The user identity could be, for example, a computer token, a digital identity card, a fingerprint confirmation or some combination of one or more of these. In some embodiments, the local manager 408 sees and confirms this information at their computer 428 before it is sent to the central server 442. In other embodiments the 3D printing computer device 434 sends it directly 462 to the central server 442 who takes the user identity information and performs a matching process against stored user identity values in the central server's 442 non-transitory database 448. Once verified, the central server 442 sends a completed 3D control-file 452, 454 which allows the 3D printing computer device 432, 434 to open and be examined. In some embodiments, this allows the local manager 408 to check material levels and types and perform other visual inspections. Once the local manager 408 is happy with the 3D printing computer device 432, 434 it is closed, and the provisioning stage is complete.

In other embodiments in which the computer device user 412, 414 has no prior purchase of a 3D object, the computer user's 412, 414 identity can be sent back to the central server 442 to track activities on 3D object replication. This tracking might be used for warranty purposes, should a warranty claim be made against a faulty 3D replicated object. The central server 442 then constructs a 3D control-file 452, 454 which is delivered to the 3D control-file watchdog 438, 440 to guide the 3D control-file watchdog's 438, 440 behaviour and limit the activities of the 3D printing computer device 432, 434. With the arrival of the 3D control-file 452, 454, the 3D printing computer device 432, 434 opens and can be examined. In some embodiments, this allows the local manager 408 to check material levels and types and perform other visual inspections. Once the local manager 408 is happy with the 3D printing computer device 432, 434, it is closed, and the provisioning stage is complete.

When the 3D printing computer device 432, 434 is closed and the identity of the computer device user 412, 414 is confirmed, the central server 412 has several embodiments for issuing a deployment to start the replication process. In one embodiment, a manager 406, 408 gets a summary of all the information on their interface computer 426, 428 and does a final check that everything is in order. In these embodiments, one or more of the managers could provide their 406, 408 final approval. After final approval, the central server 442 sends a start deployment command over the secure channel 460, 462.

In another embodiment, the user interface 436 at the 3D printing computer device 434 displays a summary of everything from the 3D control-file 454 to the computer device user 414. Once they review their order and like what they see they provide the final approval to start the deployment of the 3D printing computer device 434. In other embodiments, the central server 442 simply sends the begin deployment command when provisioning is complete and there is no further information to collect.

Information about the 3D replication is held securely within the one or more 3D control-files 452, 454 that are exchanged over the secure channel 460, 462 with the 3D control-file watchdog 438, 440. In some embodiments, the 3D control-file watchdog 438, 440 submits the 3D render information directly to the 3D printing computer device 432, 434. In other embodiments, the 3D control-file watchdog 438, 440 is told by the 3D control-files 460, 462 to allow another program on the 3D printing computer device 432, 434 to access the file and perform the interaction with the 3D printing computer device's 432, 434 printing logic and 3D layering process. This later case would be common when 3D slicer programs are used to improve the quality and performance of the 3D printing process. Examples of some of these directions within the 3D control-file are provided in FIG. 6.

During the deployment of the 3D printing computer devices 432, 434, the 3D control-file watchdog 438, 440 can provide status commands and feedback to the central server 442 for everything taking place at the 3D printing computer device 432, 434. This information can generate alerts and notifications to various authorized managers 406, 408 when problems occur. For example, if a miscalculation has taken place and a 3D printing computer device 434 runs out of printing material, a manager 408 might be notified of this, so that they may leave their desk and refill the 3D printing computer device 434 that has run out of material. Once the number of purchased and authorized 3D replications have been completed, the 3D control-file watchdog 438, 440 informs the central server 442 and a stop deployment command is issued by the central server 442 to stop all further activity.

The 3D control-file watchdog 438, 440 then has the choice to delete all 3D render and 3D design files used in the process of creating the 3D replica. In some embodiments, it might allow an encrypted cache of 3D design and 3D render files to reside in its memory to save download time and increase speed for future replications. This would be an implementation choice by the designers of the system. These embodiments are discussed further in FIG. 6.

Turning now to FIG. 5, there is a network overview 500 showing a drug replication embodiment wherein different managers 508, 510 control the use of drug-replicating computer devices 550, 552. In one set of embodiments, the system 500 describes how different methods are employed by individual drug consumers 512, 514, 516 to make limited use of drug-replicating computer devices 550, 552 for generating drugs from drug formulations. In other embodiments, the system 500 describes how drug distribution rights are passed through a distribution hierarchy to allow local drug replication centers 504, 506 to produce drugs for a specific region.

Drug formulations found within drug control-files 544, 546 are considered highly sensitive and have copyright and other intellectual property restrictions on their use, and therefore they need a high degree of protection and security. The drugs that are replicated can be physical pills, tablets, granules, or liquid forms, for example. In some cases, different 3D printing techniques can be used to create the pills following specific formation instructions found in the formation files 544, 546. In other cases, the drug-replicating computer devices 550, 552 use injector type jets and computer control syringes to create unique and proprietary formulations.

Like the examples of drug dispensing computer devices and 3D printing computer devices, drug-replicating computer devices 550, 552 need a secure way to be accessed by various parties 512, 514, 516 wanting to replicate drug formulations. This method of just-in-time drug replication is extremely valuable for reducing drug loss and theft due to drug diversion. Drug diversion along the distribution path is a major challenge for the pharmaceutical industry and costs billions of dollars in the healthcare industry.

Another advantage of the drug replication system is its ability to deliver complex pill formations. This might include the just-in-time creations of a polypill, made up of several active pharmaceutical ingredients and customized for the drug consumer 512, 514, 516. Additionally, when a massive rollout of drug formulations is required, for example during a pandemic, this is an excellent method to distribute the drugs without loss of drugs in the distribution channel, while maximizing the number of locations that can simultaneously provide life-saving pandemic drugs to the general public.

The system 500 is composed of one or more managers 508, 510 having a hierarchical control over the distribution and rights of drug-replicating computer devices 550, 552. As in FIGS. 1 and 2, these managers 508, 510 would be doctors, pharmacists and other professionals that are involved with prescribing and dispensing drugs. This embodiment has been thoroughly discussed in earlier sections. Authorization of these managers 508, 510 might be done through official regulatory bodies or private organizations like hospitals, clinics and medical facilities.

In other embodiments the managers 508, 510 might be directly related to the drug-replicating computer devices 550, 552 and the formulations 554, 558 that are used within them. In this embodiment, a drug-replicating computer device 550, 552 manufacturer might run and manage the system of drug-replicating computer devices 550, 552. In another example, one or more private pharmaceutical companies might run the drug-replicating computer devices 550, 552 to help deal with drug loss in the distribution channel and other just-in-time delivery challenges. The ability to create and dynamically customize a polypill, for example, is a major limitation in the industry and a solution is needed for this problem.

In some embodiments, a large drug manufacturer 502 might use a distribution center 504, 506 to produce just-in-time drugs for different regions based on need and demand. In these embodiments, the computer device user 514, 516 might be one or more local employees of the distribution center 504, 506 that are commissioned to track and request the printing of drug formulations.

Computer device 550, 552 managers 508, 510 can be distributed across different locations 502, 504, 506 as deemed necessary for the effective use and distribution of drug replication services. These endpoints are connected via different data communication methods 536, having the ability to reach and exchange messages with a central server 520. The central server 520 provides user interfaces to managers 508, 510 and, in some cases, computer device users 512. The central server 520 also provides a communication interface 522 and non-transitory memory 524 to allow for provisioning and controlling the drug-replicating computer devices 550, 552.

The non-transitory database 524 at the central server 520 holds device identities for all the drug-replicating computer devices 550, 552 at various locations 504, 506. As mentioned in FIGS. 1, 2 and 4, this device identity could be created during manufacturing using an identity chip, a CPU identity number, a public/private encryption key pair or some other identifier known only to the central server 520 and the drug-replicating computer devices 550, 552. The ability to create secure communication paths 566, 568 is based on the presence of this device identity and allows for provisioning and deployment of the drug-replicating computer devices 550, 552.

Similarly, the non-transitory database 524 at the central server 520 holds the identity and authorization values for one or more managers 508, 510 in the field. There are several embodiments for how this information might be established. As already discussed in FIGS. 1 and 2, it could be through a professional government body or through a single organization, like a pharmaceutical company, or drug manufacturer. In some embodiments, a top-most manager 508 might establish the rights of lower-tiered managers 510 within the database 524 as the drug-replicating computer devices 550, 552 are created, distributed and installed at one or more locations 504, 506.

In other embodiments, the drug-replicating computer devices 550, 552 might be sold and distributed first as business grows and then different lower-tier managers 510 are added. For example, a drug-replicating computer device 550, 552 manufacturer may create products and distribute these products to different locations 504, 506. Eventually, large pharmaceutical companies could place their drug formulations into compatible formats 554, 558 that work with the drug-replicating computer devices 550, 552. As more formulations are placed within compatible formats 554, 558, more pharmacists 510 might want to gain access to the central server 520 and use the drug-replicating computer devices 550, 552. In this way, the system could be dynamically expanding as the different participants in the drug industry get involved.

In other embodiments, the one or more locations 502 are drug distribution points in the complex delivery of drugs to the world-wide market. In these embodiments, one or more managers 508, 510 can provide rights to lower-tier distribution points for the delivery of drugs and drug formulations to the market. Each drug that is reproduced would then be tracked by the top-most tier of the system. For example, a large pharmaceutical company 502 might establish drug distribution points in all 50 states in the USA. Each of the distribution points 504, 506 might be provided with banks of drug-replicating computer devices 550, 552 to print drugs for their state based on the rise and fall in demand at any given time. Each time a drug is replicated, the drug-replication control-file watchdog 562, 564 reports on the drug creation and very accurate tracking can be enabled for every state.

This method could be further extended so that in some heavily populated states additional distribution points 502, 504, 506 could be added. For example, in a state like California it might be necessary to have additional lower-tier managers 510 and locations 504, 506, to provide a drug distribution point in every large city of California. Then, as demand for certain drugs rises and falls in the largest cities the local drug distribution point can replication additional drugs to meet the demand. In this way, there would be no way to divert drugs through the distribution path and there would be fewer drugs wasted due to shelf-life issues.

In these embodiments, the computer device user 514, 516 would be a local employee who must provide user identity information each time they want to replicate drugs. In this way the system can track every drug that is created and who created those drugs. Each time that local employee needs to provision and deploy a drug-replicating computer device 550, 552 they would have to go through the full provisioning and deployment stage, using drug control-files and the full protections of the system 500. While this would be more time consuming, the system 500 would have improved security and trackability to prevent circumvention.

As in FIGS. 1 and 2, the process starts with a computer device user 512, 514, 516 making a request for a drug to be reproduced. In some embodiments, a drug consumer 512 might interface to a public site, for example a site available on a public network 532, 534 like the Internet. In these embodiments they could be purchasing a complex polypill formulation, a supplement, or an over-the-counter health focused vitamin.

In another embodiment, the computer device user 512 is also a manager in the system 500 and is requesting the creation of additional stocks of a certain drug for a given region 504, 506. They can be provided with transactional proof of their request and will have to provide their user identity to ensure the drugs can be replicated. This later allows for a full audit to be performed on who ordered the drugs to be created, how many drugs were created and when were the drugs created.

In another embodiment, as discussed in FIGS. 1 and 2, the computer device user might be a drug consumer 514, 516. As illustrated in FIGS. 1 and 2 these drug consumers 514, 516 might first have visited a drug prescriber and be prescribed one or more drugs to help with a condition. This step is not illustrated in FIG. 5 as FIGS. 1 and 2 more fully explored this earlier step of acquiring one or more prescriptions. The drug prescriber might be doctor, pharmacist, nurse practitioner, dentist, or anyone with authority to prescribe drugs. The drug prescriber might be authorized on the central server 520 to suggest a location 504, 506 to find drug replication services. In some embodiments, the drug prescriber might be able to search for drug-replicating services 504, 506 that can create unique polypill formulations for patients with comorbidities and complex drug consumption regimen.

In another embodiment, the requesting person 512 might be a drug reproduction proxy, who is working directly with the drug consumer 514, 516. This drug reproduction proxy might be capable of locating a drug replication location 504, 506 that can provide the drug consumer 512 with a special just-in-time drug formation, or a one-of-a-kind polypill to solve a drug challenge.

In another embodiment, the drug consumer 512 does not have to perform any additional work on their computer 530. The drugs 554, 558 to be replicated are offered to everyone by a government agency. For example, if a pandemic vaccine is being distributed widely across an entire country, then anyone living in the country who meets certain criteria, for example that are of a specific age may be offered the vaccine. In these embodiments, the drug consumer 514, 516 might be able to simply provide their identity and receive the vaccine. The local manager 510 in this case might use a common prescription number for all drug consumers 514, 516 that arrive looking for the same vaccine. The drug consumer's 512, 514, 516 identity is always required to ensure that multiple drug replication does not happen for the same drug consumer 512, 514, 516.

In another embodiment, the drug consumer 514, 516 has already received one or more prescriptions, and is entering a pharmacy for a repeat of their drugs when a new drug-replicating computer device 550, 552 is made available for their limited use.

With the drug-replicating computer devices 550, 552 in place and available, different computer device users 512, 514, 516, 566 can use various methods to make limited use of the drug-replicating computer device 550, 552. As mentioned, in some embodiments they might first visit a public or private web site on a public network like the Internet 532. They might use one or more networks 532, 534 reach a site offering drug-replicating location services. In other embodiments, it is possible for a high-end pharmacy 504 to add additional charges for the use of the drug-replicating computer device 550, as it might offer unique polypill creation capabilities. As in other previously discussed embodiments, these networks 532, 534 can be wireless and wired, or they could be public or private (VPN) type networks behind firewalls. In some cases support, for Wi-Fi network and Internet of Things (IoT) networks could also be available.

In those embodiments in which the computer device user 512 first connects to a site to locate or pay for the use of the drug-replicating computer device 550, 552, they might pay money or register their identity first to book a timeslot or allocate the resource for themselves. Depending on whether they have a supplied prescription number (Rx Number), they might also be provided a drug reproduction token by the site to confirm their reproduction rights for a specific set of drugs. This is similar to receiving a 3D reproduction token as described in FIG. 4.

During this interface, the computer device user 512 might select a location, and a series of drug combinations they have been prescribed to create a polypill for themselves. As the computer device user 512 make these choices, they could be charged different prices, depending on various factors, for example, how many pharmaceuticals are they adding into one pill. If this site is not the central server 520, the computer device user's 512 choices make their way to the central server 520. The central server 520 stores the information into its non-transitory database 524 and could inform one or more managers 508, 510 of the transaction. Such exchanges of data over one or more networks 532, 534, using common protocols like JSON over HTTP following shared API formats, are well known in the field.

In another embodiment, the computer device user 512 is a drug distribution manager 512 in the system 500. They interact with a distribution site or the central server 520 to request a number of drugs be reproduced. The computer device user 512 is given a drug reproduction token and provides their user identity for the transaction. Later, the drug distribution manager 512 proceeds to a reproduction site 504, 506 to input the drug reproduction token and their user identity to enable to drug reproduction to proceed. When this is performed off site 504, 506, these additional steps are more time consuming but provide a high level of trackability and security. In many cases, such drug reproduction requests might be executed by the local manager 510 of the site 504, 506.

In some embodiments, the actual chemicals that make up the unique drug formulation 554 are purchased and sent in the mail to the computer device user 512, 516. In these embodiments, the computer device user 516 would arrive to the location 506 offering drug-replicating services with their own drug formulations in hand 554. For example, perhaps the drug consumer 516 is a body builder and has requested a unique protein-boosting pill formulation that can only be created by a drug-replicating computer device 552. Such advanced non-prescription formulations are becoming more common and solutions are needed to address the complex need for advanced vitamins, supplements, hormones, and other advanced compounds.

In other embodiments, it might be possible to distribute life-saving vaccine formulations directly to drug consumers 516. This might be the case in some countries where drugs can be purchased and where governments have provided regulatory approval for wide distribution of vaccines of various sorts. For example, each year some governments make an educated guess as to how many vaccines to purchase for their population. Often these guesses are wrong, and millions of dollars of healthcare money is lost due to wasted drugs. If those that wanted to flu vaccine could simply request their own vial 554 and take it to a drug-replicating computer device 552, it could save millions of dollars each year.

In other countries that do not support pre-purchase of vaccine for their residents, this allows a person to purchase their own vaccine drugs and make use of their vial 554 at a local drug-replicating computer device 552.

In those embodiments in which the computer device user 512 has used a computer 530 to pay for drug replication services or allocate resources, the site offering this service or the central server 520 can generate a drug reproduction token for the computer device user 512. This can be displayed on the screen so it can be manually copied, or it can be sent to them over a secure channel. This can be used to verify their drug reproduction rights and allow the initial provisioning of the drug-replicating computer device 550, 552.

Once this is complete, the site offering the service or the central server 520 can request a user identity from the computer device user 512. At this stage, the computer device user 512 might supply a digital identity, a fingerprint scan from their mobile phone 530 or tablet computer 530. In other embodiments the computer device user 512 might have a digital identity card that uses near-field communications (NFC) with their mobile phone 530 to exchange that information to confirm the transaction. The drug reproduction token and the user identity would make their way to the central server 520 to be saved in the database 524 with the rest of the transaction parameters.

When the computer device user 514, 516 arrives to a location 504, 506 there could be different types of drug-replicating computer devices 550, 552 present. In some embodiments the manager 508 might be directly involved with the drug-replicating computer device 550 and overseeing every step of the process. For example when several formulations are needed, a skilled person like a pharmacist 510 might be required to ensure the correct formulations 556 are inserted into the drug-replicating computer device 550 when it opens.

In these embodiments, there could be a link 570 from the drug-replicating computer device 550 to the manager's 510 computer system 528. In other embodiments, the drug-replicating computer device 550 is able to directly communicate to a wide-area network 532 using a connection 536. Whether through the provided link 570 or a direct connection 536, a secure channel 566 is created between the central server 520 and the drug-replication control-file watchdog 562 running on the drug-replicating computer device 550. The computer device user 514 interfaces with the manager 510, who uses their computer 528 to provide identity information and proof of drug replication rights for the required drugs.

In some embodiments, the manager 510 is a pharmacist and the computer device user 514 is carrying one or more prescriptions 540 received from one or more doctors. In other embodiments the computer device user 514 has a drug reproduction token to confirm their drug reproduction rights.

In other embodiments, the drug-replicating computer device 552 offers a direct user interface 560 to the computer device user 516. In some embodiments, the drug-replicating computer device 552 is capable of supporting a wide-area connection 536 to a network 534 that is connected 532, 536 to the communications interface 522 at the central server 520. Over the wide-area connection 536, a secure channel 568 can be established using the device identity of the drug-replicating computer device 552. This secure channel 568 allows for secure communications to take place between the central server 520 and the drug-replication watchdog 564 running on the drug-replicating computer device 552. The computer device user 516 might physically enter a drug reproduction token to start the provisioning process.

The local onsite manager 510 is able to watch over one or more of these stand-alone drug-replicating computer devices 552. In other embodiments, a stand-alone drug-replicating computer device 552 also requires a link 570 to the local manager's 510 computer 528 in order to acquire wide-area communication 536 capabilities. For example, the stand-alone drug-replicating computer devices 552 might reside in a different room 506 of the same facility 504 where one or more local managers 510 watch overall all drug-replicating computer devices 550, 552.

In those embodiments in which the computer device user 516 is able to directly interface to the drug-replicating computer device 552, they might have purchased their own drug formulations and have brought these into the location 506 after having them shipped to their home. In other embodiments, the computer device user 516 is able to directly interface to the drug-replicating computer device 552 as it is large and complex and offers by default a wide-range of drug formulations that it is able to replicate.

Similar to the drug-dispensing computer devices and 3D replication computer devices, provisioning for the drug-replicating computer device 552 starts when the computer device user 514, 516 provides proof of their drug replication rights. This is similar to providing a drug prescription as discussed in FIGS. 1 and 2. In this embodiment, a drug reproduction token has been issued to confirm drug replication rights. Once matched by the central server 520, the provisioning of the drug-replicating computer device 550, 552 can commence.

Once the drug reproduction is confirmed, the drug-reproduction control-file 544, 546 can be built to start provisioning and open the drug-reproducing computer device 550, 552. These drug-replication control-files 544, 546 can then be delivered to the drug-replication control-file watchdog 562, 564 to guide the drug-replication control-file watchdog's 562, 564 behaviour and limit the activities of the drug-replicating computer device 550, 552. With the device open, the local manager 510 can ensure it is in good working order and to either add the necessary drug formulations 554, 556, 558 or ensure all necessary drug formulations are present to complete the drug replication.

As previously mentioned, in some embodiments a manager 510 intervenes to ensure the drug-replicating computer device 550 is ready for drug replication and closes the unit for final deployment. In other embodiments, the drug-replicating computer device 552 is assumed to be fully stocked with the necessary drug formulations and ready to proceed. This later case might be more common for lower cost drugs or over-the-counter vitamin, supplements, and health focused drug replication activities.

During the provisioning stage, the computer device user 514, 516 provides their user identity. In some embodiments, when the drug reproduction rights were pre-purchased, their user identity is stored by the central server 520 in its database 524 files. In those embodiments, once the provided user identity matches the earlier user identity recorded in the transaction history, the provisioning stage completes. This takes place when the drug-reproduction watchdog 562, 564 sends an identity received message to the central server 520.

In other embodiments, where an earlier transaction has not taken place, the user identity is received, and an identity received message is sent to the central server 520. In some embodiments, the identity received carries some form of the identity so that it might be later tracked to a specific individual. When providing nation-wide vaccines, for example, it would be valuable to be able to track who has received the vaccine and to ensure a given person does not get additional vaccine doses.

When the drug-replicating computer device 550, 552 is closed and the user identity is received, the central server 520 has several possible embodiments for issuing a deployment to start the drug replication process. In one embodiment, a manager 508, 510 gets a summary of all the information on their interface computer 526, 528 and does a final check that everything is in order. In these embodiments, once they provide their 508, 510 final approval, the central server 520 sends a start deployment command over the secure channel 566, 568.

In another embodiment, the user interface 560, at the drug-replicating computer device 552 displays a summary of everything from the drug-replication control-file 546 to the computer device user 516. If they review their order and like what they see, they provide the final approval to start the deployment of the drug-replicating computer device 552.

Information about the drug formulation is held securely within the one or more drug-replication control-file data 544, 546 that are exchanged over the secure channel 566, 568 with the drug-replication control-file watchdog 562, 564. In some embodiments, the drug-replication control-file watchdog 562, 564 submits the drug replication commands directly to the drug-replicating computer device 550, 552. In other embodiments, the drug-replication control-file watchdog 562, 564 is told by the drug-replication control-files 544, 546 to allow another program on the drug-replicating computer device 550, 552 to access the file and perform the interaction with the drug-replicating computer device's 432, 434 replication and formulation logic software. An example of these drug-replication control files 544, 546 are illustrated in FIG. 6.

In different situations, there could be complex programs needed to make high quality drug reproductions. For example, when making physical pills and drugs involving a 3D printing process, it might be useful to have a 3D slicer program in charge of laying down multiple layers of drug material to ensure high quality in the drug formulation.

During the deployment of the drug-replicating computer devices 550, 552, the drug-replication control-file watchdog 562, 564 provides status commands and feedback to the central server 520 for everything taking place at the drug-replicating computer device 550, 552. This information can be used to generate alerts and notifications to various authorized managers 508, 510 when problems occur. For example, if a miscalculation has taken place and a drug-replicating computer device 550, 552 runs out of drug formulation material, a manager 510 might leave their desk and restock the drug-replicating computer device 550, 552 that has run out of drug formulation. Once the required drugs have been replicated, the drug-replication control-file watchdog 562, 564 informs the central server 520 and a stop deployment command is issued by the central server 520 to stop all further activity.

Once the drugs are replicated and removed from the drug-replicating computer device 550, 552, there are several embodiments as to what could happen next. In one embodiment, the drugs are placed in a bottle or injection device and given to the computer device user 514, 516. This might be especially used in the case of flu or pandemic vaccines where the computer device user 514, 516 is injected on the spot in the office 504, 506.

In other embodiments, the nesting of the invention can be used in a very secure and convenient way. For example, a local manager (like a pharmacist) might take the replication drugs and place them into a drug-dispensing computer device as described in FIGS. 1 and 2. The computer device user 514, 516 would then provide their identity to the drug dispensing computer device and it would be assigned to them, allowing controlled and secure access to their medications. In a more secure embodiment, the drug replication machine creates the drugs and, when it opens to allow exaction, the drugs are already in a drug-dispensing computer device. Since the central server 520 has the identity of the computer device user 514, 516, it can use this information, identity information and drug formulation information to build a drug-control file. The local manager (pharmacist) would simply need to set up a dosing regimen for the computer device user 514, 516 and the drug control-file would be finished and ready for download to the drug dispensing computer device. Using this nesting technique, a very secure distribution system could be setup to eliminate the loss and theft of drugs in the distribution path to the drug consumer 514, 516. These embodiments are highlighted further in FIG. 6.

The drug-replication control-file watchdog 562, 564 then has the choice to delete all drug formulation files used in the process of creating the replicated drugs. In some embodiments, it might allow an encrypted cache of drug formulation files to reside in its memory to save download time and increase speed for future drug replications. This would be an implementation choice by the designers of the system.

Turning now to FIG. 6. there is an embodiment for a 3D control-file or drug reproduction control-file 600 and its contents 602, 604, 606. This is one embodiment of a set of configuration elements that can be encoded in a 3D control-file and drug-reproducing control-file 600. There are many other potential types of fields that could be present within this control-file 600 and available to various managers in the system. These configuration parameters could also be considered to comprise one or more database entries to guide the operation of the computer device and to define different levels of access to the computer device itself. This embodiment provides a modest set of parameters that would work across many of the 3D printing and drug reproducing computer devices discussed thus far in this application.

There are several methods the system that could be used to fill in the necessary fields in this control-file example 600. Computer device user information, choices and computer device manager configuration overlap to build the information. When a potential computer device user wants to create a 3D reproduction or a drug reproduction, their selection determines many of the initial fields in 602 and 604.

The first example section 602 fields are driven by the computer device user and their requested limited use of the computer device. In those embodiments in which the computer device user has selected the 3D object or drug to be replicated using a web site or similar mechanism, the identification information could be requested and collected into the control-file. Identifications like name, address, social insurance number and contact numbers are common through this type of interface.

Based on the type of 3D object or drug to be replicated, the central server might then fill in the other demands like whether biometric information is needed. Sending a digital ID to the server would indicate to the control-file watchdog, and in some embodiments the local manager, that the person's digital identity must be sent to the server for storage. The digital identity might even be attached to the control-file and could accompany the control-file to or from the computer device to be accessed. This might be common if the computer device user was a repeat user of the system. In this section there could also be instructions for the control-file watchdog or local manager about securing the reproduction after it is created. For example, in the case of a reproduced drug, the drug might be placed into a drug-dispensing computer device before being provided to the computer device user. This might require additional digital or biometric information to secure the package.

The second section 604 provides a range of information about the reproduction. There might be slightly different parameters in this section based on whether it is a 3D object being replicated or a drug or polypill being replicated. Some of these replication specifics could come from the central server's configuration established by a top-tier or middle-tier manager. For example, if a given company were offering 3D object replication for metal wrenches, the manager that sets up the 3D render files for that company could indicate a machine number, a machine classification, a machine size, supported materials, for example that the reproduction requires a 3D printer that supports metal fabrication.

The reproduction itself might have reproduction identification characteristics. For example, for a 3D object it might specify the colour, material to be used, or the amount of material that must be in the system for a successful reproduction. For reproducing drugs, there could be data relating to one or more formulation details, or which containers or canisters should be placed into the drug reproduction computer device for the correct drug to be reproduced, for example. the computer device user has pre-registered to create a reproduction, many of these details can be worked on through the user interface provided by an Internet web site, the central server or some other type of user interface solution.

Finally, in the second section 604, there could be a set of instructions for the local manager. Even though the computer device user has limited use of the computer device, the manager could still be involved with the resulting output of the computer device. In some cases, they might for example secure the drugs into a drug-dispensing computer device. In those embodiments where a pharmacist is reproducing an expensive drug, or a large amount of complex polypills, it might be important to have a secure and biometrically sealed drug-dispensing computer device to keep the drugs safe. In the case of many replicated 3D objects, the local manager might have a method of verifying the quality of the reproduction. This method could be automatic, for example like placing a reproduction into a light chamber where light detectors determine how much light is bleeding through the object. The control-file watchdog could then relay this information to the local manager or the central database to record. In other embodiments, the local manager might use a handheld infrared device, a laser, or a direct visual inspection before the reproduction process is considered completed and deployment is terminated.

The final section 606 shows several embodiments for conveying information about the hierarchical rights of different tiers of managers over computer devices. In some embodiments, the password information is conveyed to the control-file watchdog as it might ask for confirmation to authorize the local manager to interact with the computer device directly. In this embodiment, the control-file watchdog might have access to a user interface, as illustrated in previous figures or it might be communicating to a local computer, tablet or cell phone using a local link. In some embodiments, additional information about other tiers of control could be sent to allow a regional or national manager to show up and resolve an issue or take charge of the computer device, in those cases where the local manager is unable, unavailable or the problem is too severe.

In the final part of the last section 606, there could be some final instructions for when the reproduction process terminates. There could be many embodiments in this area. In the case where a drug reproduction has taken place, the first example asks the local manger to collect drug insurance coverage and the email address to use for correspondence around insurance claims. For 3D object replication it might be possible that a warranty is offered to guarantee the quality and operation of the reproduction for some number of months or years. To offer the warranty, the reproduced 3D object might have to achieve a certain level of quality before the warranty can be provided. When using a light box or automated system, it could provide a quality score based on the number of imperfections it detected. As a final example, the system might allow for the supporting files, 3D render files, 3D design files or drug formulations to be kept in the cache of the computer device for a period of time. This might be done in those cases where a specific reproduction happens often and time and data communications costs are a factor in the reproduction process.

These division of the sections 602, 604, 606 have been made to assist in understanding and explain different operational elements of the system, and the cooperative roles of the central server and control-file watchdog. In some embodiments, not every field will necessarily be transferred across to a control-file watchdog or are relevant for a specific computer device. These illustrations are examples of the many possible ways to limit the access to a computer device by a computer device user. Even though a computer device user has been granted limited access, the use of the control-file and the control-file watchdog is designed to enforce the restrictive use, protect the control-files and report back on all activity that takes place at the computer device. The control-file format, structure and content can be sent in either direction in different embodiments. In some embodiments, where the control-file watchdog has an extensive user interface, it is even possible for the control-file to be first generated at the computer device and provided to central server to start provisioning and inform various levels of computer device managers.

Turning now to FIG. 7, there is a network overview 700 showing a transportation embodiment wherein different managers 704, 716, 718 control the use of independent transportation computer devices 708, 710. This set of embodiments describe different methods for a vehicle renter 702 to rent a self-driving rental computer device "vehicle computer device" 708, 710.

Like the examples of medical computer devices, these potentially dangerous vehicle computer devices 708, 710 need a very secure and robust environment to ensure safe, secure, and accurate use. Tracking information can be monitored at the central server 724 and alerts provided should any alertable events take place that are unexpected. Authorizing who can see the tracking information and receive alerts is also important when dealing with such powerful vehicle computer devices 708, 710. Areas like power consumption, energy conditions, transportation path deviations and many other areas must be all carefully monitored and alerted.

The design of the system places the central server 724 in authority over the managed computer devices 708, 710. This principal allows for several advanced features that solve many problems for real-time control of in use computer devices 708, 710. For example, the system design is particularly well suited to allow the swapping of computer devices 708, 710 between or during active deployment usage, for example if a break-down takes place. As another example, the system design is well suited to adjust the operation of the computer device 708, 710, for example downloading a new route, during active deployment usage to benefit the computer device user 702 or to provide more safety or control for one or more managers 704, 716, 718 of the computer devices 708, 710.

Similarly, if a self-driving vehicle renter 702 experiences a malfunction during their rental process, a second self-driving vehicle 708, 710 can be sent to their location. Once the renter has disembarked from the first malfunctioning device 708, 710, they can provide biometric confirmation and lock down that first vehicle 708, 710. Only once tese lockdown steps are complete, and a new biometric is provided to the second vehicle 708, 710, the central server 724 can allow the deployment of the second vehicle 708, 710 following the same control-file 726 information.

This disclosure also deals with how different managers 704, 716, 718 set up the basic distribution of the vehicle computer devices 708, 710. The creation of the multiple tiers of access and control can be done in many ways depending on the implementation and needs of the industry. Each industry will have ways to manage the system of vehicle computer devices 708, 710 to ensure maximum efficiency.

In some embodiments, the fleet of vehicle computer devices 708, 710 are distributed using geographic boundaries. In these embodiments, the access rights to a portion of vehicle computer devices 708, 710 would be based on which part of geographic boundary a given manager oversees. In another embodiment, the vehicle computer devices are distributed based on authorization permissions. For example, if the FAA is only allowing flying vehicle computer devices 708 to be used in each region, then all flying vehicle computer devices 708 might be assigned to one or more managers in that region.

Like the medical computer devices, these vehicle computer devices 708, 710 may require different levels of authority on the control-files and limitations established for a set of managers that take charge of each computer device individually. Often, it would be too much to expect one person to manage a fleet of vehicle computer devices 708, 710 especially in the case where one company has both land-based and air-based taxi services being offered.

The system is connected 712, 714 through one or more networks both wired 720 and wireless 722 networks. Publicly available networks 720 like the Internet allow access to a range of mangers 704, 716, 718 to the central server 724. In some embodiments, one or more of the networks 720, 722 could be located behind a firewall and use virtual private network (VPN) to protect the exchange of information between managers 704, 716, 718, vehicle renters 702 and the central server 724. Connections can use wired links like Ethernet, Fibre links and simpler physical links. Radio frequency (RF) links can include cellular wide area public wireless links like GSM, GPRS, 3G, 4G and 5G networks. Other wireless links could be Wi-Fi links based on 802.11 protocols, Internet of Things (IoT) wireless networks or IoT protocols like LTE-M1 and, in some embodiments, Bluetooth and short-range wireless links.

Like the example of medical computer devices, the first step in the system is to establish an authenticated relationship between the database 728 maintained by the central server 724 and the vehicle computer devices 708, 710. There are several embodiments to support this relationship. Once the authenticated relationship is established a secure channel 742 can be created between the route control-file watchdog program 736, 738 and the central server 724.

In one embodiment, the database 728 is populated with identity values from vehicle computer devices 708, 710 at manufacturing using a closed, private system to exchange information between these two endpoints. The exchange could also involve the exchange of encryption information like public encryption keys for an asymmetric encryption strategy, a symmetrical key or some other encryption values like signed SSL certificates.

In another embodiment, each vehicle computer device 708, 710 is populated with the public key of the central server 724 and it uses this value to send its own public key to the central server 724 with its identification. In yet another embodiment, a transportation authority 734 keeps a master database of all legal and registered vehicle computer devices 708, 710 and the central database 724 must use an API over a connection 732 to retrieve or confirm that the vehicles computer devices 708, 710 being added to the central database 724 are legitimate and registered, tested and approved to carry passengers 702. Variations of these embodiments adapted to other applications have been thoroughly discussed in previous figures.

Each vehicle computer device 708, 710 establishes a unique relationship using this shared device identity as verification of their identity and a security connection 742 can then be created from the route control-file watchdog 736, 738 to the central server 724 through one of the embodiments already discussed. For example, the system might be configured to use client-side and server-side SSL certificates, or the system could use a shared secret or encryption key exchange. In some embodiments, encryption keys are created at the application level using the device identity as a seed value, and public/private key pairs that can be used for asymmetrical encryption methods. These embodiments have been described in detail earlier. In those embodiments where client-side SSL certificates are used, the route control-file watchdog 736, 738 can create an encryption key to protect all route control-files 726 at rest within the vehicle computer device 708, 710. When the authentication is verified at the central server 724, an authentication confirmation message is sent over the secure channel 722 to allow the assignment of the computer device 708, 710.

Once establishment of the relationship between the vehicle computer devices 708, 710 to the central server 724 is complete, one or more managers 716 can take the first steps to set up a control-file for one or more of the vehicle computer devices 708, 710. Initially, the top tier administrator can be established following several embodiments.

In one embodiment the operators of the central server 724 establish one or more top tier managers of all vehicle computer devices 708, 710 associated to that central server 724. In some embodiments, the operator 744 would be a large transportation company 744 running their own private fleet of vehicle computer devices 708, 710. In another embodiment, the operator 744 is an independent company 744 offering a cloud service offering. In this embodiment, each company 744 that owns vehicle computer devices 708, 710 to be tracked can register and pay for the cloud server independently. As part of this process, the top-tier manager 716 can be given top level control over their fleet of vehicle computer devices 708, 710.

In another embodiment, the central server 724 creates top tier managers 716 by interacting 732 through the API to the transportation authority 734. As a company 744 registers to become a licensed operator of vehicle computer devices 708, 710, this information is safely kept in a national database 734 of all registered transportation companies 744. Once a company 744 registers, the central server 724 is told about this new information and creates an authorization login for that new company 744. At the same time. the central server 724 could receive a secure list of all of their registered vehicle computer devices 708, 710 with identification information and security information.

Once the top tier manager 716 is created, additional classifications and tiers of managers 704, 718 can be added. Within the central server's 724 database system 728, one or more managers 704, 718 might be needed nationally, or regionally to distribute, allocate, track, monitor, maintain and repair inventory as needed. In some embodiments, different managers 704, 718 can have different authority over the vehicle computer devices 708, 710 related to geographic location, range of movement and authorization rights. The top tier manager 716 can create different authorization below his level and assign control over vehicle computer devices 708, 710 to anyone in that new authorized level.

Additionally, a regional manager 718 can have the ability to create vehicle computer device 708, 710 pickup and drop off locations with a local manager 704 in charge of a subset of their total number of vehicle computer devices 708, 710. The top tier manager 716 could also perform these actions as they have visibility into all levels below their own level.

This information goes into the control-files 726 held within the database 728. With these control-files 726 held within the central server 724 database 728, the process of renting the vehicle computer devices 708, 710 can take place.

As a concrete example, in one embodiment, a national transport manager 716 has the ability to move one or more vehicle computer devices 708, 710 to anywhere in the country. They decide to split the country into four regions, the north-east, the north-west, the south-east and the south-west. This person 716 then creates login accounts to each of the four regional managers 718 and gives these regional managers limited moving rights within their region. The regional manager 718 can then move the vehicle computer devices 708, 710 to different locations within their region to vehicle computer device 708, 710 pickup and drop-off centers. The national manager 716 or the regional manager 718 might then give permission for the vehicle computer device 708, 710 in their region to travel a certain distance or area. For example, they might allow the vehicle computer device 708, 710 to travel temporarily outside of their region but it must return within a certain time period. The regional manager 718 could then give limited permissions to the local manager or site attendant 704. The site attendant 704 might have direct and immediate responsibility for the rental process and the provisioning and deployment steps to ensure a biometrically known renter 702 is confirmed and provisioned before letting them near a vehicle computer device 708, 710.

With the vehicle computer devices 708, 710 established and authenticated at the central server 724, various vehicle renters 702 can connect 712 wirelessly or wired to a common network 720, 722. They might be using a laptop computer, a desktop, a tablet, a cell phone, a watch, or many other devices providing a user interface. In some embodiments, the user interface might be offered by the central server 724.

In other embodiments, the user interface to rent a vehicle computer device 708, 710 is provided by a different cloud computer offering or a company's rental web site. That site then relays rental information to the central server 724 when the transaction is completed, and the necessary identification information is collected.

This embodiment would be similar to have an e-Prescribing server that relaying information to the central server 724 as prescriptions are initiated by doctors and completed by pharmacists. There are many embodiments for what a user interface might show and provide to a potential vehicle renter 702. For example, it might be useful to provide the current rental schedule and the busy and free times for each different type of vehicle computer device 708, 710.

It might also show the range of each vehicle computer device 708, 710 and where it is located 730 for pickup and drop off. There could also be information about the cost per kilometer or mile traveled. Other embodiments might allow the vehicle renter 702 to select a route and make a payment. In other examples the user interface might allow the vehicle renter 702 to provide a biometric through their computer, like a cell phone and upload that to the site where they made their reservation. There might also be the ability and need to upload identification from a driver's license, passport or other government, photo-based identification documents. The vehicle renter might also have a digital identity that can be confirmed at a national digital confirmation service. As discussed above, in some embodiments. may use sub-dermal implants so that a renter's 702 cell phone could use NFC to collect the identity of the renter 702 and pass it to the central server 724. These different identity options can be used to confirm the vehicle renter's 702 identity when they arrive to use the vehicle computer device 708, 710.

As a vehicle renter 702 arrives to a location 730 having purchased the use of a transportation computer device 708, 710, the site manager 704 receives purchase confirmation details from them. As mentioned, this purchase might have been done at the central server 724 or at another site and key information was then given to the central server 724. The site manager 704 greets the vehicle renter 702 and receives purchase confirmation details from them. This might include a digital computer token as proof of their rights to have limited use over the computer device. In this embodiment, the site manager 704 resides on the bottom tier of the control and management of vehicle computer devices 708, 710. Therefore, his scope of control over the route control-file 726 is limited. For example, in some embodiments they might not be able to extend the route outside of a given geographic range. They also might not be able to override other safety systems with the vehicle computer device 708, 710.

The site manager 704 can bring up the partially completed route control-file 726 to see what details are available about the desired rental and the vehicle renter 702. The site manager 704 can then look at this available inventory to determine if there is an available vehicle computer device 708, 710 for use with this vehicle renter 702.

Analogous to the drug dispenser verifying the drug consumer is authorized to receive a specific drug, the site manager 704 then validates the vehicle renters 702 identity to ensure it is the same person 702 that acquire rights to rent and use the vehicle computer device 708, 710. As discussed, this validation may be performed, for example, using copy of the purchase receipt on their cell phone, it could be validated based on a user-identity, or it could be based on a digital signature.

Once verified, the first step of provisioning can begin, and the site manager 704 can finish the necessary details to complete the route control-file 726. They might enter the selected vehicle computer device's 708, 710 identification causing a challenge to be sent to ensure the site manager 704 is in the presence of the correct vehicle computer device 708, 710. This might involve a change in state, a light sequence sent, or a display of a string, number, or value on a screen visible to the site manager 704, for example. Once the site manager 704 has validated they are in possession of the identified vehicle computer device 708, 710 they can finish building the route control-file 726 information. They might insert the information relating to the geographic destination from the purchase receipt, the number of passengers, insurance information, or contact information for the site manager 704 or the regional manager 718 so that they may be contacted should something go wrong.

When all this is complete, the route control-file 726 can be downloaded to the vehicle computer device 708, 710 via a wireless connection 714 or a wired connection 712 over the secure channel 742 to the route control-file watchdog 736, 738. The site manager 704 might also support a direct or short-range connection 706 like USB, Bluetooth, NFC, or some proprietary communication mechanism 706 to communicate directly with the vehicle computer devices 708, 710. This would provide even greater protection and security.

When the route control-file 726 is downloaded successfully the vehicle computer device 708, 710 will open, analogous to how a drug dispensing computer device opens when the drug control-file is downloaded. With the vehicle computer device 708, 710 open, a visual inspection can take place to verify that everything is in order. Cleaning steps, recharging steps, and food or beverage stocking may also take place. The vehicle renter 702 can then get into the vehicle computer device 708, 710, close the door and the final step in provisioning can take place.

Much like the drug consumer provides their user-identity to the drug dispensing computer device, the vehicle renter 702 can provide their user-identity to the vehicle computer device 708, 710. This user-identity may be required each time the vehicle is used during the rental period that has been purchased. The user-identity might be given on the outside of the vehicle computer device 708, 710, for example on the door handle. There could also be elements of the user-identity taken on the inside of the vehicle computer device 708, 710, like a blood pressure test, for example.

As with other embodiments, the user-identity might involve a biometric like a fingerprint, facial scan, deep vein scan, retina scan, or many other biometric inputs. There might be requirements in the biomedical space like a breath-alyser sample, a blood sample, a heart monitor test, or other steps to ensure the vehicle renter 702 is in good health and will not have a serious problem during the rental. For example, if the vehicle computer device is capable of flight 708, issues around turbulence, exhilaration, heart-racing euphoria, and other issues might be a concern.

When the user-identity information is collected successfully the vehicle computer device 708, 710 enters the fully provisioned stage and informs the central server 724 of this state change. The central server 724 then determines when to send the begin deployment command to the vehicle computer device 708, 710, This command might be sent immediately, it could be sent when a flight window opens, it might send it when a destination landing pad is expected to have an opening, or many other criteria could be used.

Once the begin deployment command is received, the vehicle renter 702 has limited control over the vehicle computer device 708, 710. Much like the drug consumer that has limited control of when they extract the dose when it is available, the vehicle renter 702 is being self-driven in the vehicle computer device 708, 710 and has no control over driving or the route that may be taken. In some embodiments it is possible the vehicle renter 702 might be given a choice to pick over route A or route B, but the destination might remain the same.

As part of the rental agreement, it is possible the vehicle renter 702 might have several stops, an overnight stay, or other trip interruptions before the vehicle computer device 708, 710 is returned. Each time the vehicle renter 702 exits the vehicle computer device 708, 710, for example when it is stopped, when it is parked, or for any other reason, the vehicle renter 702 might be required to re-confirm their user-identity to verify they are re-entering the vehicle computer device 708, 710.

During this entire rental period, the vehicle computer device 708, 710 can send status messages to the central server 724. This real-time information might be just informational, like current route status, current energy remaining, deviations from the planned route, or other details. The information might also include major alarms that could trigger alerts to the site manager 704 and others. In some serious cases, the alert might also be sent to the regional manager 718, and catastrophic cases an alert might be sent to the national manager 716.

Once the vehicle rental is complete and the vehicle computer device 708, 710 is returned, the vehicle computer device 708, 710 can be deprovisioned and prepared for the next renter. In some embodiments, it might be possible for a vehicle computer device 708, 710 to be dropped at a different location 730. In these embodiments, the new site location 730 would then take charge of the deprovisioning step and would add that vehicle computer device 708, 710 into its inventory.

Turning now to FIG. 8, there is a network overview 800 showing delivery drone 806, 808, 844 embodiment wherein different managers 804, 820 control the use of delivery drones 806, 808, 844 to deliver and pickup packages 846. This set of embodiments describe different methods for use the system to deliver packages 846 and pickup package 846 safely and securely, using self-piloting delivery drone computer devices "delivery drones" 806, 808, 844. It should be noted that there are other examples beyond drug dispensing, self-driving taxis services and package delivery drones that could benefit from the system disclosed in this application.

Like the examples of medical computer devices, the contents 846 within a delivery drone 806, 808, 844 could be valuable or dangerous. For example, a delivery drone 806, 808, 844 might be carrying lifesaving drugs 846 to a gravely sick patient 850. In some embodiments, the delivery drone 806, 808, 844 is picking up a package 846, or even a lifesaving package 846 that needs special security and safety. The package 846 might contain a part to a jet engine that needs immediate repair. There are many other examples where the package purchaser 850 feels that their specific package 846 for pickup or delivery is extremely important and valuable.

The design of the system places the central server 840 in authority over one or more managed computer devices 806, 808, 844. This principal allows for several advanced features that solve many problems for real-time control of in-use computer devices 806, 808, 844. These advanced features provide solutions for safe and secure swapping of computer devices 806, 808, 844 and for control over the computer devices 806, 808, 844 to be nested.

For example, a self-driving drone 806, 808, 844 under control of the central server 840, could be delivering a drug dispensing computer device 844 with an important drug or lifesaving medication also under control of central server 840. When the self-driving drone 844 arrives at its destination, the person 850 who requested the delivery (perhaps the patient or their caregiver), would then perform the final step of provisioning and provide a user-identity to the drone 844. Providing a user-identity moves the drone 844 into the fully provisioned stage, and in turn informs the central server 840 of this change. Moving to the fully provisioned stage then allows the central server 840 to send a begin deployment command to the drone 844. In this case, deployment involves opening the main compartment of the drone 844, which allows the person 850 to retrieve the package 846 inside. The package 846 inside could be a drug that that is under the control of a drug-dispensing computer device 122, 126, 128 (from FIG. 1), managed by the same central server 840. Once the patient 850 for the drugs provides their user-identity, this drug dispensing computer device 122, 126, 128 moves to the fully provisioned stage. Once it informs the central server 840, the central server 840 can decide to send a begin deployment command to the drug-dispensing computer device 122, 126, 128. Then, the drug-dispensing computer device 122, 126, 128 moves to the deployment stage and begins executing the drug control-file 136 which would allow for the dispensing of drugs following the dosage prescription established for this patient 850 by a trained physician.

The goal of the system is to provide a safe and secure system that is easily managed and trackable in real-time.

Tracking information can be monitored at the central server 840 and alerts can be enabled for one or more managers 804, 820 should any alertable events take place that are unexpected. Similar to as described in FIGS. 1, 2, 4 and 5 the delivery drone's 806, 808, 844 device identifier is used to first authenticate the delivery drone 806, 808, 844. When the authentication is verified at the central server 840, an authentication confirmation message is sent over the secure channel 816 to allow the assignment of the delivery drone 806, 808, 844.

As discussed in FIG. 7, once the delivery drone 806, 808, 844 is authenticated, different managers 804, 820 are authorized to set up the location and distribution of the delivery drone 806, 808, 844. It is possible to have any number of managers 804, 820 in the system as there is no specific limit on the ways to divide up and distribute the delivery drones 806, 808, 844. The creation of the multiple tiers of access and control can be done in many ways depending on the implementation and needs of the industry. Each industry will have ways to manage the system delivery drones 806, 808, 844 to ensure maximum efficiency.

In some embodiments, the fleet of delivery drones 806, 808, 844 are distributed using geographic boundaries. In these embodiments, the access rights to a portion of delivery drones 806, 808, 844 could be based on which part of geographic boundary a given manager oversees. In another embodiment, the vehicle computer devices are distributed based on authorization permissions. For example, if the FAA is only allowing flying delivery drones 806, 808, 844 to be used in a given region, then all flying delivery drones 806, 808, 844 might be assigned to one or more managers in that region. Embodiments can be implemented using components of FIG. 7.

Like the medical computer devices and vehicle computer devices, these delivery drones 806, 808, 844 may require different levels of authority on the delivery control-files 812. There are also limitations established for each tier of managers 804, 820 that take charge of each delivery drone 806, 808, 844 individually.

In some embodiments the delivery drones 806, 808, 844 are assigned based on warehouse locations 802. In some embodiments, the number of delivery drones 806, 808, 844 might also be based on the size of a given warehouse 802 for a given company 818. Some warehouses 802 could be massive. For these large warehouses 802 a very significant fleet of delivery drones 806, 808, 844 would be needed and many managers 804 could be located in the same warehouse 802. In this embodiment, the tiers within part of the system might be based on product type to be delivered. One manager 804 might get assigned a larger number of delivery drones 806, 808, 844 because the purchase, delivery or pickup of those packages 846 happens far more frequently.

As with other embodiments, the system is connected 810, 822, 828 through one or more networks both wired and wireless networks 824, 826. Network base stations 828, 830 are part of wireless networks 824, 826 when one or more of Wi-Fi, IoT devices, cellular devices or other wireless technologies are used.

Publicly available networks 824, 826 like the Internet 826 allow access for a range of mangers 804, 820 to the central server 840. In some embodiments, one or more of the networks 824, 826 could be located behind a firewall and use a virtual private network (VPN) to protect the exchange of information between managers 804, 820, package purchasers 850 and the central server 840. Connections can use wired links like Ethernet, Fibre links or other physical links. Radio frequency (RF) links could also be used, including cellular wide area public wireless links like GSM, GPRS, 3G, 4G and 5G networks. Other wireless links could be Wi-Fi links based on 802.11 protocols, Internet of Things (IoT) wireless networks or IoT protocols like LTE-M1 and, in some embodiments, Bluetooth and short-range wireless links.

Like the example of medical computer devices and vehicle computer devices, the first step in the system is to establish an authenticated relationship between the database 842 maintained by the central server 840 and the delivery drones 806, 808, 844. This then allows for the creation of a secure channel 816 to various delivery control-file watchdog programs 810, 814 running within the delivery drones 806, 808, 844. There are several embodiments to support this relationship.

In one embodiment the database 842 is populated with identity values from delivery drones 806, 808, 844 at manufacturing using a closed, private system to exchange information between these two endpoints. The exchange could also involve the exchange of encryption information like public encryption keys for an asymmetric encryption strategy, a symmetrical key, or some other encryption values like signed SSL certificates.

In another embodiment, each delivery drone 806, 808, 844 is populated with the public key of the central server 840 and it uses this value to send its own public key to the central server 840 with its identification.

Although not shown in FIG. 8, it is also possible that a central authority might be needed in the system, for example, to register all authorized delivery drones 806, 808, 844. This process might be needed to confirm they have been tested and have passed a strict certification process. In these embodiments, the central database 840 would use an API to exchange information as discussed in previous embodiments. In these embodiments, a self-directed delivery drone authority can keep a master database of all legal and registered delivery drone 806, 808, 844 and the central database 840 could use an API to retrieve or confirm that the delivery drones 806, 808, 844 being added to the central database 840 are legitimate and registered, tested and approved to carry packages 846. Similar embodiments have been discussed in FIGS. 1, 2 and 7.

Once authorized, each delivery drone 806, 808, 844 establishes a unique relationship and security connection to the central server 840 through one of the embodiments already discussed. For example, the system might be configured to use client-side and server-side SSL certificates, or the system could use a shared secret or encryption key exchange. In some embodiments, encryption keys are created at the application level using a seed value and public/private key pairs that can be used for asymmetrical encryption methods. These embodiments have been described in detail earlier. In those embodiments where client-side SSL certificates are used, the delivery control-file watchdog 810, 814 can create an encryption key to protect all delivery control-files 812 at rest within the delivery drones 806, 808, 844.

Once establishment of the relationship between the delivery drones 806, 808, 844 to the central server 840 is complete, one or more managers 804, 820 will take the first steps to set up a delivery control-file 812 for one or more of the delivery drones 806, 808, 844. The data in the delivery control-file 812 might include the drones' 806, 808, 844 assignments, the range they are allowed to travel to deliver packages, their life expectancy, and other high-level details. As already discussed, there are several embodiments for establishing top tier administrators 820 in the system.

For example, in one embodiment, the operators of the central server 840 can establish one or more top tier managers 820 of all delivery drones 806, 808, 844 associated to that central server 840. In other embodiments, the operator could be a large package delivery company 818 running its own fleet of delivery drones 806, 808, 844. In yet another embodiment, the central server 840 can create top tier managers 820 by interacting through the API to a central authority. As a company 818 registers to become a delivery drone 806, 808, 844 operator, this information would be updated in the central server 840. As in FIG. 7, the top tier manager 820 would then create many levels below themselves 820, like one or more warehouse managers 804. Each warehouse manager 804 would have visibility to only those delivery drones 806, 808, 844 that are assigned to them to manage.

With the delivery drones 806, 808, 844 established and authenticated at the central server 840, various package 846 delivery and pickup assignments can be given to them. This process is started by a package purchaser 850 that uses device such as a laptop computer, a desktop, a tablet, a cell phone, a watch, or one of many other devices to purchase a product or request a pickup for a package. There are many embodiments for how the purchased package 846 or the package for pickup 846 can enter the system and get assigned to a delivery drone 806, 808, 844.

In one embodiment, the package purchaser 850 may go to a website and purchase a product and a company 818 offering package delivery and pickup would receive the delivery request electronically through an API made available to their clients over a public network 824, 826 like the Internet. The package details around size, value and delivery location would be given to the package delivery company 818 to schedule a delivery or pickup. In this embodiment, the package details might also include the package purchase's 850 user-identity, biometric, digital identity, or some other identity value. As this information is related to the central server 840. it is associated to a database 842 delivery record that would eventually go into a delivery control-file 812.

In another embodiment, the user interface for the package purchaser 850 is offered by the company 818 or directly within the central server 840. The process in both embodiments are similar and the information about the package 846 and the package purchaser 850 is collected and associated to a database 842 record. As in the example of the person renting a self-driving rental vehicle, the package purchaser 850 would I have to upload some amount of personal, biometric, or digital identity information. In some embodiments, this can be done using the biometric reader on their cell phone, as most cell phones now come with fingerprint readers and facial scan software built into the product.

The API relaying of information method is similar in operation to what is done in the example of the centralized e-prescription service, in which prescriptions are started and relayed to the central server 840 to eventually make up part of the drug control-file. There are many embodiments for what information a user interface might show and provide to a potential package purchaser 850.

For example, it might be useful to provide the extra costs associated for a drone-based 844, delivery-in-minutes type service. It might be useful to warn the package purchaser 850 that extra identification will be needed to provision the delivery and the same identification will be needed again to receive the delivery at the target address. This warning could let them know they must be present and available at the destination address to receive the arrival of the delivery drone 806, 808, 844. In some embodiments, this is not a case and the package 846 is just left on the doorstep. Also, it might be valuable to show an estimated time of arrival for the drone computer device 806, 808, 844 based on the current drone-based package delivery schedule. If a pickup is being requested, the package purchaser 850 might have to provide exact dimensions of the prepared package 846 so that the correct sized delivery drone 806, 808, 844 is sent to ensure the prepared package 846 fits completely in the holding area.

The arrival of the package purchase 850 request and database entry 842 can trigger notifications to either an offsite manager 820 or a warehouse manager 804. One of these managers 804, 820 can begin the creation of the delivery control-file 812 that can be uploaded into a control-file watchdog 810, 814. In some embodiments, the offsite manager 820 might start the creation of the delivery control-file 812. Like the drug prescriber and drug dispenser cooperating to build a drug control-file, the warehouse manager 804 can bring up the partially completed delivery control-file 812 to see what details are available and complete the creation. In other embodiments, the warehouse manager 804 takes full charge of creating the delivery control-file 812.

One of the final steps in the creation of this control-file 812 might include checking the local inventory to confirm what that the purchased product 846 is available.

Based on the package 846 size, or the pickup package size 846, the warehouse manager 804 can look to the available delivery drone 806, 808, 844 inventory and determine if a delivery drone 806, 808, 844 exists that can perform the job. This might involve looking at power levels, for example, as it may be the case that while a delivery drone 806, 808, 844 is in the middle of a charging cycle, it still has enough power to make the round trip for the delivery. The warehouse manager 804 might include contact information that would be available over a short-range connection like Bluetooth to the package purchaser 850. Contact information may be useful should there be a problem with the delivery or package 846.

Like the drug dispenser verifying the drug consumer is supposed to receive the specific drug, the warehouse manager 804 could then confirm a usability and quality of the identity is present for the delivery. In some embodiments, this identity might then be added to the delivery control-file 812. In other embodiments, it might be transmitted directly to the delivery drone 806, 808, 844 over a direct connection 836 available only to the warehouse manager 804.

Once all the details are added to the delivery control-file 812, the first stage of provisioning can begin. In one embodiment, the warehouse manager 804 could enter the selected delivery drone 806, 808, 844 identification and a challenge would be sent to ensure the warehouse manager 804 is in the presence of the correct delivery drone 806, 808, 844. This might involve a change in state, a light sequence sent, or the display of a string, number, or value on a screen visible to the warehouse manager 804.

In another embodiment, the warehouse manager 804 might already have a direct connection 836 to the delivery drone 806, 808, 844. This connection would allow the central server 840 to verify its presence and confirm its current state as available and in good working order.

Once the warehouse manager 804 has validated they are in possession of the identified delivery drone 806, 808, 844 they can finish building the delivery control-file 812 information. They might insert the actual geographic destination from the purchase receipt or the pickup request. They could also include the package purchaser's 850 identification, package insurance information and contact information for the warehouse manager 804 and/or the regional manager 820, for use should something go wrong with the delivery.

When all this is complete, the delivery control-file 812 can be downloaded over the secure link 816 to the delivery control-file watchdog 810, 814 running on the delivery drone 806, 808, 844 via a wireless connection 810, 822 or though the warehouse manager's 804 direct connection 836. As mentioned previously, the warehouse manager 804 might support a direct or short-range connection like USB, Bluetooth, NFC, or some other communication mechanism 836. This would provide even greater protection and security.

When the delivery control-file 812 is downloaded successfully, the delivery drone 806, 808, 844 opens, exactly as a drug-dispensing computer device opens when the drug control-file is downloaded. With the delivery drone 806, 808, 844 open, a visual inspection can take place to verify that everything is in order. Any additional cleaning steps can also take place. In those embodiments where a package 846 has been purchased, the package 846 can now be placed or secured into the delivery drone 806, 808, 844 and the door or compartment can be closed. In the embodiments where a pick-up is requested, after the door is closed the final step in provisioning can take place.

Much like the embodiment wherein the drug consumer's identity is automatically uploaded to a drug-dispensing computer device, the identity of the packet purchaser 850 can be extracted from the delivery control-file 812 and verified by the delivery done 806, 808, 844. This might involve a confirmation sound, a visual display change or some method so that the warehouse manager 804 knows the delivery drone 806, 808, 844 has accepted the identity value successfully.

When the identity information has been collected and confirmed, the delivery drone 806, 808, 844 enters the fully provisioned stage and informs the central server 840 of this state change. The central server 840 then determines when to send the begin deployment command to the delivery drone 806, 808, 844, This command might be sent immediately, or it could be sent at a later time, for example, when a flight window opens, which could be based on interacting with a flight-control central server. It might also be sent to match the timing promised to the package purchaser 850, based on wind conditions and other environmental factors.

Once the begin deployment command is received. the delivery drone 806, 808, 844 leaves, following information in the delivery control-file 812. This might require the delivery control-file watchdog 810, 814 to pass the route information to a route-guidance sub-system for execution.

Once the delivery drone 844 arrives to the package purchaser 850, they may have limited control over what they can do with the delivery drone 844. In some embodiments, they might only have the control to enter their biometric information to open the main compartment to remove their package 846. In another embodiment, they might hold up their identity card or photo ID for scanning, digital conversion and reading for full verification before removing the package 846.

In other embodiments, the package purchaser 850 could enter their biometric information and the delivery drone 844 would open to allow them to insert a package 846. In another embodiment, they might hold up their identity card or photo ID for scanning, digital conversion and reading for full verification.

In yet other embodiments, the package purchaser 850 might first remove a package 846 and then they might also have scheduled to have a second package 846 picked up. This would be a convenient method to save some of the cost for a full unpaid return trip by a delivery drone 806, 808, 844 that had completed its delivery run. Having the return trip of a delivery drone 846 result in a package 846 coming back to the warehouse manager 804 for additional delivery would be an ideal way to optimize the delivery drone 806, 808, 844. This pick-up method and product offering would be equivalent to a package 846 pickup by a courier service.

In other embodiments, the delivery control-file 812 has multiple job assignments contained in the one delivery control-file 812. In these embodiments. the delivery drone 844 first delivers a first package 846 and then on its return to the warehouse 802 it has a scheduled stop to pick-up a second package 846. In this way a drone delivery company would be able to optimize the use of their delivery drone 806, 808, 844, economize on the power costs to run the delivery drones 806, 808, 844 and make a better profit from their drone delivery system. The use of a delivery control-file 812 that is built by one or more managers 820, 804 with the help of the central server 840 would mean that optimal flight paths and energy output requirements could be built into Artificial Intelligence (AI) processors built into the central server's 840 software logic.

During this entire delivery trip, including at every stop, the delivery drone 806, 808, 844 can send status messages to the central server 840. This real-time information might be just informational, like current route status, current energy remaining, deviations from the planned route, and other details. The information might also include major alarms that could trigger alerts to the warehouse manager 804 and others. In some serious cases, the alert might also be sent to the regional manager 820, and serious cases where a delivery drone 806, 808, 844 has fallen out of the sky or failed in some other serious way.

Once all packages 846 are delivered, picked up, both delivered and picked up, the delivery drone 806, 808, 844 returns to the warehouse manager 804. At this point, the warehouse manager 804 can deprovision it, remove the delivery control-file information and prepare it for its next job. In some embodiments, it might be possible for a delivery drone 806, 808, 844 to be dropped at a different location that where it started. In these embodiments, the new site location would then take charge of the deprovisioning step and would add that delivery drone 806, 808, 844 into its inventory. Such optimizations might be necessary for certain routes to allow for the correct energy expenditure and depending on the availability of delivery drones 806, 808, 844 at different locations.

Turning now to FIG. 9 there is an example transportation embodiment 900 for a route control-file, or a delivery control-file layout and its contents. The set of example configuration and information elements shown in this illustration 900 are just a small subset of all the potential elements that a given implementation might decide to use. In some implementations, there could be fewer elements and in other implementations there could be more elements.

As discussed in FIGS. 7 and 8, there are different embodiments in which moving computer devices need to be deployed, controlled, and managed with a central server. For one or more managers connecting to the central server (and its associated database files), these managers would have the ability to fill in the necessary configuration and control information used to guide the control-file watchdog program. In some cases, a portion of this information might arrive to the central database from another source, like a vehicle or drone delivery rental website.

To complete the control-file 900, an interface can be provided on the central server or through the vehicle watchdog program itself, to guide the manager to complete construction of the necessary information. Where necessary, this interface would include things like drop-down menus, pick-lists and scrolling lists and help menus in those cases when there is confusion about a given field's meaning.

The division of the sections has been made to assist in understanding and explain different sections of the drug control-file 900. In some embodiments, not every field will necessarily be transferred across to a vehicle computer device or the delivery drone. In some cases, a field is meant for the central server and its presentation of information to those managers that are allowed to view the configuration and tracking messages for a given computer device. In some embodiments, every field could potentially be sent and viewed by an authorized manager.

Section 902 has some introductory elements that are useful for determining basic setup and selection of the computer device. For example, in some embodiments there could be a very wide range of self-driving vehicle computer devices that can be rented. In another embodiment, there could be a wide range and sizes for delivery drones for handling a vast array of package delivery needs. In this embodiment, the pickup size might determine which delivery drone must be used.

The configuration entry for 'program allowed to access file' [i.e. the control-file] can be used to identity the specific program that is allowed to access the file. For example, a route-control program might be listed that the vehicle watchdog would allow to read the file or allowed to execute the route information.

In some embodiments, where a highly complex vehicle computer device is used, the watchdog might be one of several programs running. There could be separate programs for monitoring road conditions, flight airspace conditions and obstacles, and many other programs.

The vehicle watchdog can ensure that none of these other programs can read, change, or access the protected file. The more complex the system, the operating system, the environment, the subsystems and/or the firmware, the higher chance that a virus or malicious software program could find an access point and exploit the system.

The next field, External Identifier, might be present to allow external identification of a specific computer device. In some embodiments, the central server might already know that only one specific computer device can be used. For example, only one vehicle transportation computer device might have the battery size and charge to make the requested trip. As another example, perhaps only one delivery drone has the strength and capacity to carry the purchased package or the pickup package size and weight.

Next, the example fields that are shown include the computer device user's name, identification information, contact information, and personal information. These might be important elements for several reasons. For vehicle rental for example, this might allow the site attendant to confirm the identity of the person to ensure they are the same person that has rented the vehicle.

The next fields deal with biometric identification, digital identity codes, sub-dermal identification, or other methods of identification. In some embodiments, the central server has received this information during the time of rental, and in some other embodiments during the time of package purchase or pickup request. Identification information can vary from implementation to implementation depending on the risk involved to the company providing the service. Self-driving vehicles for example would most likely have a higher cost per vehicle and greater protections would be employed with them. Similarly, some large delivery drones might be very expensive and the company using these computer devices might not want a malicious computer device user to damage, hack or steal their property.

The final field in the first section 902 is for consideration of prepaid purchases, versus paying on the spot. When renting vehicles for example, there are several possible embodiments for implementing a pre-paid system to ensure renters do not reserve vehicles and not show up.

The second section of fields 904 are a grouping of security and route information fields. In some embodiments, the GPS or route information might contain route information requested by a vehicle renter. For example, they might have requested a trip to a specific location, but asked for a quick stop to pick up a second passenger. In another embodiment, the GPS and route information might have been pre-selected by the central server for a delivery drone's route to deliver or pickup a package. In other embodiments, this field may not have the route request information or a pre-selected route and the site attendant might have control over any route adjustments for the vehicle.

The next few fields are a collection of safety and security fields. For example, the computer device user's previous status might be a ranking score based on the computer device user's past behaviour. This could be a good ranking or a poor ranking. While this system may be used in the case of a vehicle rental, it may also be used in the case of package delivery or pickup, a sven a person that requests packages to be delivered or picked up might have abused in the system in past rental attempts.

For high risk rentals like air-borne flights, there could be requirements to collect EKG, EEG, blood pressure results, and other results to ensure the renter can handle all the elements and risks in the trip itself and correspondingly, fields to store this data. These fields would be focused on renters that are physically present to take a computer device away, versus a person receiving a package or asking for a package pickup.

The next fields might be included for the national or regional manager to protect their assets. The site computer attendant information, employee ID, biometric sample in some embodiments, might also be needed. For situations were maximum caution is required, this parameter might have to be matched before the computer device will operate or before the central server will even allow the control-file to be downloaded to the computer device. The final field might allow the site attendant to provide the start of the usage for the computer device and any other comments about the device's condition, battery charge condition, or other computer device specific information.

The next third section 906 and fourth section 908 could be used to provide more specific information required by the vehicle computer device. The third section 906 might be needed for rental contract information pertaining to the parameters of what has been requested by the renter. The first two fields could provide information relating to the assigned travel zone of the device, the maximum rental period, or limitations around battery size, overall capacity or other limitations.

The next field could be used to indicate if there are rental restrictions placed on the computer device being rented. For example, if restrictions are required, it could limit whether drinking, smoking, or eating are allowed within the vehicle. There could also be restrictions around pets, the total number of occupants allowed and many other limitations.

The next fields could be used to list potential comments for the renter, agreements to sign, or waivers to sign. This information might be used by the site attendant and presented to the renter for signatures, authorization or biometric authorization.

The fourth section 908 is an alternative example of specific computer device requirements. The two fields highlighted focus on delivery drone information relating to packages to be delivered and picked up. In some embodiments this might include the inventory number, location in the warehouse, the size of drone required, insurance on the item, the care to be taken with the items and many more. There could be additional fields that indicate the drone's final destination when it has completed its deliveries and pickups. In some embodiments, most drones would not return to the same place they originated but would instead fly optimized patterns that crisscrossed the city making optimal use of battery charge and route patterns.

The final section illustrated 910 would include various passwords for managers, contact information (in some embodiments) and permission levels for each of the managers in the system. For example, it is likely in the vehicle renting environment that the site attendant might be allowed to review the renter's contract information, collect additional information, and deploy a computer device. However, the attendant might not be allowed to watch the real-time route data from the computer device. Instead, they might provide contact information so that alerts can be given to them by the central server when an alertable event takes place.

Figure 10A:
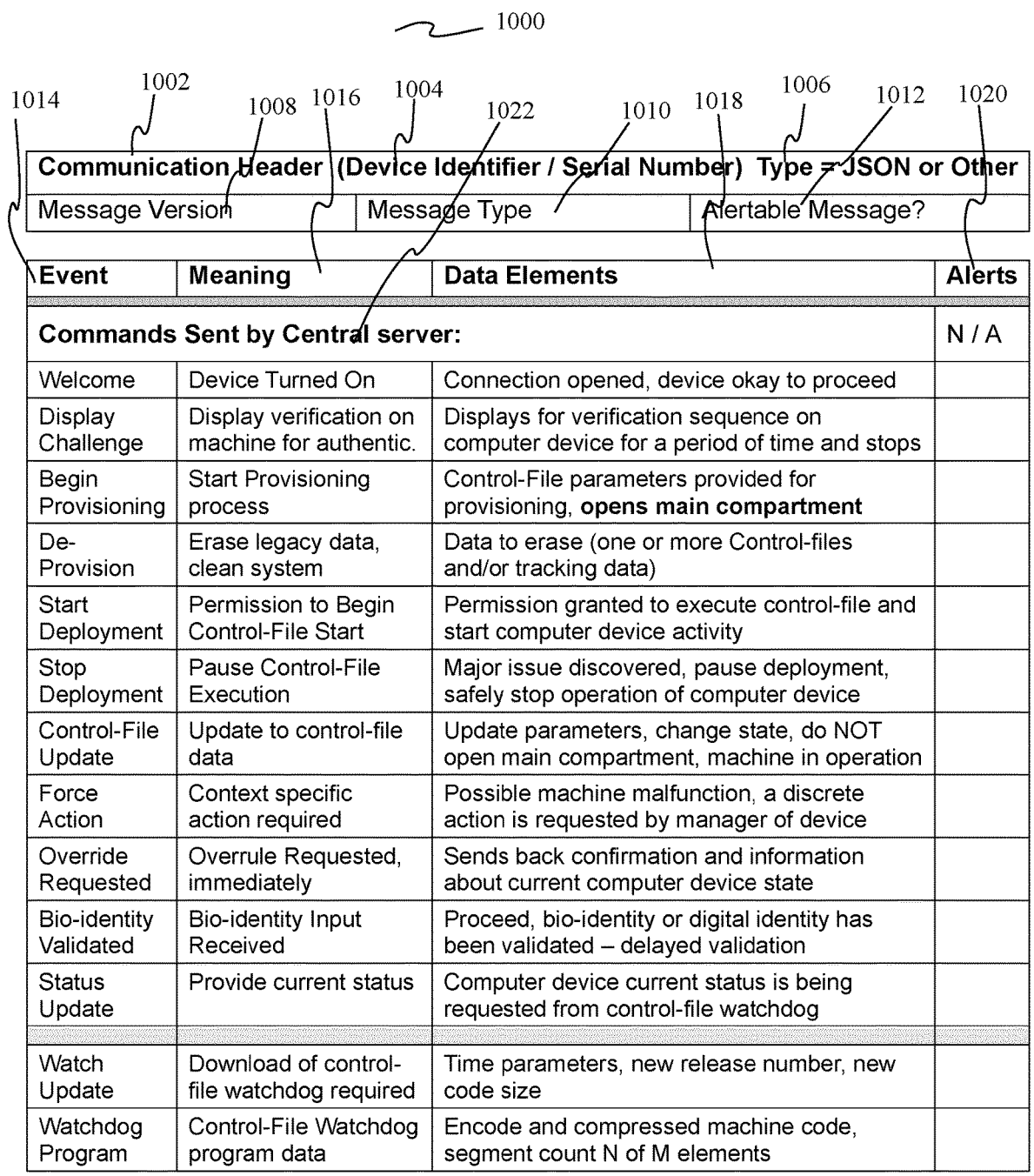
FIG. 10a is an example set of commands sent by the central server to a managed computer device.

Turning now to FIG. 10*a* there is an example set of commands 1000 sent by the central server to a managed computer device. This is a representative set of commands 1000 that be sent in support of the earlier examples explained in the previous figures. In those examples, and others not included in this application, there could be additional or expanded commands 1000 to deal with special conditions and functionality within a given implementation.

The messages in this example starts with a communication head 1002 that provides the device identifier 1004 in some fashion. This could be an encrypted serial number, a manufacturer number, a SIM card identity, or anything known to both the server and computer device. As discussed in detail above, encryption could use the server's public key, a symmetric key or communication could be in plain text if a secure communication path is provided by the underlying network. The header 1002 might also include the message format 1006, like JSON or XML or some other format method.

The next line shows some additional fields like the message version 1008. As a product evolves and grows, the message header 1002 might change and add new fields. The message version 1008 helps to determine what fields are included and helps with parsing challenges. The message type 1010 carries the Event 1014 name, in this case the command for the computer device. The alertable message field 1012 indicates if the message should generate an alert 1020 with the central server. In this example, this is not applicable (N/A) for commands sent to the computer device 1000, and only has yes/no values for message received back from the computer device 1030, 1050.

Each event 1014 carries a brief meaning 1016 in this table to describe how it is used. Additional information is provided in the data elements 1018 portion of the table to indicate possible side effects and key parameters exchanged. The Alerts 1020 field is used for messages from the computer device 1030, 1050 to indicate to the server if special action should be taken to inform one or more of the computer device managers that something serious has happened. These alerts may be generated, for example, if the patient has missed taking their drugs, or a drone is out of power and needs to do an emergency landing.

The following section provides some additional information, on top of the information already provided in the table. If a command is about to be sent to a computer device and it requires a manager to be physically present for this command to work, then a Display Challenge command can be sent. For example, if a rentable, self-driving computer vehicle is about to be taken away by a renter and is being provisioned for the first time, in some embodiments, a computer device manager must be present to oversee this process. In another example, if a drug-dispensing computer device is about to be loaded physically with drugs, in some embodiments a computer device manager (pharmacist) should be present to perform this action.

Once this Display Challenge is sent the computer device, the manager has a certain amount of time to prove they can physically see what is displayed at the computer device. Once confirmed, then an assignment confirmation message can be sent to begin provisioning, and the next steps in provisioning can take place. De-provision is used primarily to wipe any saved user-identity (digital, biometric and biomedical) information at the computer device so it can be returned to the shelf.

Once a computer device is fully provisioned, the central server can decide when to send a Begin Deployment command. This allows the computer device watchdog to start executing the control-file and to allow other programs to execute the control-file. For example, as discussed earlier, a navigation program might be defined who would be given the GPS coordinates to fly the device or drone to its destination. A stop deployment command could be issued by the server if the computer device were finished deployment or if a critical problem were discovered. For example, a drug-dispensing computer device might have run out of drugs so deployment should be stopped, and the computer device returned to the pharmacy. In another example, perhaps an error is found in the physical paperwork of a computer vehicle renter and it is believed that a fraud occurred and that the computer device could be stolen. A stop deployment command could be issued and the vehicle computer device might land or stop moving there and then, on the spot.

Updating the control-file might be done for many reasons and demonstrates the power of the central server's control over the computer device. For example, route information could be updated to allow the vehicle computer device to avoid a storm. For another example, perhaps a drug consumer needs to take an extra dose of drugs each day. In this example. a command could be issued to add an additional dosing time in each day. In specific cases a Force Action command could also be used to cause an override to take place in the normal computer device's actions as it follows the control-file. For example, a drone computer delivery device might be told take an unscheduled stop at a loading, distribution center to check its payload. In another example, it might be necessary to force a drug dose to be extracted as the biometric input for a patient has stopped working. This can happen, for example, if their finger is wet or the biometric reader is dirty.

There are other examples provided in the table to illustrate other specialized functions. For example, there could be a need to update the software on the computer device. A series of commands could exist to allow the preparation of the new software, followed by the software itself in machine code format. There are also situations where continued operation is dependent on getting a user-identity approval of the data received from the computer device. For example, a drug consumer might have to provide a photograph of themselves taking a drug to support self-witnessing in order to get additional drugs. These types of actions are common for people dealing with additions, like opioid additions.

Turning now to FIG. 10b there is a set of example messages 1030 received by the central server from a managed computer device. This is a representative set of messages 1030 that may be sent from the computer device to the central server 1032. They are included to show support for the earlier examples explained in the previous figures. In those examples, and others not provided, there could be additional or expanded messages to deal with special conditions and computer device functionality within a given implementation.

Most of the received messages 1032 are self-explanatory based on the event, meaning and data elements provided. The alert field is populated to indicate its potential importance from the computer device's point of view. Confirmation at the central server, done by one or more of the managers, might override alter settings to determine specifically what the central server intends to act upon. Some brief highlights of these messages will now be provided.

Through the operation of the computer device, it might be necessary to send a Status message to check-in and provide its current state and check for additional work or commands that are pending. In some implementations, the computer device might only get plugged in and acquire a communications link for a short period, for example once a day while charging at night. In other embodiments, the underlying network might not provide a continuous, real-time, bi-direction communications link, so the Status message allows for a polling operation to check for data and commands.

Certain commands received from the central database 1000 are important enough to require a confirmation. For example, Device Opened, Provisioning Start, Provisioning End, Deployment Confirmation, Deployment Stop and Device Update messages are sent in direct response to a command received from the central server.

Most of the other messages fall into the category of status messages for events taking place on the computer device. These status messages fall into normal operation, like Device Resource Used, Device Activity, and User-Identity messages to name a few. Other status messages like Device Resources Low, Device Resources Gone, Battery Near Dead, Device Forced Entry and others indicate something unexpected has taken place. Generally, in most embodiments, unexpected events would be considered alertable 1034 and the central database could take whatever action it deems necessary. In some embodiments, it might simply change a displayed counter, seen by the computer device manager. In other embodiments, it might change the counter and also send an email message or SMS message to the computer device manager or a support person for that computer device to warn them something has taken place.

Turning now to FIG. 10c there is a second set of example messages 1050 received by the central server from a managed computer device. This is a representative set of messages 1050 that may be sent from the computer device to the central server 1032. They are included to show support for the earlier examples explained in the previous figures. In those examples, and others not provided, there could be additional or expanded messages to deal with special conditions and computer device functionality within a given implementation.

FIG. 10c is a continuation of FIG. 10b and includes some additional messages sent from the computer device and received at the central server 1032. Most of these illustrate messages related to user-identity and biometric actions taken on the device. These could include identity verification in order to reach full provisioned state. Such messages would be confirming a user-identity approval command received. In other embodiments, there could be messages relating to many other types of unique verification like GPS route markers that had been reached by a specific time, for vehicle computer devices.

Figure 11:
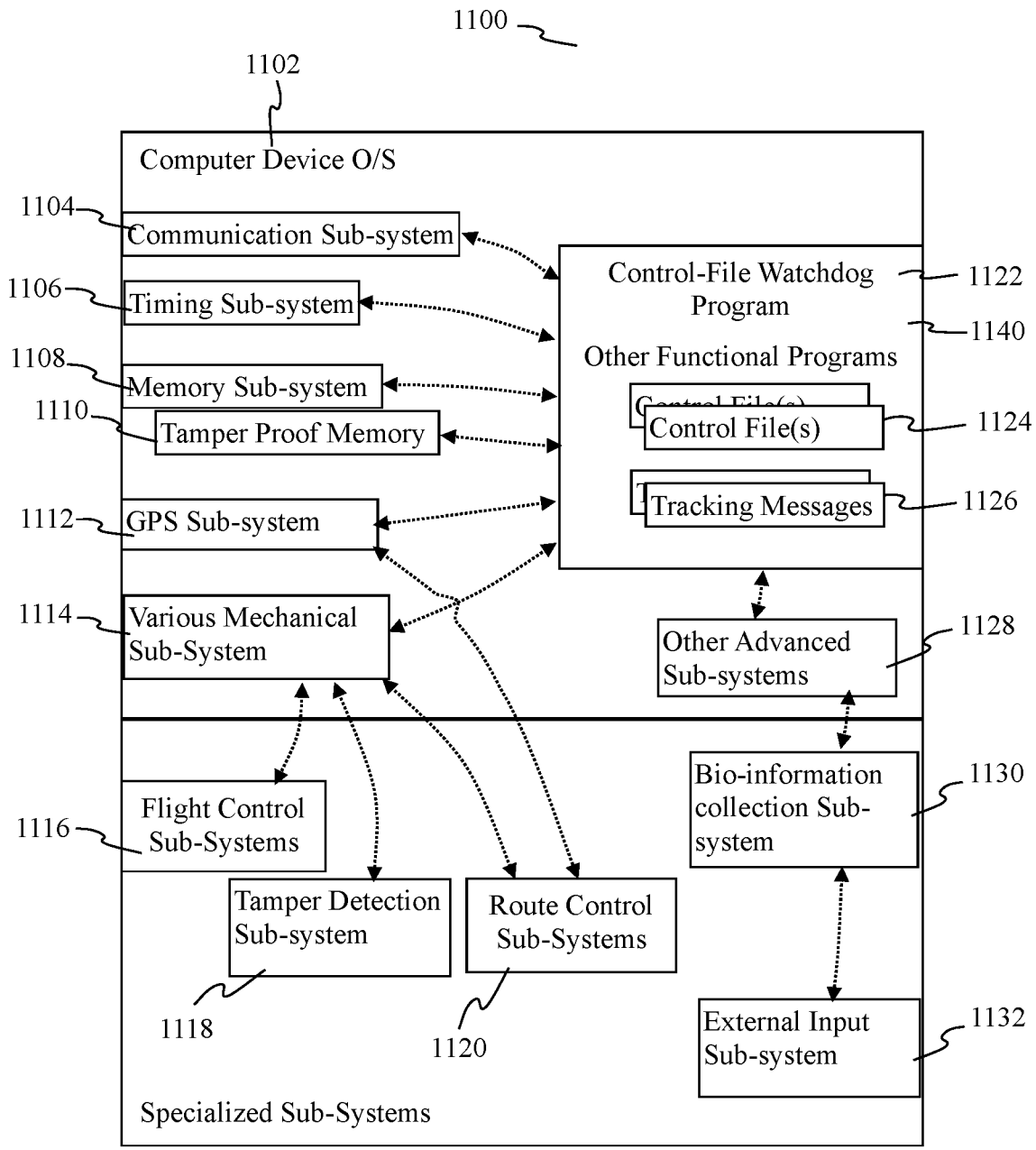
FIG. 11 is a more detailed illustration of a control-file watchdog and the hardware elements within the computer device.

Turning now to FIG. 11 there is a more detailed illustration of a control-file watchdog program "control-file watchdog" and the hardware elements within a computer device 1100. The computer device 1100 is running a controller software 402, called an operating system (O/S) in this illustration, but in other embodiments, it could also be referred to by other names, such as firmware in the case of software on an embedded device.

The O/S or firmware provides interfaces to a series of sub-systems available for use by one or more programs trying to control the computer device 1100. In one embodiment, these sub-systems could be reached using application program interface (API) calls. In other embodiments, these sub-systems can be linked directly to programs loaded onto the computer device 1100. The computer device 1100 illustration is provided as an example of one embodiment and other possible sub-systems could be included in other embodiments.

For example, within the mechanical sub-system 1114 there could be various embedded sub-systems. For example, a warning-light sub-system could be present, or a console display sub-system in those cases where the computer device 1100 includes a set of LED lights, a computer panel, or an LCD display supported by hardware elements within the system. There could also be auditory sub-systems for making sounds and a digital display sub-system to display various messages to the computer device user, who has been allowed limited control over the computer device 1100.

In another embodiment, an accelerometer sub-system might be present if the PCB includes an accelerometer chip. In the other advanced sub-systems, there could be a camera or some other video-capable equipment. Further, there could be heartbeat monitors, blood analysis mechanisms or even urinalysis equipment built into the computer device 1100. Many other possible enhancements could be included depending on the needs and design goals of each specific type of computer device 1100.

The first sub-system listed is the communication sub-system 1104. This sub-system 1104 could be used to delivery tracking messages 1126, and for sending or receiving the control-file 1124. There have been many possible communication methods discussed for this sub-system 1104, including USB, Bluetooth, Ethernet, specialized IoT communications and traditional cellular communications. This sub-system 1104 might support just one or many of these types of communication methods for controlling the computer device 1100. The communication sub-system 1104 may also be used to negotiate the encryption key with the central server.

The next sub-system illustrated is the timing sub-system 1106. The timing sub-system 1106 might allow for programs to set timer alarms and be notified when the timer expires. Such timers are often used to indicate the passage of time.

The use of a timer by the control-file watchdog 1122 or other functional programs 1140 can result in various behaviour actions and reactions within the computer device 1100. For example, when a timer expires it could indicate that it is time for another drug dose to be dispensed for the drug consumer. This might be done by the drug control-file watchdog 1122, or a support dose tracking firmware program. This might then trigger a call to the user-identification sub-system 1130 to get a biometric confirmation of the accessing person's identity before allowing them to consum the drugs.

The memory sub-system 1108 is the next sub-system shown and is used to store and retrieve information which is local to the computer device 1100. Within the memory sub-system 1108 could be an encrypted back-up copy of the control file 1124, should the computer device 1100 fail or should a re-boot or reset occur. The current encryption key could also be saved in a tamper-proof section of the memory sub-system 1110. Such tamper-proof memory chips 1110 are common on smartcards, cell phones and other advanced circuits. This type of memory 1110 can also be included with secure enclave processors and firmware components. The tamper-proof memory sub-system 1110 could also be used to store tracking messages 1126, encryption keys and other data that needs the highest level of security.

The next sub-system is the GPS sub-system 1112 which could be used to retrieve the current GPS co-ordinates on the globe. In some embodiments. the control-file watchdog 1122 and other functionality-based programs can use the GPS co-ordinates in every message going back to the central server to provide real-time tracking events of where the events generating the messages occurred. In the cases of a moving vehicle computer device 1100, these types of GPS signals could be essential, especially for use by the route control sub-system 1120. In some embodiments, the route control might have a direct link to the GPS sub-system, especially when API calls are provided by each of the sub-systems.

The next sub-system is collection of mechanical sub-systems 1114 that could include flight control sub-systems 1116, tamper-detection sub-systems 1118 and route-control sub-systems 1120. There are many other possible sub-systems, for example, a camera or video sub-system, a collision detection sub-system, and many others. In this illustration, the tamper detection sub-system 1118 could be used to detect any attempts to forcibly open or break the computer device 1100. This might be especially important if it was in the active deployment phase of operation.

The mechanical sub-systems 1114 could be designed to provide control to physically moving parts, LED illumination parts, physical auditory sounds, and display sub-systems within the computer device 1100. Different embodiments might have a collision sub-system to help prevent accidents and a breaking system to stop the vehicle. In another example, for some embodiments, the mechanical sub-system 1114 is used to illuminate one or more LED lights to inform the drug consumer of a specific state. For example, there could be a state when the drug consumer has 'N' minutes to extract their dose before it is considered missed. There could be other sub-systems to detect when the power is low, when wireless coverage is poor, or other important state changes. In other embodiments, there are advanced sub-systems for tracking blood pressure readings, blood glucose levels, EKG monitors, and heart rhythms detectors and many others.

Once installed within the O/S or firmware, the control-file watchdog program 1122 provides oversight to the operation of the computer device 1100 and the use of the control files 1124. In some embodiments, the control-file watchdog 1122 might execute and control the operation of the computer device 1100. In other embodiments, the control-file watchdog 1122 could allow other authorized functional programs 1140 to read and execute the control files. These embodiment might require the control-file watchdog 1122 to ensure that only the correct and configured functional programs 1140 access the file and no other programs. For example, it might be possible that a virus, malware, or rouge program has been loaded onto the computer device 1100 and is attempting to gain access to the control files 1128. It would be part of the control-file watchdog's mandate to thwart all these attempts.

Part of the control-file watchdog's role 1122 is to create a tamper-proof and secure environment where one or more control files 1124 can be securely downloaded and stored in the memory sub-system 1108, such that they can't be changed, modified or damaged without such actions being detected. Another role of the control-file watchdog 1122 is to provide tracking messages 1126 for a range of situations and events. These tracking messages might indicate each time a rented vehicle computer device reaches a destination, or each time a drug is dispensed from the drug dispensing computer device 1100, for example. As a further example, messages could indicate if someone is trying to break into the computer device 1100.

When available, messages about current location from the GPS sub-system 1112 would be valuable to understand exact the location of the computer device 1100, when a dangerous situation takes place. For example, if a computer device 1100 is stolen, messages could be transmitted with tracking information. The control-file watchdog 1122 and other functional programs 1140 could also use other advanced sub-systems 1128. These can include a user-identification sub-system 1130 and the external input sub-system 1132. These are just two example sub-systems within the advanced sub-systems 1128 section, but there could be many others.

When first provisioned by a computer device manager, the control-file watchdog 1122 might use the mechanical sub-system 1114 to open the main door of the computer device 1100 so that cleaning and preparation actions can be performed on the computer device 1100. Once initiated, the control-file watchdog 1122 could make use of the timing sub-system 1106 to know precisely when the next deployment action should be taken. This might involve, for example, taking a vehicle computer device 1100 to a next destination, or dispensing another drug out of a drug-dispensing computer device 1100.

The memory sub-system 1108 could also be used to store tracking messages 1126 should the communication sub-system 1104 indicate that communications to the central server cannot be sent. Otherwise, the communication sub-system 1104 could be used to deliver tracking messages 1126 using one of the many possible communication methods already discussed. The communication sub-system 1104 is also used to get the initial control file(s) 1124 onto the computer device 1100, and to negotiate the encryption key with the central server. The control-file watchdog 1122 could also use the user-identification sub-system 1130 to first memorize the identity of the computer device user, through the collection of one or more biometric inputs.

There are many other algorithmic procedures that can be further added through the other, authorized functional programs 1140 and supported by sub-systems not illustrated in this figure. For example, a flight control sub-system 1116 might use independent, aerial drones to support its flight and watch for obstacles in the way. This might be combined with GPS input to adjust a route path should a flock of geese be detected in the flight path. This and many other advance behaviours are possible.

There are many other possible sub-systems that could be present to perform advanced functions 1128. In one embodiment, there is a sub-system to interact with an external wearable devices 1132. The external input sub-system 1132 might be able to detect whether the vehicle renter's heartrate is within an acceptable range, or whether a drug has been consumed and ingested by the drug consumer. For example, in this embodiment, the external input sub-system could be programmed to detect a signal measuring the chemical reaction caused by the drug consumer's stomach acids on the ingested drugs and the chemicals they contain. This signal would then passed through external input sub-system 1132, to the user-information collection sub-system 1130 to the advanced sub-system component 1128 and onto the control-file watchdog program 1122 or to another functional program 1140, to allow for the next dose of drugs to be dispensed and consumed. There are many other embodiments possible with the addition of hardware and software components.

Figure 12:
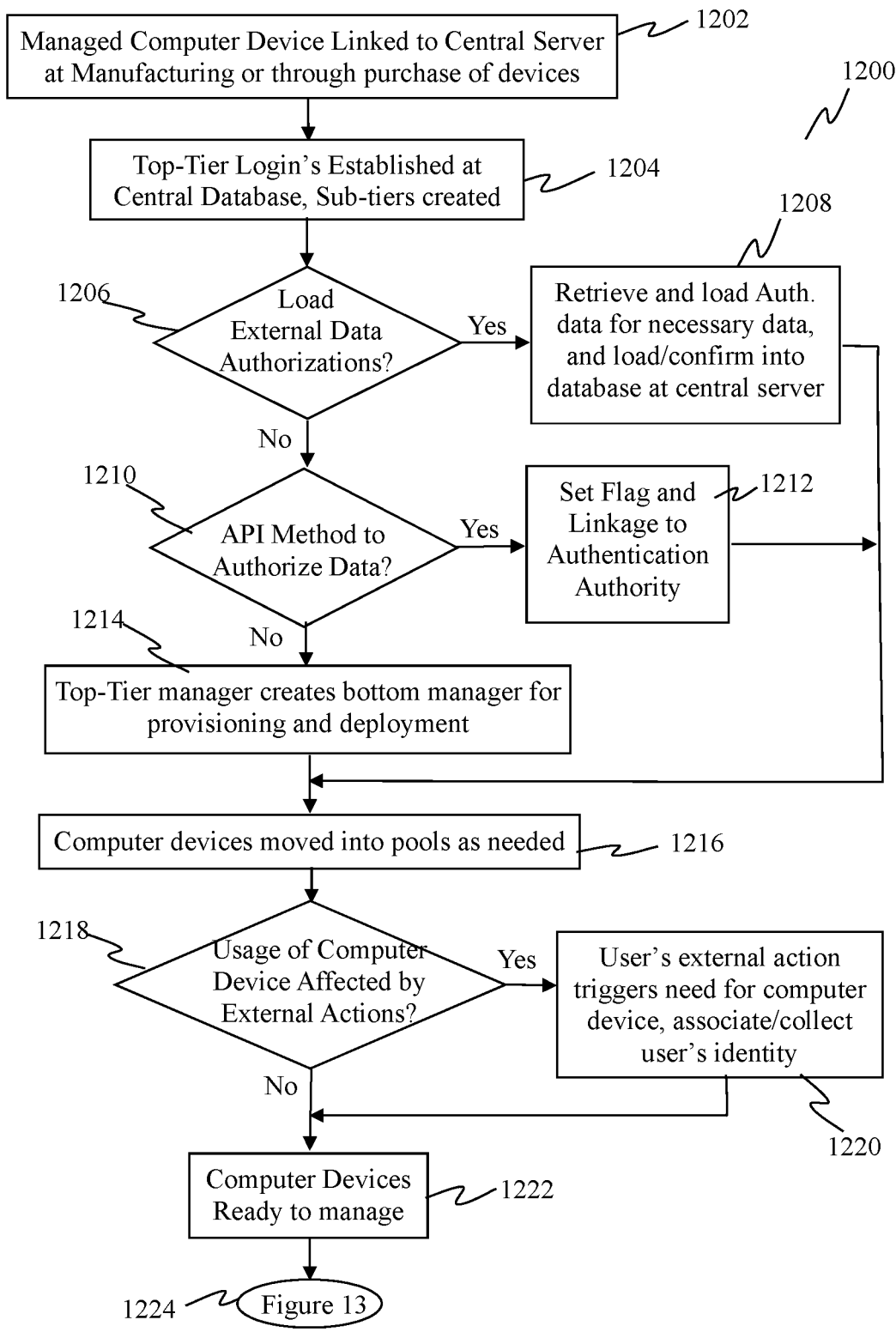
FIG. 12 a dataflow diagram of one embodiment for a drug prescriber to set up a drug control-file.

Turning now to FIG. 12, there is a data flow diagram 1200 of one embodiment showing the first steps in setting up a central server to manage computer devices. There are many embodiments for setting up system for managing computer devices. The examples discussed in this application in no way represents the totality of options, alternatives and embodiments that could be utilized to create a working system. The steps included in FIG. 12 are included as they cover the necessary steps to support earlier examples of the systems setup and operation.

The first step is the creation of a linkage between the central server and the managed computer device 1202. This linkage could be established at manufacturing time through a secure physical plug-in with the computer device as it goes through its initial firmware load and testing phase 1202. The computer device could have a hidden USB plug or coupling system to create a physically secure link to the central server and its database storage. During this plug-in, the serial number, motherboard identifier or some identification value could be given to the central server. Additionally, a pair of public encryption keys could be exchanged to support an asymmetric encryption strategy using elliptical encryption, quantum-safe encryption or some other encryption strategy.

In another embodiment, each manufactured device has the central server's public key stored within it. This encryption key could have been coded directly into the firmware, or it could have been provided during manufacturing. When the computer device is first purchased and turned on, it would send its own computer device identification to the central server by encrypting it with the central server's public key 1202. Only the central server, using its private key, would be able to decrypt, read and retain this value in its database 1202. The central server would have been given the range of values to expect for computer device's being manufactured so that a rogue computer device could not enter the system.

In another embodiment, the central server also provides a signed certificate to the computer device during manufacturing 1202. The signed certificate could be used during communications to verify that the computer device is a legitimate computer device. These embodiments and others have been discussed several times in earlier parts of this application.

During the installation of the central server, a top-tier manager is established to manage the uppermost security levels in the system 1204. In some embodiments, this could be a cloud-based product offering and this top-tier manager would be for managing all major accounts across companies and industries 1204.

In other embodiments, the top-tier manager is for a private installation of the central server within a specific organization 1204. For example, the organization could be a hospital using a vast array of different drug dispensing computer devices, or a drone delivery company using delivery drones to provide the fastest delivery of packages in a city, region, or country 1204.

In some embodiments, additional levels of sub-managers are created to manage large numbers of computer devices 1204. There is no limit on the number of sub-managers that can be created; there could be as many levels as is needed to effectively manage the system and the computer devices 1204. For example, Walgreens, large pharmacy chain, has over nine thousand locations in the USA. In Canada, Shoppers Drug Mart has over one thousand three hundred locations. If these companies were to implement an embodiment of this application, there could be a sub-manager for each location who would have their own local control over their pharmacy location 1204. The bottom tier of all these sub-tiers, represents a pool to contain computer devices to be managed.

With top-tier managers and sub-managers created, there could be many pools where bottom-tier managers and the computer devices they manage can be placed. There are embodiments wherein the managers of the computer devices, and in some embodiments the computer devices themselves, fall under the control of an external authority and require external authorizations 1206. For example, if a central database was created, installed and set up to manage rentable self-flying vehicle taxis computer devices, they might be tightly managed by the Federal Aviation Authority (FAA). In this example the FAA could provide data to confirm the identification of approved flying taxis and confirm those managers that have training to set up control-files and directly control these rentable flying VTOL taxis. In this example, the information for both the flying computer devices, and the managers that control them, would be retrieved and used to populate the central server's database 1208.

In another example, it is possible that only the bottom-tier managers of the system must be retrieved and verified from an external authority. In the embodiments where drug dispensing computer devices are being managed, the National College of Pharmacists (NAPRA) or some other local, state or provincial body might provide a database of accredited pharmacists that are allowed to dispense drugs using a drug dispensing computer device 1206. In this example, a list of accredited pharmacists in that region or country would be retrieved and used to populate the central server's database 1208.

If the above method of authorization is not used, it might be the case that an external database must be consulted each time certain activities are performed with the managed computer device 1210. There are several embodiments that could apply here. In one embodiment, only the manager at login time must be authorized by an external authority 1210. In another embodiment, the computer device must be authorized for use each time it is about to be provisioned. In yet another embodiment, it might be required that a certain element of the data going into the managed computer device be authorized by an external authority 1210. In all of these embodiments, a flag would be set to indicate what type of data must be authorized before proceeding 1212.

For example, in one embodiment, the selected route information for a delivery drone computer device must be approved by the external Air Traffic Control (ATC) center for aerial vehicle flying within a city. In another example, perhaps all prescription data to be loaded into a drug dispensing computer device must be retrieved and verified from a national prescription registry, like Canada's PrescribeIT™ service. There are many other potential embodiments and examples that can be used to illustrate this point. As the computer devices become more dangerous and hazardous, it is more likely that greater amounts of control, authorization and management will be required.

If the other two possible external methods of loading and externally linking authorization data are not used, then the data can be created locally 1214. In this embodiment, one or more of the upper-tier mangers create bottom managers to handle the provisioning and deployment of computer devices 1214.

For example, in some embodiments where there might be hundreds of pools for computer devices, the manager for a specific company location could create logins and authorizations for their employees at that location 1214. This person would then manage those logins, deleting, changing, and updating them as needed as employees come and go. In other embodiments, a regional manager might work above the location manager to create employee logins for just certain classes of employees 1214. For example, perhaps only shift supervisors would be given management authority and the regional manager decides who these people are as there are few of them 1214. There are many embodiments for how these logins are created 1214 and the rationale behind those decisions would vary for a given company, industry, and institution.

Once the bottom-tier managers for the computer devices are created or authorized within the system through the setting of flags, the computer devices can be placed into the appropriate pools 1216. In the case of a large company with many locations, this may be preformed by shipping computer devices to various sub-locations, like branch offices, for example. In this example once the computer devices arrive, the regional manager would move them from the regional pool into that specific branch location pool for management 1216.

In another embodiment, each time a computer device is shipped and arrives to the branch location, it's barcode or internal near field code (NFC) is scanned and input into the system 1216. Once the barcode identity is confirmed with the regional pool, or a global known pool of computer devices, it would be moved into that pool for direct management by the branch location 1216.

With the computer devices moved into pools and locations or regions, the system determines if an external action by a computer device user has taken place to cause the computer device user to need a managed computer device 1220. There are many embodiments which might result in a computer device user action triggering the need for a managed computer device 1220. If this is the case the user-identity information is collected, and in some embodiments associated to, the computer device 1220. This identity information will be used later in the system as the computer device enters the provisioning stage.

In some embodiments, this is a rental computer device. In those embodiments, once the computer device enters the specific pool, could enroll into a rental site on a public network like the Internet. In some embodiments, the central server's main role is to allow renting of computer devices 1220. In this example, once the computer device is added to a certain pool and is confirmed, it becomes instantly rentable. In this class of embodiments, the computer device user might be able to rent a specific flying or ground transporting computer device or rent a 3D printing computer device or a drug replication computer device. In many embodiments, the purchaser may be provided proof of their purchase, such as an electronic computer token of some form. Additionally, a user identity might be requested for later confirmation of the purchaser's identity. The user-identity could include biometric information, photo quality identification cards, sub-dermal implant information, national digital identity, or many other types of identity that have been discussed throughout this application.

In other embodiments the actions of the computer device user has an indirect effect that triggers the need for the computer device 1220. For example, the computer device user might have purchased a package and requested the best quality drone delivery service to facilitate that shipment. In this class of embodiments, while a delivery drone will eventually be needed, there is not a need for a specific delivery drone, but for any drone that is appropriate for the size and weight of the package being delivered 1220. In this case of these embodiments, the computer device user purchasing the item could have to provide identification to receive and confirm the final delivery and reception of their package 1220. This identity could be simpler depending on the safety and security they wish to pay for regarding their package 1220. In some embodiments. this could be an identification code they must remember and enter into a keypad on the delivery drone device. In other embodiments, the user-identity could be required for the final delivery.

Once the computer devices are in the pool, and in some embodiments after specific computer device user actions take place, the computer devices can begin to be utilized and managed by those who have been put in charge 1222. The logic continues in FIG. 13 1224.

Figure 13:
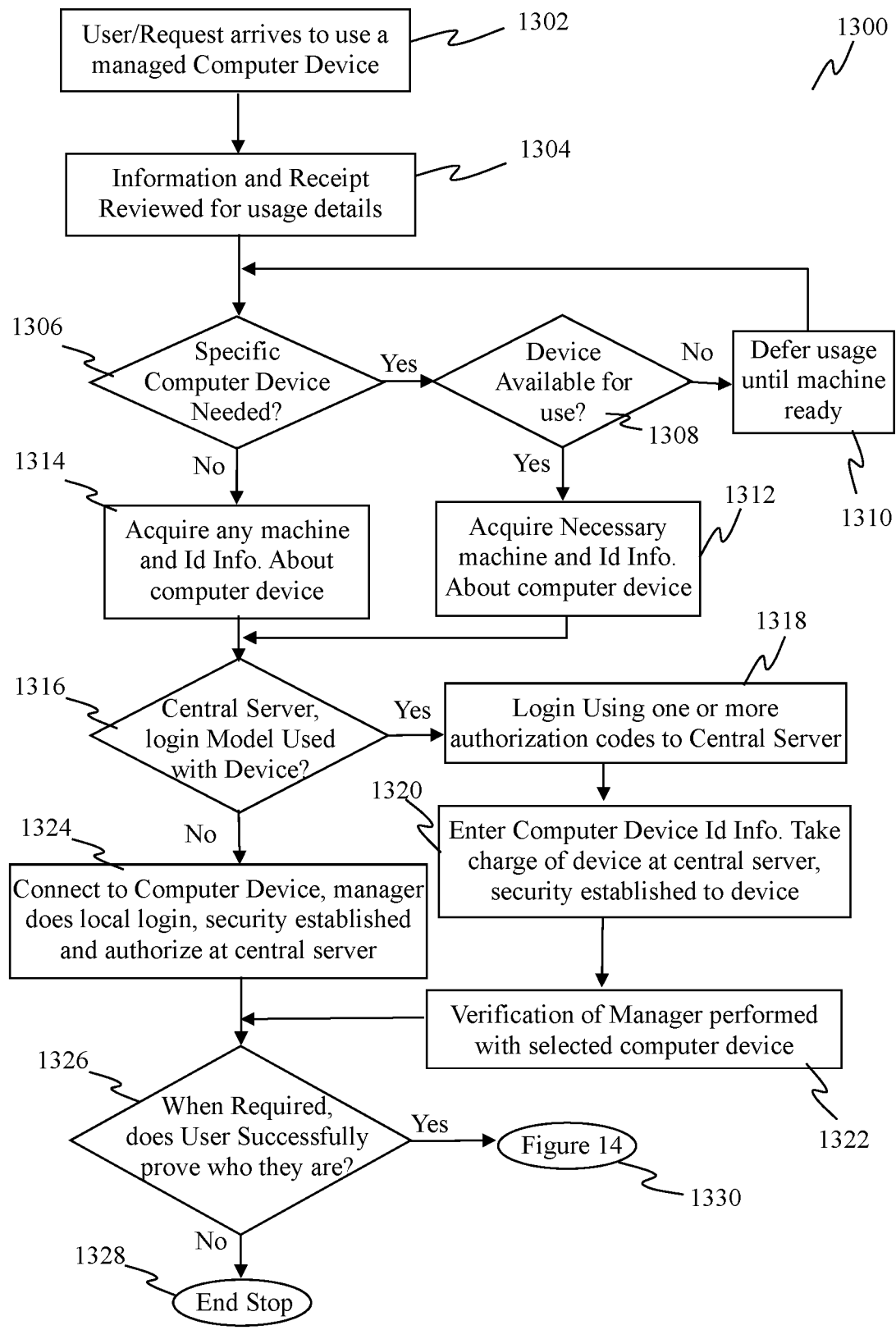
FIG. 13 is a data flow diagram of one embodiment showing the first steps in setting up a central server to manage computer devices.

Turning now to FIG. 13, there is a data flow diagram 1300 of one embodiment showing the first steps in selecting the computer device and starting the provisioning process. There are many ways that computer devices can be allocated for a purpose and managed by a computer device manager. This set of embodiments is just a few examples of how that can happen, and they support the earlier set of figures and illustrations. These steps are not meant to limit the set or series of steps that could be taken to result in the same overall effect.

From FIG. 12 we have an available a pool of computer devices that can be provisioned, deployed, and managed for some purpose. There are many embodiments to be discussed that illustrate the triggering of this process. In some embodiments, the computer device user arrives at a given location with a request in hand for a computer device 1302. For example, in one group of embodiments, a drug consumer arrives at a pharmacy with a prescription to be filled. In other embodiments, a delivery receipt is received into a warehouse that indicates a delivery drone is required for delivering a certain package 1302. In yet another embodiment, a computer device user indicates that they would like to rent a self-driving vehicle computer device 1302. These example and many other types of triggers could take place that would cause the need to access the pool of managed computer devices 1302 and begin this process.

The information related to this computer device usage and any digital receipt tokens or purchase receipts are reviewed to see what actions should be taken 1304. In different embodiments, this information could include different types and classes of information 1304. In some embodiments, this information could be person-specific information. The review of the information, person and receipt could lead to the need to use a specific computer device 1306. If a rental company had both driving and flying rental vehicles in their managed computer device pool, they might not want an obese person, or a senior citizen taking a self-flying computer device. The risks in these cases could be too high so they can only use a specific computer device 1306. In this case, the information may include the computer device user's weight, height, age, and overall health.

In other embodiments, the number and type of drugs to be used could affect the computer device 1306. In other embodiments. the size and weight of the package could affect the computer device 1306. In other embodiments, a vehicle renter has selected a specific vehicle computer device to rent and no other device will do 1306. If a specific device is required 1306, the next immediate question would be whether the computer device currently available for use 1308.

If the information indicates that a specific computer device is needed 1306, a check is performed to see if it is available 1308. For example, perhaps the drug being prescribed is an inhaled drug and requiring a specific type of drug-dispensing computer device that is a digital inhaler to be available in the pool of computer devices 1308.

If the necessary computer device is not available, then the usage of that computer device is deferred 1310 until the computer device is ready. This process loops until the needed computer device becomes free. In this embodiment, once the specific computer device is free for use, the computer device's ID information and information about the computer device is collected by the manager to initiate the provisioning process 1312.

In the embodiment where a specific computer device is not required 1306, the manager can immediately acquire any machine that is currently free and having a known device identity (ID) 1314. Once identified, (and the device is perhaps turned on and engaged) the manager can collect identification information about the computer device 1314. In some embodiments, for example, a pharmacist might just reach under their desk and pull out a pill dispensing computer device for loading with drugs for a given patient. Once selected and assigned, the central server sends an authentication confirmation message to enable the control-file watchdog on the computer device thus allowing assignment to take place.

Before they can open the computer device for provisioning however, the manager will have to go through a login processes to authorize themselves 1316.

There are several embodiments that can be used for a computer device manager to authorize themselves 1316. In some embodiments, the manager performs a login at the central database, by connecting to the central database using an interface and entering their login ID, password, and any other information there 1318. This could be a simple user name and password, or it could require an authorization code, for example as part of a two-factor authorization process.

As discussed earlier, in some cases the login and password rights are received from a government body 1318. Authorities like the FDA or Health Canada might have provided the information for the central database. In other embodiments, the login might be authorized using a protocol like OAuth 2.0 with a central authority 1318. The previous data flow, shown the FIG. 12, set a flag in the database to indicate whether this requirement exists. In some cases, only the bottom-tier authorized manager, like a pharmacist can work with the computer device 1318.

Once authorized with the central server, the manager can then enter computer device ID information and attempt to take charge of the computer device 1320. The first step to do so is for the central server to verify it has an open and active connection with the computer device 1320. If necessary, it could opens this connection and ensure that full security is present using existing public and private encryption keys loaded during manufacturing, or negotiating new encryption keys to maximize security in the system.

Once a secure communication path is confirmed, the central server could require the manger to prove he is in possession of the computer device using a Display Challenge method. The Display Challenge can be used to prove proximity to the computer device and that they are not a malicious hacker.

Once the manager hs successfully taken charge of the computer device, the central server verifies the computer device user's ability to use that specific computer device 1322. In some embodiments, different managers might have limited rights with certain computer devices 1322. For example, in one embodiment only manager A can work with flying computer devices 1322, while only manager B can work with ground transport computer devices 1322.

If the manager does not have to use a central server login model for authorization, they may instead have to connect the computer device to their computer for authorization 1324. In this embodiment, the manager would enter a user name, password or any other information requested to take charge of the computer device 1324.

Once this information is provided, he computer device opens a secure connection to the central server using either the computer connection, or through a wireless connection like Wi-Fi or cellular LTE, or LTE-M1 for IoT devices, for example. In some embodiments, the computer device can piggy-back a private connection over a physical USB link in order to reach the central server. In other embodiments the computer device is equipped with wireless communications capabilities to establish this link. If transitional SSL and DTLS (secure UDP) are not possible, then a public/private encryption key may be used to encrypt all communications between the computer device and the central server.

Over the secure connection, the computer device sends the login information and its device-identity on behalf of the manager to the central server for authentication 1324. In some embodiments, that manager might be known to the central database. In other embodiments, this may be the first time that manager has used any manageable computer device and so they are new to the central database 1324. Once the central server has verified the device identifier matches one in its permanent database, an authentication confirmation messages is sent to the control-file watchdog informing it that assignment can proceed.

For example, if a healthcare professional or an adult child is taking care of a very frail elderly patient, they might purchase a drug-dispensing computer device on behalf of the elderly patient. They could authorize themselves to the central database to ensure that no other person can log in to this specific drug-dispensing computer device 1324. Once this manager and this computer device are known by the central database no other person can take charge of it until the first person relinquishes their control of that computer device 1324.

With the authorization granted, the manager can verify any digital computer tokens and digital receipt information as well as the computer device user's identity. Once the central database has verified and matched any purchase receipts and user identity, they can take the next steps to use the computer device. In some embodiments, there could be an additional step required. For example, in some embodiments the receipt and information provided thus far might indicate that the computer device user wanting to take limited control of the computer device might have to be verified 1326. In other embodiments, the computer device user that initiated the need to use a computer device does not have to be verified 1326.

There are several embodiments wherein the computer device user's information and user-identity have been collected and held in the system having been entered at the start of this process. For example, a person wanting to rent a computer device for transportation might have provided photo identification, a digital identification, biometric data, or many other forms of identification. At this stage, there would be an opportunity to double-check that the renter is who they say they are 1326. For example, this renter might have prepaid to use the vehicle computer device, and so it is very important to ensure it is the person who paid of the rental.

In another example, a patient wanting to receive drugs might have provided their name and health card number to the doctor that prescribed the drugs. This doctor in turn uploaded that information to a national e-prescription service like PrescribeIT™. As discussed earlier, when a flag is set about authenticating the data going into the drug dispensing computer device, the central server might have to go to an e-prescription service to retrieve part of the data, like the patient's information or prescription data. This can be used to validate that the correct person is standing in front of the manager of the computer device. In some embodiments, especially when prescribing high-risk drugs, the patient might always be required to enter a biometric confirmation to confirm their identity. This biometric could be saved at the central server and verified every time this drug is dispensed. In another embodiment, a certain patient is known to be a problem drug consumer, so their user-identity must be checked before being allowed to receive drugs.

If the person turns out to be a fraud, then would be turned away and the process ends abruptly 1328. The process may also end for other reasons. In some embodiments, the central server might decide this computer device user is not capable of using this computer device. For example, they might have abused previously rented computer devices. In another example, this computer device user might already have another drug-dispensing computer device filled with the same medication and the system is configured to allow only one such device to be available at once. Whatever the failure might be, this results in the computer device being freed for another use and marked as unused in the system.

Figure 14:
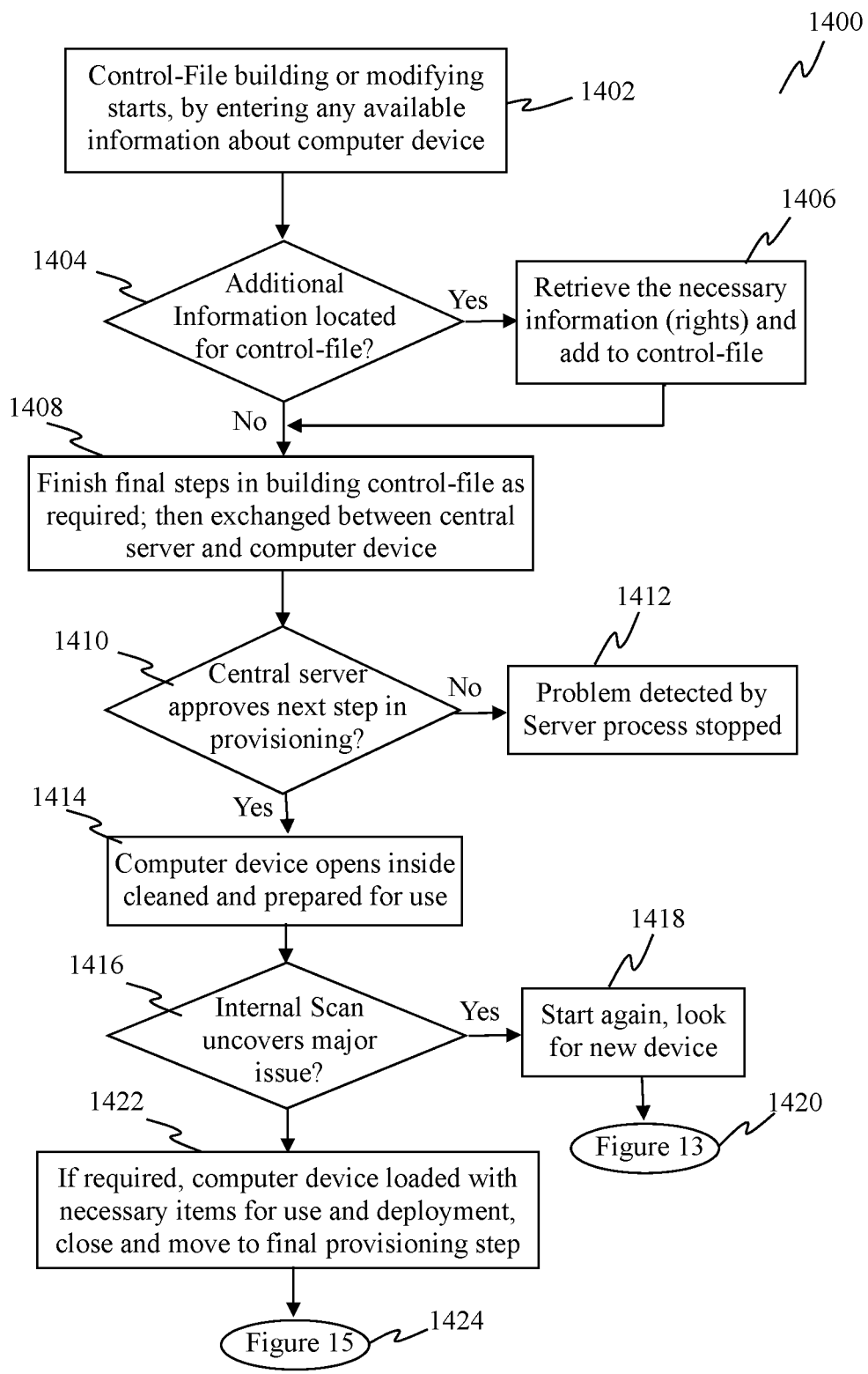
FIG. 14 is a data flow diagram of one embodiment showing the first steps in selecting the computer device and starting the provisioning process.

If the identity of the person does not have to be verified or if they are successfully verified, the process continues in FIG. 14 1330. In many embodiments the user-identity is not pre-known, for example if they are a new customer of a vehicle rental center. As another example, a person purchasing a package for delivery by a delivery drone computer device, usually would not able to be physically verified.

Turning now to FIG. 14 there is a data flow diagram 1400 of one embodiment for the first steps a manager takes to provision a managed computer device. There are many ways that computer devices can be provisioned for a specific purpose and then managed by a computer device manager. This set of embodiments shows just a few examples of how that can happen, and they support the earlier set of figures and illustrations. These steps are not meant to limit different sets or series of steps that could be taken that result in the same overall effect.

The manager of the computer device creates one or more control-files, or they locate and modify one or more already-created control-files for the computer device 1402. There are many embodiments to support both the locating of control-files and the creation of a brand-new set of control-files. In some embodiments, the one or more control-files are created each time a computer device must be managed. For example, in some embodiments, when a patient wanting to use a drug-dispensing computer device walks into a pharmacy with a prescription on a piece of paper, the pharmacist must start a drug control-file from scratch 1402. In another example, could be that a vehicle renter arrives and wants a self-driving taxi. There is no control-file information already built and they start a new file for this renter 1402.

In some embodiments, every computer device comes with a pre-built control-file that has boundaries and settings already established by a senior manager in the upper tiers of the management system 1402. For example, a vehicle computer device might have parameters established about the range it is allowed to travel based on its assigned area. A drone delivery computer device might have a maximum package weight allowed within its main compartment and this value can be seen, but it cannot be adjusted.

In another embodiment, a doctor who is prescribing drugs to a patient might have connected to the central server and started a drug control-file related to the doctor's recommended dosing schedule. The pharmacist would then enter the patient's health card information used at the doctor's office and the pharmacist would retrieve the partially completed drug control-file. These and other examples exist for situations in which a control-file already exists that the manager of the computer device locates and loads before continuing 1402.

Once the control-file has been created or located, the manager might have to perform additional actions outside of just filling in a form 1404. If there are external actions or approvals needed 1404, then the necessary information can be retrieved and added to the control-file 1406. In some embodiments, for example, a self-flying rentable vehicle is about to be taken and the senior manager must review the control-file information to perform the approval before it is allowed to take-off. In another example, before a drug control-file is completed, it is possible that a prescription number must be inserted into the control-file and verified by an external government prescription tracking service. In another example, the manager might have to submit the route information for a flying computer device to a national flight clearing center, for example like the FAA in the USA, to have the flight route approved.

After any necessary additional external work is done, the manager finishes the final steps to complete the control-file 1408. This might be, for example, to attach confirmation about the route selection. The manager might add a ground route GPS map for the ground vehicle computer device to guide its path for the renter. In another example, a pharmacist might make a final decision about the total amount of drugs then intend to give the patient, so this number is added to the control-file. When all of these steps are complete the finished control-file is exchanged between the central server and the computer device.

As discussed earlier, in some embodiments the manager has been performing these actions on the computer device directly and it is in communication with the central server. In other embodiments, the manager builds the control-file entirely on the central server itself. The exchange between the device and the central server 1408 takes place and the central server goes through any final checks before approving the next steps in provisioning 1410. In one embodiment, this might involve getting a confirmation code from an external authority, for example like the FAA with the flight route.

In another embodiment, this could involve looking for other computer devices already assigned to the same computer device user. For example, if a drug consumer has one drug-dispensing computer device, they might not be allowed a second computer device that contains the same drugs. In other embodiments however, they might be allowed two or more computer devices with the same drug and these two devices work together to ensure a continuous supply of drugs, as the central server will only deploy them sequentially with one device only being deployed once the other computer device has exhausted its supply of drugs.

If a serious error is detected, the central server stops the next provisioning steps and the process is terminated 1412. The computer device is cleaned of all control-file information, its state returns to unused, and it is returned to the free pool of available computer devices 1412.

Otherwise, the provisioning process continues and the computer device is opened 1414. The internal area can be scanned and prepared for use. In some embodiments, the drug dispensing computer device must be cleaned, which could involve sterilization, or wiping the unit with a sterile implement of some kind. In some embodiments, each drug-dispensing computer device must be physically sterilized before new drugs can be inserted into the machine. In some embodiments a disposable piece that had previous held drugs is thrown out and a new drug holding component is added to keep each load of drugs from cross-contaminating each other.

In other embodiments the vehicle computer device might have to be cleaned or vacuumed before the next renter enters the computer device. In another example, a package delivery drone might have a package insert to protect the main compartment from contamination between different packages.

Once opened, the manager can do an internal scan of the internal of the computer device to uncover any problems or issues 1416. They might uncover deeper problems during the cleaning or preparation process 1416. If there is a problem or an issue, they may have to retire this computer device and look for a new device 1418. This will take them back to FIG. 13 1420 to determine if they need a specific computer device or if any computer device will work 1306.

There are many embodiments in which an internal issue within the main compartment of the computer device could be a problem. For example, for a drug-dispensing computer device it might be that moisture damage has occurred inside the unit and mold is growing. In another example, a rental vehicle computer device may have been damaged or be missing some key component requested for the trip.

If required, the main compartment of the computer device is then loaded with any necessary items to support the use and deployment of the computer device 1422. In the many different embodiments, as already discussed, there could be a wide range of items needed to be placed inside the computer device for proper use and operation.

In one set of embodiments, a drug-dispensing computer device is loaded with the proper amount of medication matching the number placed in the control-file. In some cases, when supported, each individual drug added to the drug dispensing computer device can be verified with a RFID chip or a bar code scan of the drugs, Q-code scan of the drugs, as it enters the main compartment.

In another set of embodiments, a package delivery drone might require one or more packages inserted inside its compartment before being closed. In some embodiments, the delivery drone is sitting on and connected to a digital scale and only if the weight added to the drone is less than the maximum weight allowed will it accept the contents and be allowed to close.

In other embodiments, the contents could include food, drinks, and other items for the comfort of the occupants. In another set of embodiments, the contents may include one or more vehicle renters that are loaded into the main compartment and represent the payload for the computer device.

With the computer device cleaned, loaded, and prepared, it can now be closed. Closing the main compartment of the computer device then sends a message to the central database that allows the final stage of provisioning to take place in FIG. 15 1424.

Figure 15:
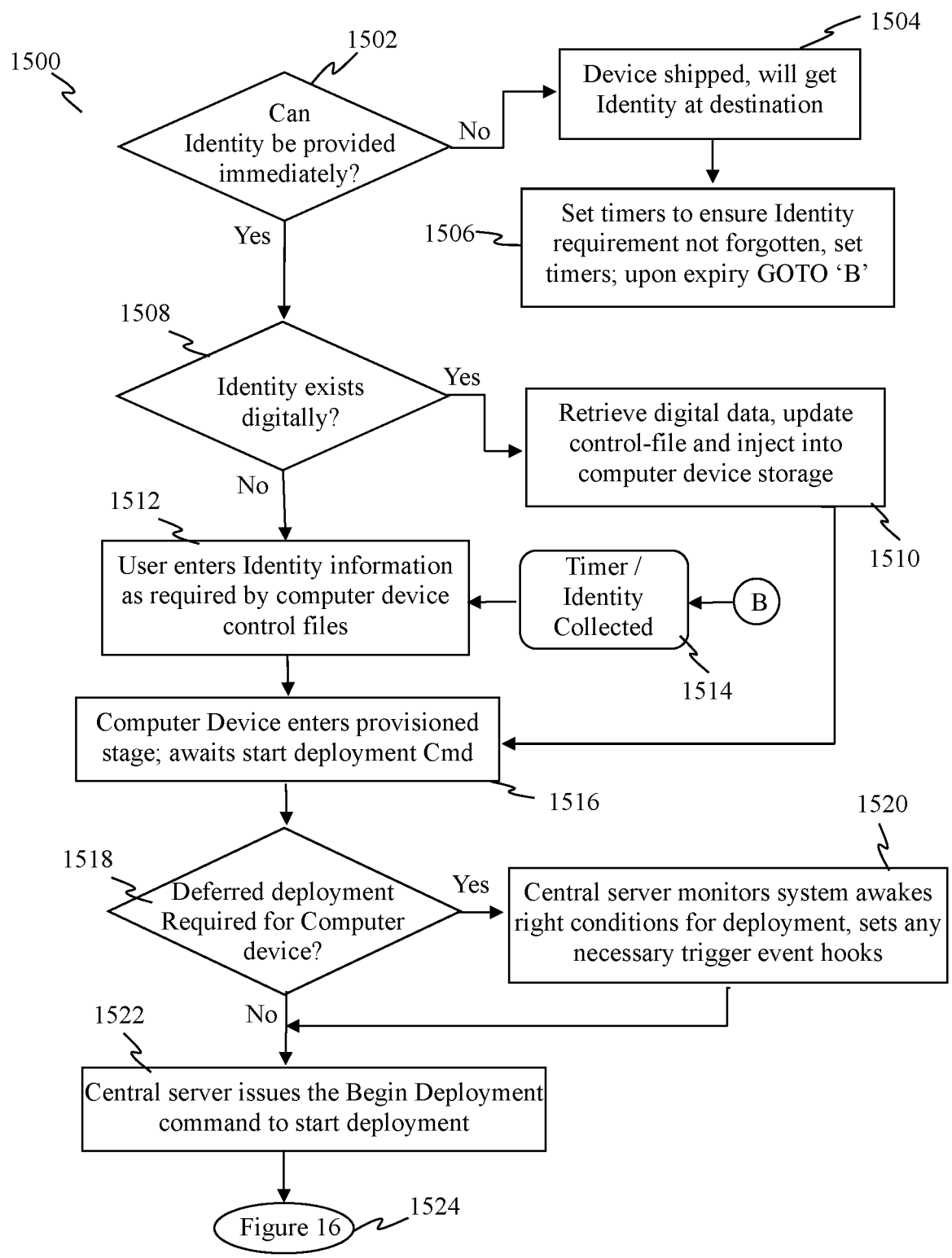
FIG. 15 is a data flow diagram of one embodiment for the first steps a manager takes to provision a managed computer device.

Turning now to FIG. 15 there is a data flow diagram 1500 of one embodiment for the manager of a computer device to reach the fully provisioned stage. There are many ways that computer devices can reach the fully provisioned stage, which would then allow it to be used for a specific purpose. There are many embodiments for the handling, movement, and management of a fully provisioned computer device before deployment has been issued by the central server. This set of embodiments provides just a few examples of how that can happen, and they support the earlier set of figures and illustrations. These steps are not meant to limit different sets or series of steps that could be taken that result in the same overall effect.

The first step in the final stage of provisioning involves determining if a user-identity can be provided immediately 1502. In some embodiments, the computer device must be sent to the computer device user before the final user-identity can be collected. In these embodiments the computer device is shipped to a different location to get a user-identity from the computer device user 1504. There are many embodiments wherein the computer device user is not present during provisioning and no stored user-identity is digitally available 1504.

In one embodiment, a computer device user who is a drug consumer is getting a backup drug-dispensing computer device, so that they have a backup of their medication to ensure they never run out of drugs. This might be important if the drug is supporting their life and missing drugs could be life threatening. In this embodiment, it might be necessary to ship the computer device to their home where they will enter their user-identity when it arrives.

In another embodiment, a rental service offers a pick-up service when renting their vehicle computer device. In this embodiment, the self-driving vehicle computer device transports itself to the pick-up location and waits for a user-identity input before it enters the fully provisioned stage. In some examples, a bonded delivering agent travels with the vehicle until the renter arrives and enters their user-identity.

In these and other embodiments, the computer device is shipped 1504 and timers are set within the central database to ensure that the user-identity requirements are not forgotten 1506. Timers are set and reset until the user-identity is received or the process is abandoned by the computer device user. When the timer expires, the dataflow moves to point 'B' on FIG. 15. At this point, the computer device user must provide their user-identity and the process proceeds once a successful user-identity has been confirmed by the computer device 1514.

If the user-identity can be immediately collected 1502, a further check is preformed to see if a digital user-identity exists for this computer device user 1508. If a user-identity does exist, it can be associated to the control-file directly 1510. In some embodiments the user-identity might exist as a separate secondary control-file. In these embodiments, a digital image might be compressed, encrypted, and sent across the network to the computer device as a data blob that can not be seen or accessed by any other computer system 1510. In these embodiments once the digital user-identity is given to the computer device, it can enter the fully provisioned stage 1516. When this happens, the computer device informs the central server which allows the central server to decide when to issue the Begin Deployment command 1516.

In other embodiments, the computer device might use a secure enclave method for storing and matching the user-identity information. For example, in those embodiments where a drug-dispensing computer device is used over and over, the user-identity information can be retained and reused if another deployment is required.

In other embodiments, the user-identity must come directly from the individual computer device user who intends to gain limited access to the computer device. In these embodiments, the computer device user enters their user-identity information as required by the control-files 1512. There are many possible different embodiments for the types of user-identity that must be provided digitally or in person.

In some embodiments, this can be a one-step process that collects the user-identity information for the computer device user for immediate use of the computer device. For example, a drug consumer might simply enter their fingerprint for later confirmation every time a drug dose is ready to be taken. In other embodiments, it may involve a biometric and a biomedical input.

In another example, a vehicle renter might have to provide a deep palm scan of their hand to enable the use of a driving computer device. Then each time they exit and re-enter the vehicle the palm scan is re-entered to confirm they are the original renter of the computer device.

In some embodiments, the provisioning of the full user-identity may include one or more steps involving biomedical and photographic data collection. In some embodiments, this biometrical and photographic data may then be uploaded to the central server 1512.

For example, when using a drug-dispensing computer device there could be requirements to provide blood analysis results, urinalysis results, EKG, EEG, saliva testing results, photographic identification, and a wide range of combinations of these inputs. In one example, the drug consumer can use a urine test strip and take a photograph and upload this to the central server. In another example, the drug consumer can take a picture of themselves in front of a pharmacist or later self-witnessing photographs that are required each time a pill is placed in their mouth. This type of biomedical and photographic data can act as a baseline for subsequent biomedical results and photographs to see the effects of the drugs on the drug consumer's body. There are many other embodiments like this, depending on the nature and purpose of the drug-dispensing computer device.

In another embodiment, a flying vehicle computer device requires biometric data from a potential vehicle renter. A blood pressure test is required with an attached digital blood pressure device that provides a reading of the computer device user's blood pressure before using the computer device 1512. In some cases, additional blood pressure results can be taken throughout the flight and compared to this first required reading as a benchmark for what a normal rate is for a given vehicle renter 1512. There are many other embodiments in which different combinations of biometric data, biomedical data, photographic data, or video data, are used individual or in combination to ensure the save and secure limited use of the computer device by a computer device user 1512.

Once the computer device has verified all the user-identity information, it enters the full provisioned stage 1516. It sends confirmation of this stage to the central server to indicate it is ready to enter deployment at the central server's command 1516. In some embodiments, this waiting period could be milliseconds. For example, if a drug consumer only has one drug-dispensing computer device and has provided their user-identity on the spot, the central server might issue an automatic Begin Deployment command 1516. In other embodiments, the delay could be longer, for example days or weeks in those cases where a drug-dispensing computer device is being used as a backup to another device that is in active deployment mode.

The central server does a check to see if deferred deployment is required for this computer device 1518. If deferred deployment is required, the central server monitors all conditions related to the computer device until deployment is triggered 1520. If necessary, the central server sets the necessary timers, triggers or watchpoints to ensure careful tracking of conditions are performed 1520. There are many embodiments requiring deferral of the Begin Deployment command.

In one embodiment, a drug-dispensing computer device is being used for a hot-swap with an already deployed drug-dispensing computer device. In this example, the central server monitors the drug extraction count given by the drug-dispensing computer device each time a drug consumer removes their drug dose. When the number reaches zero, it sends a Stop Deployment command to that drug-dispensing computer device and sends a Begin Deployment command to the second hot-swappable drug-dispensing computer device to begin deployment 1522.

In another embodiment, a flying computer device has not yet been given clearance to enter a given airspace. In this example, the flying computer device has filed its flight plan with a national agency like the FAA, but approval has not been granted in time as the airspace is already booked. The central database can monitor messages to get confirmation when the flying computer device can safely depart. Once the confirmation is received, the central database can send the Begin Deployment command and the flying computer device can proceed with its assignment 1522.

In other embodiments, a deferred deployment is not required. In these embodiments once the central database receives the Fully Provisioned message from the computer device 1516 it issues a Begin Deployment command to the computer device 1522. With the message sent, the computer device enters the deployment stage and the logic continues in FIG. 16 1524.

Figure 16:
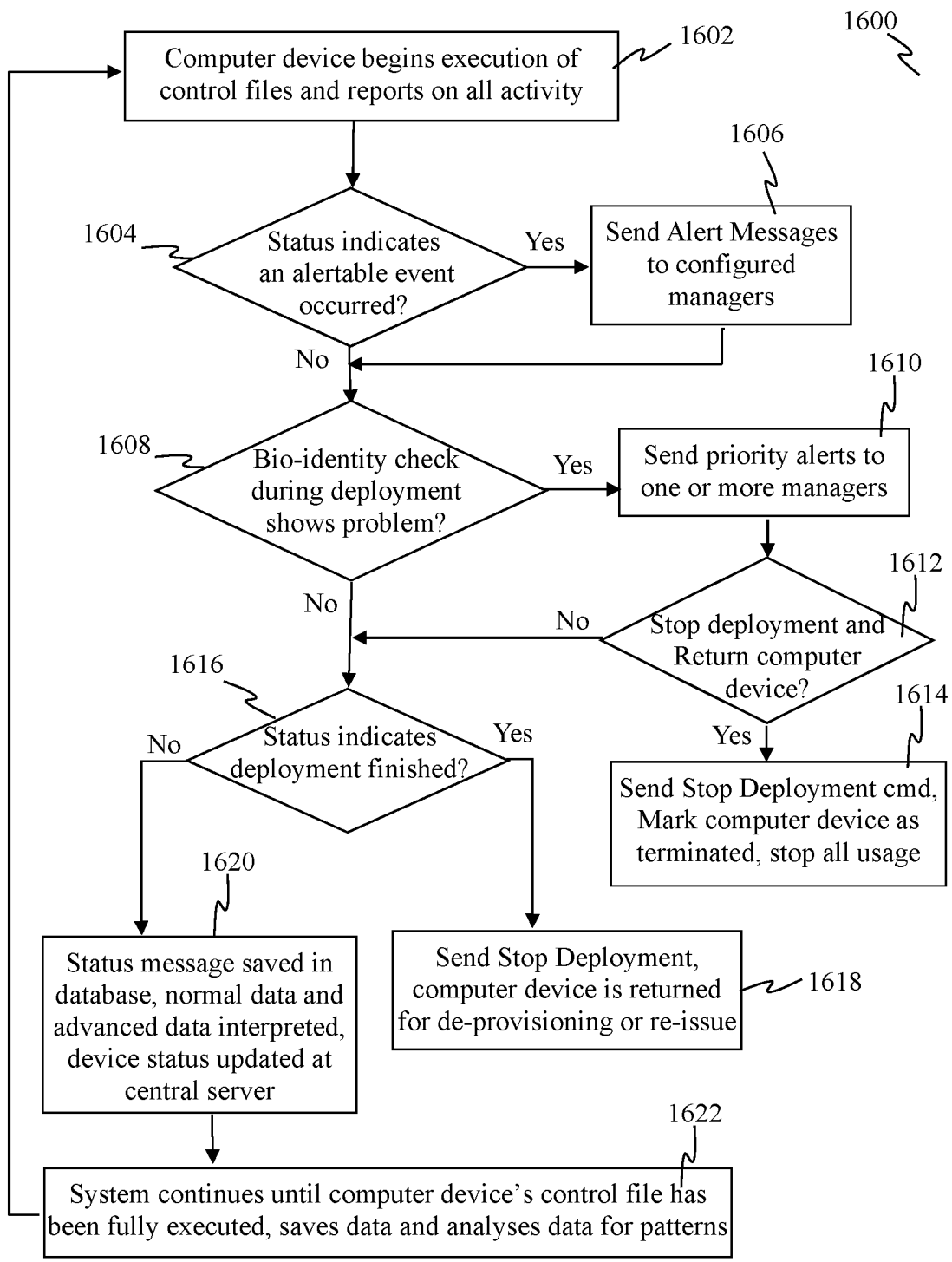
FIG. 16 is a data flow diagram of one embodiment for the manager of a computer device to reach the fully provisioned stage.

Turning now to FIG. 16, there is a data flow diagram 1600 of one embodiment showing the steps performed during the deployment stage of the computer device. There are many ways that computer devices can operated and be controlled once the central server issues the Begin Deployment command. During its specific operation, there are many types and classes of status message, alerts and alarms that can be used that may not be illustrated in this data flow. This set of embodiments presents a few examples of how that deployment can unfold and operate and how control can be maintained throughout deployment. The embodiments described support the earlier set of figures and illustrations provided throughout this application. These steps are not meant to limit different sets or series of steps, computer device tracking messages, central server commands, or other operations that could be taken in other implementations that would result in the same overall effect.

As the computer device begins executing the one or more control-files, it begins its real-time reporting of all relevant events happen in and around the computer device 1602. This might include normal activity and/or abnormal activity depending on the computer device 1602. All messages exchanged cn use the secure connection created between the central server and the computer device. This might include standard SSL and DTLS type security methods and advanced application level encryption methods. Each time a message is received from a computer device, the central server goes through a series of checks looking at and interpreting the information in the message.

If the central server receives a status message indicating that an alertable event has taken place 1604 it performs any configured steps to send alert messages to those managers that have requested those alerts 1606. In some embodiments, there could be different levels of alert messages and the more senior the manager the higher the alert must be before they are informed 1606.

For example, in some embodiments, an alert indicating that a road-based vehicle computer device is low on fuel might only go to the computer device manager for a specific site. In another similar case, an alert indicating that a flying vehicle computer device is extremely low on fuel might go to the regional or even national computer device managers 1606. In this example, the possibility of an object falling out of the sky over a city could be considered a catastrophic event.

In another example, a message indicating that a drug consumer has missed a drug dose might only be sent to a healthcare provider and not to a pharmacist. If that same drug consumer missed 4 doses of drugs in a row, this might be escalated and be sent to a pharmacist or a doctor to review 1606.

After the check for alertable messages is made, the central database checks to see if a user-identity check made during deployment shows a problem 1608. There are many embodiments where a regular user-identity check could indicate an issue has arisen 1608.

For example, in some embodiments, one or more passengers in a flying computer device could indicate a health crisis during their trip 1608. In this example, at different points in the trip a biomedical reading of a person's heart rate could indicate an elevated and dangerous heart rate condition 1608. In this situation a priority alert can be sent to one or more computer managers to inform them about the situation 1610.

In another example, a biomedical reading from a drug consumer's watch or heart monitor could indicate that a drug has caused a drug consumer's blood pressure to rise dangerously 1608. This would trigger a priority alert 1610 to one or more of the managers, like healthcare professionals and doctors to decide if the deployment should be halted 1612.

Based on the type of computer device and the nature of the alert. it is possible that the deployment must be halted 1612. If that turns out to be the case. a Stop Deployment command would be sent to the computer device and the computer device would be marked as terminated and needing to be returned 1614.

If the status message indicates no serious problems and shows no user-identity issues, a final check is made to see if deployment has reached its normal completion 1616. In some embodiments for example, this might mean the end of a vehicle's planned GPS route. In other embodiments, this might mean all the packages loaded on a delivery drone have been delivered and it has returned to a loading center 1616. In other embodiments, this might mean the drug-dispensing computer device has exhausted all its supply of drugs and should be returned for reloading 1616.

If the status message indicates the deployment has reached it natural conclusion, the central server sends a Stop Deployment command and the computer device is returned for reuse, or for de-provisioning 1618.

Otherwise if the status message was simply a routine message indicating some operational status the message, the data within the message is interpreted and the computer device status is updated at the central server 1620. For example, uin some medical-dispensing embodiments, this updating could result in reduction in the count of consumed drugs within the drug dispensing computer device 1620. In other example, it could mean increasing the number of missed drugs that have occurred for this drug consumer.

In a vehicle embodiment, the status message could indicate that a first stop and drop-off has occurred with one of the passengers. Once the data is analyzed, it might indicate that the vehicle is 'N' minutes behind schedule, and that traffic was very heavy. This might mean that any subsequent rentals with this vehicle will be delayed and this could be reflect in the status information viewed by managers of the system as they allowed booking for next vehicle renters 1620. This kind of real-time status messages can provide a better, more efficient operation for computer devices in general.

As all the messages continue arriving, they are in turn examined, acted upon, and saved for later audit and data analysis work. Information that is saved from a specific computer device can later be analyzed and valuable, anonymized information and insights can be gained.

For example, in some embodiments traffic or flight information can be analyzed to determine the best routes to take to minimize travel time and maximize vehicle usage. The more times a vehicle is used the better the return on the investment.

In another example, analyzing the drug consumption patterns of certain people in given age ranges could provide insights into adherence issues and problems. Drug adherence issues is a major problem in the pharmaceutical industry and costs millions of dollars each year for health plans and government health insurance programs.

These solutions and many others can be gained from allowing a central computer to have control over a computer device. The central computer can limit how that control is shared between managers and computer device users and with the data that comes from that limited uses, unique and valuable insights can be gained.

Figure 17:
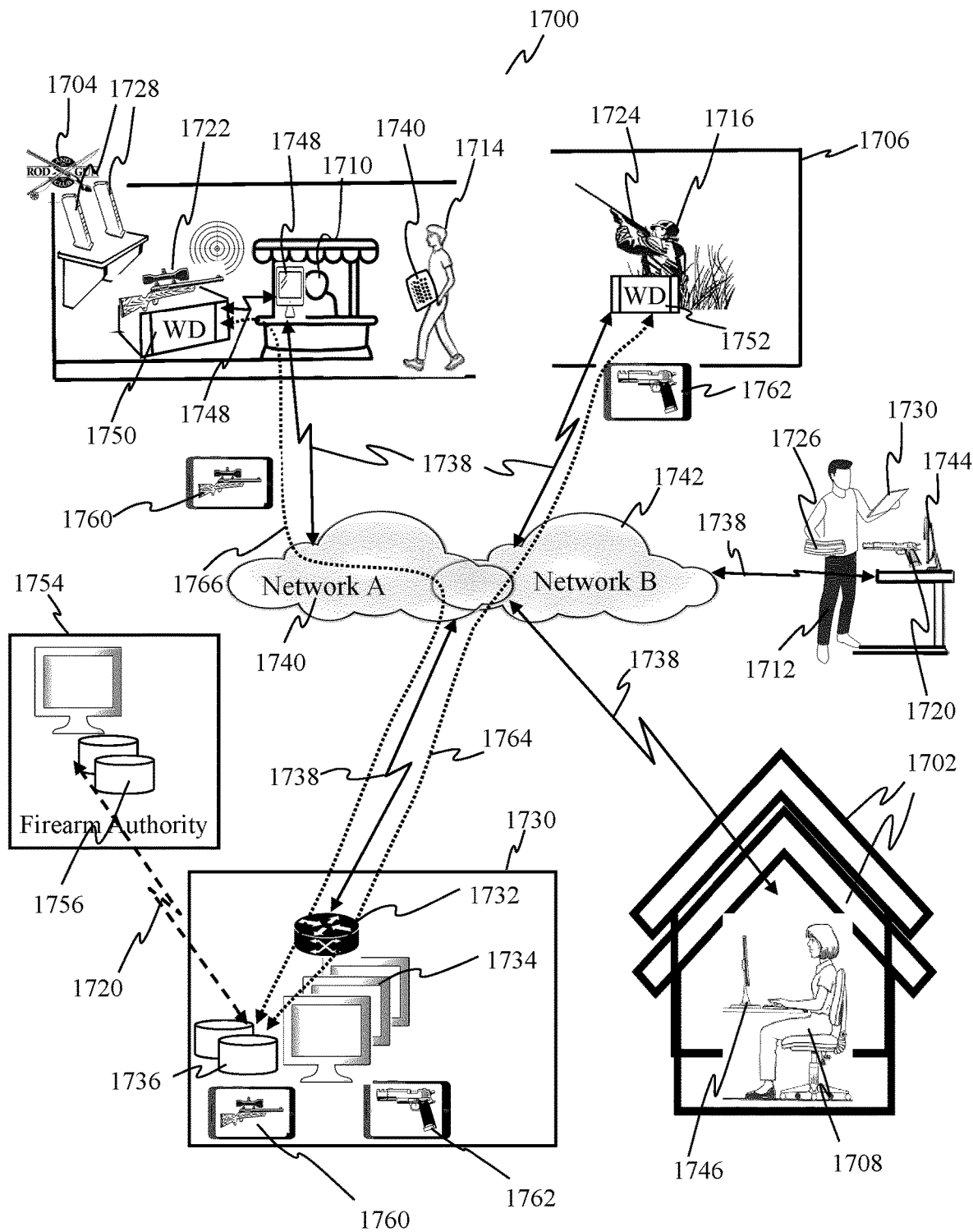
FIG. 17 is a network overview showing a gun usage embodiment wherein different managers control the access and use of various kinds of gun computer devices.

FIG. 17 is a network overview showing a gun usage embodiment where different managers control the access and use of various kinds of gun computer devices.

Turning to FIG. 17 there is a network overview 1700 showing a gun usage embodiment where different managers 1708, 1710 control the access and use of various kinds of gun computer devices 1720, 1722, 1724. The system 1700 is well suited for providing a hierarchical control over a wide variety of gun computer devices 1720, 1722, 1724 that are deployed in different locations and settings. There are many embodiments for how gun computer devices 1720, 1722, 1724 can be deployed, managed and controlled by a central server 1730.

In one set of embodiments, the system 1700 describes how an owner and gun user 1712 can make limited use of their gun computer device 1720 and gun support material 1726, for example for hunting or target shooting. In another embodiment, a gun user 1716 could acquire a gun computer device 1724 temporarily for specific usage, for example hunting. In another embodiment a gun user 1714 is able to use a gun computer device 1722 in a restricted environment 1704 for target practice using one or more different types of gun support materials 1728.

Gun computer devices 1720, 1722, 1724 and gun support materials 1726, 1728 are considered highly sensitive and very dangerous in society. The proper use of these materials can be very enjoyable for those with the interest and ability to use them safely. Like the of use of many drug medications and formulations, the use of this type of computer device 1720, 1722, 1724 needs a high degree of protection and security. With the miniaturization of computer components, like communications chips, GPS chips and central processing units (CPUs), the ability to create gun computer devices 1720, 1722, 1724 with embedded computer components is relatively straightforward.

Like the examples of drug dispensing computer devices, 3D printing computer devices, drug replication computer devices, vehicle transport computer devices, these gun computer devices 1720, 1722, 1724 can require a secure way to be accessed by various parties 1712, 1714, 1716 wanting to enjoy the use of them. This system provides unique abilities to limit the time of use, the material to be used, the location in which they are used and the duration of use. Additionally, the system is able to detect abuse in the use of gun computer devices 1720, 1722, 1724 and send Stop Deployment messages to disable elements of the computer device 1720, 1722, 1724 to prevent continued use. These added security methods could save thousands of lives from stolen or lost guns each year.

The system 1700 is composed of one or more managers 1708, 1710 having a hierarchical control over the distribution and rights of gun computer devices 1720, 1722, 1724. These gun computer devices could find their way to certified use centers, like gun clubs 1704, or to registered retail outlets with safe and secure storage facilities. As in FIGS. 1, 2, 4, 5, 7, 8 the managers 1708, 1710 could be established through a private organization, like a large gun manufacturer. Many manufacturers are looking for methods to improve the use and safety of their products and could run a central server 1730 for the products they are creating. Similar embodiments have been discussed in earlier sections. In these embodiments, the upper-tier 1708 of management is established initially by the manufacturer and sub-tier managers 1710 can be created later by the upper-tier managers 1708.

In another embodiment, the initial creation and authorization of these managers 1708, 1710 comes through official regulatory bodies or government agencies, for example a firearm authority 1754. These embodiments have been discussed through several other embodiments. The database files 1756 in the government bodies are created using strict clearance and control guidelines. Managers could start at the manufacturing level or at a lower level. As previous discussed, each time authorization is required a communication method 1720 can be employed (API calls for example) to confirm the authorization.

Gun computer devices 1720, 1722, 1724 managers 1708, 1710 can be distributed across different locations 1702, 1704 as deemed necessary for the effective use and distribution of gun computer devices 1720, 1722, 1724. These endpoints are connected via different data communication methods 1738, having the ability to reach and exchange messages with a central server 1730. The central server 1730 provides user interfaces 1734 to managers 1708, 1710 and in some cases computer device users 1712. The central server 1730 also provides a communication interface 1732 and non-transitory memory 1736 to allow for provisioning and controlling the gun computer devices 1720, 1722, 1724.

The non-transitory database 1736 at the central server 1730 holds device identities for all the gun computer devices 1720, 1722, 1724 at various locations 1702, 1704, 1706. As mentioned in FIGS. 1, 2, 4, 5, 7 and 8 this device identity could be created during manufacturing using an identity chip, a CPU identity number, a public/private encryption key pair or some other identifier known only to the central server 1730 and the gun computer devices 1720, 1722, 1724. The ability to create secure communication paths 1764, 1766 is based on the presence of this device identity and allows for provisioning and deployment of the gun computer devices 1720, 1722, 1724.

Similarly, the non-transitory database 1736 at the central server 1730 holds the identity and authorization values for one or more managers 1708, 1710 in the field. There are several embodiments for how this information might be established. As already discussed in previous figures, this could be through a professional government body 1754 or through a single organization 1702, like a gun manufacturing company 1702, a gun distribution company 1702, or regional law enforcement agencies 1702. In some embodiments, a top-most manager 1708 might establish the rights of lower-tiered managers 1710 within the database 1736 as the gun computer devices 1720, 1722, 1724 are created, distributed, installed and used at one or more locations 1704, 1706.

In other embodiments, the gun computer devices 1720, 1722, 1724 might be sold and distributed first as business grows and then different lower-tier managers 1710 are added. For example, a gun computer device 1720, 1722, 1724 manufacturer may create a products and distribute these products to different locations 1704, 1706. Eventually, large retail centers could request involvement in the system to protect themselves and reduce their liability in selling guns that can harm people when not regulated and controlled. As more guns are placed within compatible location 1704, 1706 more managers 1710 would gain access to the central server 1730 and its database 1736 of registered and authenticated gun computer devices 1720, 1722, 1724. In this way the system, can be dynamically expanded as the different participants in the gun industry get involved.

In some embodiments, gun computer devices 1722 are housed within secure environments waiting for local managers 1710 to authenticate themselves and initiate the assignment of the gun computer device 1722 to a gun user 1714. In other embodiments, the gun computer device 1720, 1724 may have been sold to a gun user 1712, 1716 that will have to acquire rights to use their gun computer device 1720, 1724 each time they wish to make use of it. In these embodiments, although the assignment of the gun computer device 1720, 1724 is long-lived, the deployment of the gun computer device 1720, 1724 is not, so that each time a new use is required, a manager 1708, 1710 will have to create a new gun control-file 1760, 1762 and download the gun control-file 1760, 1762 to the drug control-file watchdog 1750, 1752 to enable the limited use of the gun computer device 1720, 1724.

In some embodiments, the computer device user 1714 must provide user-identity information every time they want to make use of a gun computer device 1722 and be in the presence of an authorized manager 1710. In other embodiments, the gun user 1712, 1716 might have possession of the gun computer device 1720, 1724 but no way to use it without authorization taking place from one or many possible mangers 1708, 1710. In this way, the system can track every gun use that takes place, who uses the gun and, in some embodiments, where they are using the gun. While the system 1700 would be more time consuming, it is designed in a way for maximum security and trackability and must be more time consuming to prevent being circumvented.

As with the illustrations of previous figures, the process starts with a computer device user 1712, 1714, 1716 making a request for a gun to be used. In some embodiments, a gun user 1712 might interface to a public site, for example available on a public network 1740, 1742 like the Internet. In this embodiment, they could be purchasing specific rights for temporary use of their gun equipment 1720, 1726. In other embodiments, they might be both purchasing rights to use their gun computer device 1720 and also have ordered new bullets 1726, or purchased new bullets 1726 at a store, and now want to use them with the gun computer device 1720.

In these embodiments, the gun user 1712 can interact with a site offering this registration service. This could be a stand-alone Internet site or the central server 1730 itself may offer this gun usage request service. These services might require payment up front or payment only after authorization is granted. The gun user 1712 might have to provide both gun identity information and user-identity information during the requesting step. When Global Positioning Service (GPS) information is available within the gun computer device 1720, the gun user 1712 might have to also indicate where they precisely intend to use the gun computer equipment 1720. These GPS locations could be listed and pre-authorized by firearm authorities 1754. For example, locations to fire gun computer devices 1720, 1722, 1724 might be rod and gun clubs 1704, sanctioned hunting wilderness settings 1706, and other similar locations. The gun user 1712 might also be required to provide the specific time or time duration for their gun computer device 1720 usage. All these parameters input by the gun user 1712 would then make their way to the central server's 1730 non-transitory database 1736 and in many embodiments create the start of a gun control-file 1760, 1762.

In another embodiment, the gun computer device user 1714 might come to a usage center 1704 to use a gun computer device 1722. They 1714 might already have an authorization purchase receipt 1740 in hand, indicating they have booked time to use the gun computer device 1722. They would then interact with a local manager 1710 to verify their digital computer receipt or token, review any user identity provided and confirm the gun computer device 1722 they requested is available for use.

In some embodiments, the actual ammunition (gun support materials) 1726, 1728 have already been purchased and have been carried by the computer device user 1714 to the usage center 1704. In these embodiments, the computer device user 1714 would arrive to the location 1704 to have their usage authorized but without requiring the gun support materials 1728 offered by the local manager 1710. For example, perhaps the gun user 1714 is a sharpshooter and has purchased very expensive and precisely guided bullets 1726 of a higher quality than those offered at the location 1704.

In those embodiments where the computer device user 1712 has used a computer 1744 to pay for or request gun 1720 usage, they may have to wait for authorization if they do not visit an authorization center 1704. Even if the authorization center 1704 does not offer usage facilities, it is possible for an authorized local manager 1710 to grant gun access for a specifically requested off-site usage location 1706. Going to an authorization center 1704 could accelerate the eventual use of their gun computer device 1720. Otherwise, whenever some manager in the system 1708, 1710 gets their request from the central server 1730, will would be notified that gun computer device 1720 use is not permitted. This notification could come via various methods, for example via email, SMS text message or even a special notification to the gun computer device 1720 directly.

In some embodiments, the gun computer device 1720, 1722, 1724 can offer not only CPU, GSM and biometric input support, but also could have visual and audio output capability. The visual notification could be as simple as an LED light that illuminates to a certain colour, for example green, when authorization has been granted. It could then change to another colour, for example red, when authorization is terminated, and deployment has been stopped.

Data communication methods to the gun computer equipment can have several embodiments. In some embodiments, there could be a link 1748 from the gun computer device 1722 to the local manager's 1710 computer system 1748. Such links could be supported through Bluetooth, Wi-Fi or other short-range methods. In another embodiment, the gun computer device 1724 communicates through the computer device user's 1716 cell phone or wearable device, such as a cellular-enabled watch or eyeglasses. In these embodiments, a Bluetooth, near-field communication (NFC) or proprietary short-range communication method could link the devices. Since the gun control-file watchdog 1752 runs on the gun computer device 1724, it can do any necessary encryption and encoding to ensure highly secure communications 1764 to the central server 1736.

In other embodiments, the gun computer device 1724 is able to directly communicate to a wide-area network 1742 using a connection 1738. Such connections could be enabled through cellular communications 1738 and networks 1742, through Wi-Fi (802.11) protocols, using IoT protocols (LTE-M1 for example) or through proprietary or non-proprietary methods. Whether through the provided link 1748, or directly connecting 1738, a secure channel 1764, 1766 is created between the central server 1730 and the gun control-file watchdog 1750, 1752 running on the gun computer device 1722, 1724.

When arriving to a site 1704 offering the gun authorization services, the gun user 1714 can provide any pre-purchased proof and user-identity information. The computer device user 1714 might have already supplied a digital identity or a fingerprint scan from their mobile phone 1744 or tablet computer 1744 during the transaction with the central server 1730. In these embodiments, it would allow the central server 1730 to provide that information in the gun control-file 1760, 1762 exchange so that a match can be performed at the gun computer device 1722, 1724. Alternatively, the central server 1730 could indicate that the user identity must be provided in the user-identity received message and it will perform the match of the user identity.

In other embodiments, the computer device user 1714 might have originally used a digital identity card that uses near-field communications (NFC) with their mobile phone 1744 to confirm the original gun-use request transaction. The transaction would be confirmable with a gun-use request token or some simple electronic receipt, which would make its way to the central server 1730 to be saved in the database 1736 with the rest of the transaction parameters.

When the computer device user 1714, 1716 arrives to a location 1704, there could be different types of gun computer devices 1720, 1722, 1724 present. They might bring their own gun computer device, or they might rent one for a limited use. In some embodiments, the local manager 1708 might be directly involved with the gun use process and overseeing every step of the process. For example, the local manager 1710 might be told (or personally decide) that they will be involved with loading and fully preparing the gun computer device 1722. In other embodiments, they might allow the computer device user 1714, 1716 to load their own firearm 1724. In these embodiments, the computer device user 1716 would need to have acquired authorization via their user-identity information earlier in the presence of an authorized manager 1708, 1710.

As discussed, in some embodiments the computer device user 1712, 1724 owns their gun computer equipment 1720, 1724 and in some cases their gun support materials 1726. Despite this, there can still be a process to ensure the security of the system is maintained. To acquire the gun computer device 1720, 1724 is not enough to use it. For example, in some embodiments, the gun computer device cannot be opened for loading and cannot be fired without authorization. The loading cartridge area could also be locked, similar to a drug dispensing computer device. In a similar fashion, the firing trigger could be software enabled and run through a printed circuit board and which is controlled by the CPU.

In order to use the gun computer device, such use must be authorized. In some embodiments, the gun computer device 1720, 1724 is a battery enabled device and portable. In other embodiments, the gun computer device 1722 might be plugged in to maintain power to the device 1722. For a portable gun computer device 1720, 1724 the first step to authorize its use would be to power it on for authentication to be confirmed. It is possible at this stage for the central server 1730 to recognize this gun computer device 1720, 1724 does have a gun control-file that is authorized, with a fully confirmed user identity associated to it.

If this is the first time the gun computer device 1720, 1724 is turned on, the user may have to visit an authorized manager 1708, 1710 to enable their gun computer device 1720, 1724. This could be at the retail level, for highly trusted retailers that are approved by a top-tier manager 1708. Once an authorized manager 1708, 1710 is logged into the central server 1730, they can begin the assignment process for the first time. Through this interface, the manager 1708, 1710 can select the authenticated gun computer device 1720, 1724 from a master list. They can then request an assignment and might be requested by the central server 1730 to confirm they are possession of the gun computer device 1720, 1724. Possible verification processes were explained in earlier figures. For example, this could be done through a series of tones, beeps, sounds, etc. that come through the gun computer device 1720, 1724. Once confirmed, the manager 1708, 1710 can create the gun control-file 1760, 1762. During this process, they would take the user-identity information for the first time and it will be associated to that gun computer device 1720, 1724 for that user. No other user will be able to use that gun computer device 1720, 1724 unless they visit a manager 1708, 1710 and release the gun computer device 1720, 1724 from themselves so it can be assigned to another computer device user.

During the creation of the first gun control-file 1764, 1766 the manager 1708, 1710 ensures that the user's identity values is saved on the gun computer device 1720, 1722, 1724 in a non-transitory and tamper-proof memory. This secure enclave type memory cannot be changed without damaging the memory and the integrity of the system. The manager 1708, 1710 might also set permission on the number of bullets that can be fired with a single biometric input on the gun computer device 1720, 1722, 1724. There could also be high-level restrictions on the gun computer device 1708, 1710 like GPS range for the gun computer device 1720, 1722, 1724 and even time of day it can be used. These could be placed into the initial gun control-file 1764, 1766 and modified later should the gun computer device user 1712, 1714, 1716 realize they need it to change for a particular gun computer device 1720, 1722, 1724 usage adventure.

Biometric data may be required before enabling using of the gun, for example. Biometric data can be captured as user identity values.

Once these steps are complete, the gun control-file 1760, 1762 can then be re-used over and over by simply updating key elements of the gun control-file 1760, 1762 and re-exchanging it with the gun control-file watchdog 1750, 1752 running on the gun computer device 1720, 1724. Then, when the computer device user 1720, 1724 is ready to use their gun computer device 1720, 1724, perhaps weeks or months later, they enter the required information to complete the gun control-file 1764, 1766. This could include fields indicating when will the use take place, where will the use take place and how long will the use be necessary, to name just a few.

With this new information added, any authorized manager 1708, 1710 can review the completed gun control-file 1764, 1766 before downloading the gun control-file 1764, 1766 to the gun control-file watchdog 1750, 1752 to prepare it for deployment. For example, the authorized manager 1708, 1710 might ensure the duration of use is reasonable. They might ensure that appropriate fees have been paid, for example hunting season fees. The central server 1730 can then determine when the use date is reached to send the Start Deployment message to activate the gun computer device 1720, 1724 and enable its ability to fire bullets.

Each time the device user 1712, 1714, 1726 wants to fire a bullet it would be equivalent to extracting a drug from a drug dispensing computer device. The gun computer device user 1712, 1714, 1716 would have to provide their fingerprint on the biometric input of the gun computer device 1720, 1722, 1724 so that it can be matched before the trigger will engage. This is similar to the unlocking mechanism to extract a single drug dose. To enable spontaneous shooting the biometric can be pre-entered to enable the 'next shot'. In some embodiments a manager 1708, 1710 can modify the gun control-file 1764, 1766 to allow multiple bullets to be expelled with a single biometric input. This choice would be based on various criteria, the age and experience of the gun owner 1712, 1714, 1716 and other factors for the manager 1708, 1710 to access.

In those embodiments where a local onsite manager 1710 is able to watch over one gun computer device 1720, 1724 deployments, a more spontaneous assignment and deployment regimen is possible. In these embodiments, the steps would be similar to those just discussed, but the local manager 1710 could erase the user identity from the gun control-file each time the local computer device user 1714 has completed their deployment. The manager 1710 might also erase the deployment time and deployment duration as well, as these would both be updated when the next gun user 1714 arrives to try a firearm 1722.

As discussed in previous figures, once all elements of the gun control-file 1764, 1766 are confirmed and the user identity has been received, the gun control-file 1764, 1766 can be downloaded and the fully provisioned state can be reached. As mentioned, this allows the central server 1730 to use whatever mechanisms it has been programmed to follow to start the deployment. Although the start time has been mentioned, there could be direct manager 1708, 1710 input required to issue the Begin Deployment message. For example, in the case of a shooting range, the stall to be used might have to be vacated first before the Begin Deployment message can be issued. There could be many other criteria used for issuing the Begin Deployment message.

These gun control-files 1764, 1766 can guide the gun control-file watchdog's 1750, 1752 behaviour and limit the activities of the gun computer device 1720, 1722, 1724. In this gun usage embodiment, once the assignment confirmation and gun control-file are received, the device can open for examination and loading. Either the gun owner or the local manager 1710 can ensure it is in good working order and add the necessary ammunition 1726, 1728 or ensure the ammunition already present is sufficient for the usage they 1720, 1724 are intending. The gun control-file 1764, 1766 could also allow multiple loadings of ammunition 1726, 1728 up to a configured and authorized limit. This is similar to allowing multiple loads of a drug-dispensing computer device during its deployment to a drug consumer.

When the gun computer device 1720, 1722, 1724 has been examined and is loaded, it can be closed and prepared for final deployment. Being able to load the gun computer device 1720, 1722, 1724 does not necessarily enable the trigger. The trigger cannot be used until Begin Deployment message is received. Depending on the programming at the central server 1730, there could be many more requirements before firing bullets is possible.

When the gun computer device 1720, 1722, 1724 is closed, the user identity is received, and a viable gun control-file 1764, 1766 is exchanged, the potential for deployment is possible Information about the gun computer device's 1720, 1722, 1724 deployment is held securely and cannot be tapered with. Deployment information may be very sensitive, and security can be maintained at all times while the one or more gun control-files 1764, 1766 are held on the gun computer device user 1712, 1714, 1716. For example, if the gun computer device user 1712, 1714, 1716 were to attempt to fire the gun computer device 1720, 1722, 1724 outside of the GPS permission area, a Stop Deployment message could be sent by the central server 1730 which would halt deployment and immediately disable the firing trigger. The gun computer device user 1712, 1714, 1716 might then have to bring their gun computer device 1720, 1722, 1724 back to an authorized manager 1708, 1710 to clear the Stop Deployment command from the central server 1730 to re-enable their gun control-file 1764, 1766 which would be currently blocked.

During the deployment of the gun computer devices 1720, 1722, 1724, the gun control-file watchdog 1750, 1752 can provide status commands and feedback to the central server 1730 for everything taking place at the gun computer device 1720, 1722, 1724. This information can generate alerts and notifications to various authorized managers 1708, 1710 when problems occur, for example, if a miscalculation has taken place and ammunition 1726, 1728 is required to complete the deployment. It might also provide alerts for abuse, like trying to fire outside of the allowed GPS range. Attempts to break in and force ammunition 1726, 1728 to be loaded when no additional communication is allowed could also warn authorized managers 1708, 1710 and disable the gun computer device 1720, 1722, 1724.

Once deployment finishes, the gun control-file watchdog 1750, 1752 has the choice to delete all gun control-file information used in the deployment. In some embodiments, it might allow an encryption cache of some gun control-file 1750, 1752 to reside in its memory to save download time and speed for future gun usage, for example for frequent visitors to the gun and rod club 1704. This would be an implementation choice by the designers of the system.

The invention claimed is:

1. A system for providing multiple levels of control and management of one or more computer devices using a secure communication path between a central server and a control-file watchdog program running on the one or more computer devices, the system comprising:

the central server having:
a non-transitory memory storing a central database of authenticated device identity values of devices for establishing an authenticated and secure communication link between the central server and one or more computer devices by matching a device identity against the authenticated device identity values in the central database; and the non-transitory memory storing a database of authorized manager values containing a hierarchy of deployment and control rights over the one or more computer devices;
a user interface for selecting a target computer device and one or more authorized managers to define a hierarchy of access rights over the target computer device; wherein the user interface receives deployment instructions to generate or complete control-files for the target computer device; and generates an assignment confirmation message for the assignment of the target computer device;
a communications interface for creating a secure data communications path to the target computer device using the non-transitory memory storing the authenticated device identity values and transmitting an authentication confirmation message; transmitting one or more completed control-files to the target computer device; and receiving a user identity received message indicating a computer device user's identity has been received by the target computer device;

a hardware processor with the control-file watchdog program having:
a communication channel for establishing the secure communication path to the central database using the device identity of the target computer device; to receive the authentication confirmation message; to receive an assignment confirmation message; to receive one or more control-files providing operational instructions to direct activities of the target computer device; and to receive deployment commencement messages to confirm the start of the target computer device's operation;
an user identity input to receive the user identity to provide identity confirmation for the target computer device and generate the user identity received message;

the hardware processor for limiting operational behaviours of the computer device user of the target computer device during deployment and for generating operational status messages and alerts messages for activities performed by the target computer device to be viewed by one or more of the authorized managers.

2. The system of claim 1 further comprising a challenge and response protocol to verify that at least one identified authorized manager is in possession of the target computer device by changing a state of the target computer device and requiring the authorized manager to verify that state.

3. The system of claim 1 wherein the computer device user's identity is a user-rights token that was issued at the time of purchasing rights to use the target computer device.

4. The system of claim 1 wherein the central server allows multiple computer devices to be provisioned to a specific computer device user for the same purpose at a same time and sends a begin deployment command to only one computer device.

5. The system of claim 1 wherein the one or more computer devices are interdepending and can work in succession with each other.

6. The system of claim 5 wherein the succession allows the deployment of one computer device to lead to the provisioning and deployment of the subsequent computer device.

7. The system of claim 1 wherein one or more of the authorized managers can create limited pools of computer devices.

8. The system of claim 7 wherein the limited pools contain a set of managers that can only control and manage the computer devices that have been added to the respective limited pool.

9. The system of claim 1 wherein the identity received message sent to the central server causes a user-identity verified message being returned to the control-file watchdog program.

10. The system of claim 1 wherein the computer device user's identity is further matched against the user-identity within the one or more control-files before the identity received message is sent.

11. The system of claim 1 wherein the central server triggers alert messages that can be sent to one or more registered alert addresses.

12. The system of claim 1 wherein the central server automatically determines that a critical resource necessary for the safe operation of the target computer device is reaching an unacceptably low level.

13. The system of claim 1 wherein secure messages exchanged with the central server can also include messages sent to and from the target computer device user during their limited use of the computer device.

14. The system of claim 1 wherein the hardware processor is configured for detection of viewing the message by one or more authorized managers and determining the target computer device deployment should be halted.

15. The system of claim 1 wherein the one or more authorized managers determine the target computer device user is outside of the acceptable bounds for continued limited use of the computer device.

16. The system of claim 1 wherein the one or more authorized managers determine the target computer device user's identity provided during limited use shows an irregularity as a result of using the computer device.

17. The system of claim 1 wherein the control-file watch dog program determines that a critical resource necessary for the safe operation of the target computer device is reaching an unacceptably low level.

18. The system of claim 1 wherein the user-identity is a stored user-identity for the target computer device user to have limited control over the computer device.

19. The system of claim 1 wherein the one or more control-files permit additional or extended control by the computer device user.

20. A method for providing multiple levels of control and management of one or more computer devices using a secure communication path between a central server and a control-file watchdog program running on the one or more computer devices, the method comprising:

storing, on a non-transitory memory at the central server, a central database of authenticated identity values of devices for establishing an authenticated and secure communication link between the central server and one or more computer devices by matching a computer device identity against the authenticated identity values in the central database; and the non-transitory memory storing a database of authorized manager values containing a hierarchy of deployment and control rights over the one or more computer devices;

selecting, by a user interface of the central server, a target computer device and one or more authorized managers to define a hierarchy of access rights over the target computer device; wherein the user interface receives deployment instructions to generate or complete control-files for the target computer device; and generates assignment confirmation messages for the assignment of target computer devices;

creating a secure data communications path from the central server to the target computer device using a communications interface, the non-transitory memory storing the authenticated identity values and transmitting an authentication confirmation message; for transmitting one or more completed control-files to the target computer device; and for receiving an identity received message indicating a computer device user's identity has been received by the target computer device;

executing the control-file watchdog program with a communication channel for establishing the secure communication path to the central database using the known identity of the target computer device, the channel to receive an authentication confirmation message; to receive an assignment confirmation message; to receive one or more control-files providing operational instructions to direct activities of the target computer device; and to receive deployment commencement messages to confirm the start of the target computer device's operation;

receiving, at a user-identity input, a user identity to provide identity confirmation for target computer device usage and generating an identity received confirmation message to the central server;

limiting operational behaviours of the computer device user of the target computer device during deployment by a hardware processor and the control-file watchdog program; and generating operational status messages and alerts messages for activities performed by the target computer device to be viewed by one or more of the authorized managers.

21. Non-transitory computer readable medium with instructions to configure one or more processors to execute operations of the method of claim 20.

\* \* \* \* \*